US012611766B2

(12) United States Patent (10) Patent No.: US 12,611,766 B2
Ragusila et al. (45) Date of Patent: Apr. 28, 2026

(54) HUMANOID ROBOT WITH ADVANCED KINEMATICS

(71) Applicant: Figure AI Inc., San Jose, CA (US)

(72) Inventors: Victor Ragusila, San Jose, CA (US);
Sarah Horton, San Jose, CA (US);
Jacob Webb, San Jose, CA (US);
Joseph Wood, San Jose, CA (US);
Michael Stevens, San Jose, CA (US);
Jose Domingo Briones Bravo, San
Jose, CA (US); Basel Zohny, San Jose,
CA (US)

(73) Assignee: FIGURE AI INC., San Jose, CA (US)

( * ) Notice: Subject to any disclaimer, the term of this
patent is extended or adjusted under 35
U.S.C. 154(b) by 0 days.

(21) Appl. No.: 19/329,559

(22) Filed: Sep. 15, 2025

(65) Prior Publication Data

US 2026/0077482 A1 Mar. 19, 2026

Related U.S. Application Data

(63) Continuation-in-part of application No.
PCT/US2025/016930, filed on Feb. 21, 2025, and a
(Continued)

(51) Int. Cl.
*B25J 9/12* (2006.01)
*B25J 9/00* (2006.01)
(52) U.S. Cl.
CPC ............. *B25J 9/126* (2013.01); *B25J 9/0009*
(2013.01)
(58) Field of Classification Search
None
See application file for complete search history.

(56) References Cited

U.S. PATENT DOCUMENTS 4,804,220 A 2/1989 Rosheim
4,834,761 A 5/1989 Walters
(Continued)

FOREIGN PATENT DOCUMENTS

CN 102357889 2/2012
CN 308637925 5/2014
(Continued)

OTHER PUBLICATIONS

Duran-Hernandez, Control Implementation in a Low-cost Designed
Biped Robot to Reproduce Squats, 2022 The 10th International
Conference on Control, Mechatronics and Automation (Year: 2022).*
(Continued)

*Primary Examiner* — Arslan Azhar

(57) ABSTRACT

A humanoid robot, including an upper portion including a
torso, a head, and left and right arm assemblies; a lower
portion including left and right lower leg assemblies; a
central portion coupled to the upper portion and including a
spine, a pelvis, and left and right upper leg assemblies. Each
upper leg assembly includes a hip flex actuator coupled to
the pelvis and having a hip flex axis positioned at a non-zero
downward angle relative to a transverse plane of the human-
oid robot. The upper leg assembly also includes left and right
knee actuators, wherein each knee actuator is an electric
rotary actuator, has a knee axis that is co-planar with the hip
flex axis, and has a momentary peak torque greater than a
momentary peak torque of the torso twist actuator. The
humanoid robot lacks a distinct torso pitch actuator and
wherein the hip flex actuators are collectively arranged to
provide for pitch movements of the torso.

28 Claims, 40 Drawing Sheets

Related U.S. Application Data continuation-in-part of application No. 19/038,657, filed on Jan. 27, 2025.

(60) Provisional application No. 63/852,423, filed on Jul. 28, 2025, provisional application No. 63/852,724, filed on Jul. 28, 2025, provisional application No. 63/747,576, filed on Jan. 21, 2025, provisional application No. 63/694,304, filed on Sep. 13, 2024.

(56) References Cited

U.S. PATENT DOCUMENTS

| | | | |
|---|---|---|---|
| 4,986,723 | A | 1/1991 | Maeda |
| 5,394,766 | A | 3/1995 | Johnson |
| 5,447,403 | A | 9/1995 | Engler, Jr. |
| 6,477,058 | B1 | 11/2002 | Luebs |
| 6,732,015 | B2 | 5/2004 | Maeda |
| 6,980,889 | B2 | 12/2005 | Ito |
| 7,024,276 | B2 | 4/2006 | Ito |
| 7,072,741 | B2 | 7/2006 | Nagashima |
| 7,099,747 | B2 | 8/2006 | Mikami |
| 7,308,336 | B2 | 12/2007 | Takenaka |
| 7,319,917 | B2 | 1/2008 | Takenaka |
| 7,319,918 | B2 | 1/2008 | Takenaka |
| 7,337,039 | B2 | 2/2008 | Takenaka |
| 7,379,789 | B2 | 5/2008 | Takenaka |
| 7,386,364 | B2 | 6/2008 | Mikami |
| 7,496,428 | B2 | 2/2009 | Takenaka |
| 7,664,569 | B2 | 2/2010 | Shimizu |
| 7,864,159 | B2 | 1/2011 | Sweetser |
| D641,808 | S | 7/2011 | Matsuda |
| D677,743 | S | 3/2013 | Koshiishi |
| D687,908 | S | 8/2013 | Hoang |
| 8,511,964 | B2 | 8/2013 | Linn |
| D689,566 | S | 9/2013 | Wong |
| 8,660,695 | B2 | 2/2014 | De La Rosa Tames |
| 8,770,749 | B2 | 7/2014 | Mccabe |
| 8,942,849 | B2 | 1/2015 | Maisonnier |
| 9,134,547 | B2 | 9/2015 | Mccabe |
| 9,205,556 | B1 | 12/2015 | Magnusson |
| 9,205,560 | B1 | 12/2015 | Edsinger |
| 9,346,165 | B1 | 5/2016 | Metzger |
| 9,383,594 | B2 | 7/2016 | Mccabe |
| 9,494,415 | B2 | 11/2016 | Sweetser |
| 9,574,646 | B1 | 2/2017 | Edsinger |
| 9,575,335 | B1 | 2/2017 | Mccabe |
| 9,592,603 | B2 | 3/2017 | Hardouin |
| D794,692 | S | 8/2017 | Haranaka |
| D795,320 | S | 8/2017 | Liu |
| D795,321 | S | 8/2017 | Liu |
| 9,789,607 | B1 | 10/2017 | Whitman |
| 9,789,612 | B2 | 10/2017 | Hoffman |
| 9,796,078 | B2 | 10/2017 | Angle |
| 9,821,466 | B2 | 11/2017 | Bingham |
| 9,868,210 | B1 | 1/2018 | Whitman |
| 9,910,297 | B1 | 3/2018 | Mccabe |
| 9,992,474 | B2 | 6/2018 | Grunnet-Jepsen |
| 10,007,994 | B2 | 6/2018 | Grunnet-Jepsen |
| 10,018,256 | B1 | 7/2018 | Magnusson |
| D835,214 | S | 12/2018 | Xiong |
| D838,759 | S | 1/2019 | Kowalski |
| 10,189,158 | B2 | 1/2019 | Edsinger |
| D841,708 | S | 2/2019 | Koshiishi |
| 10,203,209 | B2 | 2/2019 | Roumeliotis |
| 10,310,362 | B2 | 6/2019 | Grunnet-Jepsen |
| 10,349,245 | B2 | 7/2019 | Tokuchi |
| D866,684 | S | 11/2019 | Michael |
| D868,866 | S | 12/2019 | Gable |
| D872,152 | S | 1/2020 | Xiong |
| D873,320 | S | 1/2020 | Clerc |
| 10,537,998 | B2 | 1/2020 | Salisbury |
| 10,545,497 | B1 | 1/2020 | Cui |
| D885,451 | S | 5/2020 | Chen |
| 10,656,511 | B2 | 5/2020 | Grunnet-Jepsen |
| D888,120 | S | 6/2020 | Hurst |
| D892,886 | S | 8/2020 | Klassen |
| D892,887 | S | 8/2020 | Klassen |
| D893,573 | S | 8/2020 | Yan |
| 10,780,578 | B2 | 9/2020 | Blankespoor |
| D898,789 | S | 10/2020 | Nazarikhorram |
| 10,890,921 | B2 | 1/2021 | Gillett |
| D911,459 | S | 2/2021 | Xiong |
| 10,921,558 | B2 | 2/2021 | Yao |
| 10,924,638 | B2 | 2/2021 | Swaminathan |
| 10,946,528 | B2 | 3/2021 | Gupta |
| 10,960,539 | B1 | 3/2021 | Kalakrishnan |
| D932,531 | S | 10/2021 | Xu |
| 11,180,205 | B2 | 11/2021 | Amino |
| 11,188,821 | B1 | 11/2021 | Kalakrishnan |
| 11,247,738 | B2 | 2/2022 | Lavalley |
| 11,333,954 | B2 | 5/2022 | Bull |
| 11,347,030 | B2 | 5/2022 | Yao |
| 11,402,726 | B2 | 8/2022 | Bull |
| 11,416,003 | B2 | 8/2022 | Whitman |
| 11,435,745 | B2 | 9/2022 | Lee |
| 11,498,223 | B2 | 11/2022 | Williams |
| 11,546,504 | B2 | 1/2023 | Kim |
| 11,554,484 | B2 | 1/2023 | Jung |
| 11,599,009 | B2 | 3/2023 | Bull |
| 11,600,010 | B2 | 3/2023 | Doutre |
| 11,602,853 | B2 | 3/2023 | Stoianovici |
| 11,632,991 | B2 | 4/2023 | Hull |
| D985,643 | S | 5/2023 | Li |
| 11,686,884 | B2 | 6/2023 | Shinohara |
| 11,699,884 | B2 | 7/2023 | Braun |
| 11,707,852 | B1 | 7/2023 | Hurst |
| 11,736,677 | B2 | 8/2023 | Grunnet-Jepsen |
| 11,807,067 | B2 | 11/2023 | Mancini |
| 11,833,680 | B2 | 12/2023 | Deits |
| 11,850,738 | B2 | 12/2023 | Chernyak |
| 11,851,120 | B2 | 12/2023 | Fay |
| 11,999,423 | B2 | 6/2024 | Whitman |
| 12,036,670 | B2 | 7/2024 | Geating |
| 12,054,208 | B2 | 8/2024 | Swilling |
| 12,070,863 | B2 | 8/2024 | Whitman |
| 12,077,229 | B2 | 9/2024 | Whitman |
| 12,097,626 | B2 | 9/2024 | Ikeda |
| 12,122,044 | B2 | 10/2024 | Webb |
| D1,051,193 | S | 11/2024 | Mahoor |
| 12,134,181 | B2 | 11/2024 | Klingensmith |
| 12,172,537 | B2 | 12/2024 | Gonano |
| 12,214,497 | B2 | 2/2025 | Whitman |
| 12,235,652 | B2 | 2/2025 | Whitman |
| 12,240,117 | B2 | 3/2025 | Chebotar |
| 12,251,831 | B2 | 3/2025 | Murphy |
| D1,069,875 | S | 4/2025 | Belon |
| 12,290,940 | B1 | 5/2025 | Abate |
| D1,082,881 | S | 7/2025 | Wang |
| 12,365,094 | B2 | 7/2025 | Mccall |
| 12,403,611 | B2 | 9/2025 | Mccall |
| 12,472,648 | B1 * | 11/2025 | Hadas ..................... B25J 17/00 |
| 2004/0075168 | A1 | 4/2004 | Azuma |
| 2004/0103740 | A1 | 6/2004 | Townsend |
| 2005/0072558 | A1 | 4/2005 | Whitney |
| 2006/0217838 | A1 | 9/2006 | Sugino |
| 2007/0035143 | A1 | 2/2007 | Blackwell |
| 2008/0239678 | A1 | 10/2008 | Ploeg |
| 2009/0059033 | A1 | 3/2009 | Shimada |
| 2010/0280662 | A1 | 11/2010 | Abdallah |
| 2011/0040408 | A1 | 2/2011 | De La Rosa Tames |
| 2011/0058800 | A1 | 3/2011 | Lee |
| 2011/0067517 | A1 | 3/2011 | Ihrke |
| 2011/0067520 | A1 | 3/2011 | Ihrke |
| 2011/0068595 | A1 | 3/2011 | Ihrke |
| 2011/0071671 | A1 | 3/2011 | Ihrke |
| 2011/0071673 | A1 | 3/2011 | Ihrke |
| 2011/0071678 | A1 | 3/2011 | Ihrke |
| 2012/0078419 | A1 | 3/2012 | Kim |
| 2012/0155775 | A1 * | 6/2012 | Ahn ..................... G05D 1/0272 |
| | | | 701/527 |
| 2012/0310412 | A1 | 12/2012 | Seo |
| 2013/0175816 | A1 | 7/2013 | Kawasaki |
| 2014/0039675 | A1 | 2/2014 | Ead |
| 2014/0217762 | A1 | 8/2014 | Ihrke |

(56)　　　　References Cited

U.S. PATENT DOCUMENTS

| 2014/0265401 | A1 | 9/2014 | Allen Demers |
| 2015/0192399 | A1 | 7/2015 | Raab |
| 2016/0008988 | A1 | 1/2016 | Kennedy |
| 2016/0052574 | A1 | 2/2016 | Khripin |
| 2016/0064263 | A1 | 3/2016 | Hosek |
| 2017/0075143 | A1 | 3/2017 | Saylor |
| 2017/0080582 | A1 | 3/2017 | Mugnier |
| 2017/0106738 | A1 | 4/2017 | Gillett |
| 2017/0299898 | A1 | 10/2017 | Gallina |
| 2017/0326736 | A1 | 11/2017 | Nagatsuka |
| 2018/0104823 | A1 | 4/2018 | Kaku |
| 2018/0182260 | A1 | 6/2018 | Ciniello |
| 2018/0357552 | A1 | 12/2018 | Campos |
| 2019/0025611 | A1 | 1/2019 | Saylor |
| 2019/0100263 | A1 | 4/2019 | Amino |
| 2019/0105783 | A1 | 4/2019 | Al Moubayed |
| 2019/0278079 | A1 | 9/2019 | Mccabe |
| 2019/0329413 | A1 | 10/2019 | Johnson |
| 2019/0337166 | A1 | 11/2019 | Keeney-Ritchie |
| 2020/0009739 | A1 | 1/2020 | Moon |
| 2020/0086479 | A1 | 3/2020 | Messier |
| 2020/0096792 | A1 | 3/2020 | Mccabe |
| 2020/0330246 | A1 | 10/2020 | Tognetti |
| 2020/0409183 | A1 | 12/2020 | Saylor |
| 2021/0162602 | A1* | 6/2021 | Kawaguchi ............. B25J 11/00 |
| 2021/0221004 | A1 | 7/2021 | Gupta |
| 2021/0387346 | A1 | 12/2021 | Gillett |
| 2022/0226996 | A1 | 7/2022 | Ishizuka |
| 2022/0287853 | A1 | 9/2022 | Ren |
| 2022/0294062 | A1 | 9/2022 | Kamon |
| 2022/0388174 | A1 | 12/2022 | Stathis |
| 2022/0390952 | A1 | 12/2022 | Yu |
| 2022/0395974 | A1 | 12/2022 | Balasubramanian |
| 2022/0410380 | A1 | 12/2022 | Lu |
| 2023/0033779 | A1 | 2/2023 | Gazeau |
| 2023/0048725 | A1 | 2/2023 | Barbour |
| 2023/0112596 | A1 | 4/2023 | Yang |
| 2023/0143315 | A1 | 5/2023 | Whitman |
| 2023/0173683 | A1 | 6/2023 | Gomez |
| 2023/0182296 | A1 | 6/2023 | Sermanet |
| 2023/0347514 | A1 | 11/2023 | Xiao |
| 2023/0390948 | A1 | 12/2023 | Hsu |
| 2024/0003380 | A1 | 1/2024 | Vyas |
| 2024/0091964 | A1 | 3/2024 | Smith |
| 2024/0181637 | A1 | 6/2024 | Gillett |
| 2024/0217104 | A1 | 7/2024 | Neville |
| 2024/0228191 | A1 | 7/2024 | Kumar |
| 2024/0300109 | A1 | 9/2024 | Shaw |
| 2025/0147517 | A1 | 5/2025 | Swilling |
| 2025/0187202 | A1 | 6/2025 | Mccall |
| 2025/0196326 | A1 | 6/2025 | Katz |
| 2025/0196327 | A1 | 6/2025 | Geating |
| 2025/0205908 | A1 | 6/2025 | Goldsmith |

FOREIGN PATENT DOCUMENTS

| CN | 303298408 | 7/2015 |
| CN | 209615545 | 11/2019 |
| CN | 210998685 | 7/2020 |
| CN | 212287717 | 1/2021 |
| CN | 112959343 | 6/2021 |
| CN | 115503013 | 12/2022 |
| CN | 115649316 | 1/2023 |
| CN | 218802294 | 4/2023 |
| CN | 116714698 | 9/2023 |
| CN | 117047810 | 11/2023 |
| CN | 117301022 | 12/2023 |
| CN | 117462367 | 1/2024 |
| CN | 309012925 | 12/2024 |
| GB | 2472046 | 4/2013 |
| GB | 2496335 | 5/2013 |
| JP | 1301180 | 5/2007 |
| JP | D1638014 | 7/2019 |
| JP | 1698172 | 10/2021 |
| KR | 20180107353 | 10/2018 |
| KR | 300994127 | 2/2021 |
| KR | 3020240036125 | 9/2024 |
| SU | 1734994 | 5/1992 |
| WO | 2009030922 | 3/2009 |
| WO | 2019234706 | 12/2019 |
| WO | 2022207106 | 10/2022 |
| WO | 2023107501 | 6/2023 |
| WO | 2023110778 | 6/2023 |
| WO | 2023246994 | 12/2023 |
| WO | 2023246995 | 12/2023 |
| WO | 2024058844 | 3/2024 |
| WO | 2024072966 | 4/2024 |
| WO | 2024085904 | 4/2024 |
| WO | 2024112350 | 5/2024 |
| WO | 2024112351 | 5/2024 |
| WO | 2024123766 | 6/2024 |
| WO | 2024163992 | 8/2024 |
| WO | D243074010 | 10/2024 |
| WO | 2025019583 | 1/2025 |
| WO | 2025042802 | 2/2025 |
| WO | 2025072321 | 4/2025 |

OTHER PUBLICATIONS

Barker et al., Natural head movement for HRI with a muscular-skeletal head and neck robot, 2017, IEEE, p. 587-592 (Year: 2017).
Gao et al., Development of a low motion-noise humanoid neck: Statics analysis and experimental validation, 2010, IEEE, p. 1203-1208 (Year: 2010).
Keselman et al., "Intel RealSense stereoscopic depth cameras," in Proceedings of the IEEE Conference on Computer Vision and Pattern Recognition Workshops, pp. 1-10, 2017.
Nakada et al., Deep Learning of Neuromuscular and Visuomotor Control of a Biomimetic Simulated Humanoid, 2020, IEEE, p. 3952-3959 (Year: 2020).
Lim et al., Basic emotional walking using a biped humanoid robot, 1999, IEEE, p. 954-959 (Year: 1999).
Albers et al., Upper Body of a new Humanoid Robot—the Design of Armar Iii, 2006, IEEE, p. 308-309 (Year: 2006).
Mikayla Tetteh-Martey, (date posted Nov. 3, 2024), Blurring Lines: Resurgence of 'I, Robot', Cornellsun.com, URL: (https:// www. cornellsun.com/article/2024/11/blurring-lines-resurgence-of-i-robot), (Year: 2024).
Mike Oitzman, (date posted Aug. 6, 2024), Figure 02 humanoid robot is ready to get to work, therobotreport.com, URL: (https:// www.therobotreport.com/figure-02-humanoid-robot-is-ready-to-get-to-work/), (Year: 2024).
Park et al., Mechanical Design of Humanoid Robot Platform KHR-3 (Kaist Humanoid Robot 3: HUBO), 2005, IEEE, p. 321-3226 (2005).
International Search Report for PCT/US2025/023064.
Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.
Hebi Robotics, "T-Series Actuator," Jan. 29, 2024.
International Search Report for PCT/US2025/019793.
International Search Report for PCT/US2025/025005.
International Search Report for PCT/US2025/024817.
Cheng et al., "Human Posture Estimation Using Voxel Data for "Smart" Airbag Systems: Issues and Framework," IEEE, p. 84-89 (2004).
Droeschel et al., "Learning to Interpret Pointing Gestures with a Time-of-Flight Camera," IEEE, p. 481-488 (2025).
Frohlich et al., "Design and Impementation of a Spherical Joint for Mobile Manipulators," IEEE, p. 251-258 (2025).
Netzev et al., "Many Faced Robot—Design and Manufacturing of a parametric, Modular and Open Source Robot Head," IEEE, p. 342-348 (2019).
Netzev et al., Design and implementation of a spherical joint for mobile manipulators, 2019, IEEE, p. 342-348 (Year: 2019).
Haddadin et al., The "DLR crash report": Towards a standard crash-testing protocol for robot safety—Part II: Discussions, 2009, IEEE, p. 280-287 (Year: 2009).

(56)         References Cited

OTHER PUBLICATIONS

Yaghoubi et al., Region-Based CNNs for Pedestrian Gender Recognition in Visual Surveillance Environments, 2019, IEEE, p. 1-5 (Year: 2019).

Pateromichelakis et al., Head-eyes system and gaze analysis of the humanoid robot Romeo, 2014, IEEE, p. 1374-131379 (Year: 2014).

Mokhtari et al., Taban:A Retro-Projected Social Robotic—Head for Human-Robot Interaction, 2019, IEEE, p. 46-51 (Year: 2019).

International Search Report for PCT/US25/23325.

International Search Report for PCT/US2025/012544.

International Search Report for PCT/US2025/010425.

International Search Report for PCT/US2025/011450.

International Search Report for PCT/US2025/016930.

Merged original document with English translation (CN 112959343); Paragraphs added for citation purposes. (Year: 2025).

Merged original document (KR 20180107353) with English Translation (Year: 2025).

Available online at https://youtu.be/YsdnsNjvwKo?si=bu2dXk8mQaL86C2M, at least as early as Aug. 23, 2023.

Available online at https://www.youtube.com/watch?v=q8ldbodRG14, at least as early as May 22, 2019.

Available online at https://youtu.be/GtPs_ygfaEA?si=7lv6MEFvFoaacKfa, at least as early as Aug. 15, 2023.

Available online at https://www.youtube.com/watch?v=G6JE7mNYz2A, at least as early as Oct. 17, 2024.

Available online at https://www.youtube.com/watch?v=FuNFr7V7KFQ, at least as early as Aug. 19, 2024.

Available online at https://www.youtube.com/watch?v=GzX1qOIO1bE, at least as early as May 13, 2024.

Available online at https://youtu.be/_MBd_XfXy9M?si=PbEHUJpRUFqaxS3J, at least as early as Jun. 26, 2023.

Available online at https://youtu.be/SHPxcRBIXN0?si=VbJqbK7jzUqtZGmn, at least as early as Sep. 26, 2023.

Available online at https://youtu.be/BvFxD-8AhJA?si=Vx1F4a76tbQDUX48, at least as early as Nov. 16, 2023.

Available online at https://www.youtube.com/watch?v=jWTWWuzB6Cg, at least as early as Aug. 27, 2024.

Available online at https://www.youtube.com/watch?v=B-ebMigAHzQ, at least as early as Sep. 30, 2024.

Available online at https://youtu.be/XiQkeWOFwmk?si=1qOPC8gXgmmGvXRT, at least as early as May 16, 2023.

Available online at https://youtu.be/cpraXaw7dyc?si=JvPaT6eMA18psrmU, at least as early as Dec. 13, 2023.

Available online at https://www.youtube.com/watch?v=DrNcXgoFv20, at least as early as Oct. 18, 2024.

Available online at https://youtu.be/BNSZ8Fwcd20?si=_YnVgjYblVuhASk1, at least as early as Oct. 27, 2023.

Available online at https://youtu.be/SS3Ga2HQQ0s?si=Dwr3sJuCsOeUoSLj, at least as early as Nov. 20, 2023.

Available online at https://www.youtube.com/watch?v=iWC8rSjDywU, at least as early as Oct. 18, 2024.

Available online at https://youtu.be/sihlDeJ4Hmk?si=fJsKpvRFPzFejmS6, at least as early as Dec. 27, 2023.

Available online at https://www.youtube.com/watch?v=zkBnFPBV3f0, at least as early as Jul. 11, 2013.

Available online at https://www.youtube.com/watch?v=oXBYZxa25vc&t=1s, at least as early as Apr. 3, 2013.

Available online at https://www.youtube.com/watch?v=LBem19AmTT4, at least as early as Apr. 7, 2015.

Available online at https://www.youtube.com/watch?v=IE-YBaYjbqY, at least as early as Dec. 10, 2013.

Available online at https://www.youtube.com/watch?v=y-j4dixQQml&t=222s, at least as early as May 22, 2012.

Available online at https://www.youtube.com/watch?v=Bmglbk_Op64&t=1s, at least as early as Nov. 10, 2011.

Available online at https://www.youtube.com/watch?v=20GHG-R9eFI, at least as early as Mar. 6, 2023.

Available online at https://www.youtube.com/watch?v=bUrLuUxv9gE, at least as early as Aug. 30, 2024.

Available online at https://www.youtube.com/watch?v=-9EM5_VFIt8, at least as early as Apr. 16, 2024.

Available online at https://www.youtube.com/watch?v=29ECwExc-_M&t=2s, at least as early as Apr. 17, 2024.

Available online at https://www.youtube.com/watch?v=67CUudkjEG4, at least as early as Oct. 26, 2009.

Available online at https://www.youtube.com/watch?v=yBmatGQ0giY&t=1s, at least as early as Aug. 11, 2022.

Available online at https://www.youtube.com/watch?v=bdVrWxjK2vo, at least as early as Sep. 17, 2024.

Available online at https://www.youtube.com/watch?v=qw2y0kceAv0, at least as early as Oct. 15, 2024.

Available online at https://www.youtube.com/watch?v=B_12k7MZEKg, at least as early as Jun. 30, 2024.

Available online at https://www.youtube.com/watch?v=CbA9wA9etGA, at least as early as Sep. 19, 2024.

Available online at https://www.youtube.com/watch?v=zLhA-RWBBYU, at least as early as Jul. 5, 2024.

Available online at https://www.youtube.com/watch?v=_mQJw8VhZ7w&t=111s, as least as early as Oct. 5, 2022.

Available online at https://www.youtube.com/watch?v=UPOLcE1vwA0, at least as early as Apr. 28, 2016.

Available online at https://www.youtube.com/watch?v=UBbk180ZbTc, at least as early as Oct. 14, 2024.

Available online at https://www.youtube.com/watch?v=UHe1zSQwep0, at least as early as Oct. 14, 2024.

Available online at https://www.youtube.com/watch?v=MCbGeC-kuBM, at least as early as Aug. 5, 2024.

Available online at https://www.youtube.com/watch?v=ujdK3yd2gHY, at least as early as Jul. 2, 2024.

Available online at https://www.youtube.com/watch?v=-HizP4UQvug, at least as early as Apr. 25, 2024.

Available online at https://www.youtube.com/watch?v=ioOkbUQqmZO, at least as early as Nov. 9, 2022.

Available online at https://www.youtube.com/watch?v=zmqWU2dQKZ8, at least as early as Oct. 24, 2024.

Available online at https://www.youtube.com/watch?v=q8ldbodRG14, at least as early as Feb. 26, 2024.

Available online at https://www.youtube.com/watch?v=CUhuhleQNos, at least as early as May 22, 2019.

Available online at https://www.youtube.com/watch?v=dY57qnD_O7U, at least as early as Jul. 27, 2021.

Pateromichelakis et al., Head-eyes system and gaze analysis of the humanoid robot Romeo, 2014, IEEE, p. 1374-1379 (Year: 2014).

Jeung et al., Realization of human neck motion with novel robotic mechanism, 2016, IEEE, p. 482-486 (Year: 2016).

https://x.com/Tesla_Optimus/status/1964425666834931730.

https://x.com/Tesla_Optimus/status/1925047336256078302.

https://x.com/elonmusk/status/1922083384085430492.

https://x.com/Tesla_Optimus/status/1914781858706985363.

https://x.com/Tesla_Optimus/status/1866171391156113740.

https://x.com/Tesla_Optimus/status/1862116407594377698.

https://x.com/Tesla_Optimus/status/1844789517833629717.

https://x.com/elonmusk/status/1752516361799258318.

https://www.youtube.com/shorts/mOlxtSSa1NE.

https://youtu.be/dD3YBKOUKHk?si=PibnkCacKZfPGD4Y.

https://youtu.be/JUz-hyP5PMg?si=s5clcTTKitRXS_OZ.

https://www.youtube.com/watch?v=Dp6sqx9BGZs.

https://www.youtube.com/watch?v=i1SvmFWu834.

https://www.youtube.com/watch?v=r2r26ebhtYQ.

https://www.youtube.com/watch?v=uVcBa6NXAbk.

https://www.youtube.com/watch?v=I44_zbEwz_w.

https://www.youtube.com/watch?v=oe1dke3Cf7l.

https://www.youtube.com/watch?v=HYwekersccY.

https://www.youtube.com/watch?v=dFObux6mfTc.

https://www.youtube.com/watch?v=F_7IPm7f1vl.

https://www.youtube.com/watch?v=v8UaiRgqvlc.

https://www.youtube.com/watch?v=LdxlegrxsBQ.

https://www.youtube.com/watch?v=v1Q4Su54iho.

https://www.youtube.com/watch?v=0rwYOa7pJCs.

https://www.youtube.com/watch?v=mHP1WGlw5Wk.

https://www.youtube.com/watch?v=TNryO2uasws.

(56) References Cited

OTHER PUBLICATIONS

Duran-Hernandez et al., "Control Implementation in a Low-cost Designed Biped Robot to Reproduce Squats," The 10th International Conference on Control, Mechatronics and Automation, Nov. 9, 2022.

Souissi et al., Influence of the number of humanoid vertebral column pitch joints inflexion movements, 2011, IEEE, p. 227-282 ( Year: 2011).

Or, Humanoids Grow a Spine: The Effect of Lateral Spinal Motion on the Mechanical Energy Efficiency, 2012, IEEE, p. 1-11 (Year: 2012).

Or, Computer Simulations of a Humanoid Robot Capable of Walking Like Fashion Models, 2012, IEEE, p. 241-248 (Year: 2012).

Available online at https://x.com/Tesla_Optimus/status/1964425666834931730, at least as early as Sep. 6, 2025.

Available online at https://x.com/Tesla_Optimus/status/1925047336256078302, at least as early as May 21, 2025.

Available online at https://x.com/elonmusk/status/1922083384085430492, at least as early as May 12, 2025.

Available online at https://x.com/Tesla_Optimus/status/1914781858706985363, at least as early as Apr. 22, 2025.

Available online at https://x.com/Tesla_Optimus/status/1866171391156113740, at least as early as Dec. 9, 2024.

Available online at https://x.com/Tesla_Optimus/status/1862116407594377698, at least as early as Nov. 28, 2024.

Available online at https://x.com/Tesla_Optimus/status/1844789517833629717, at least as early as Oct. 11, 2024.

Available online at https://x.com/elonmusk/status/1752516361799258318, at least as early as Jan. 30, 2024.

Available online at https://www.youtube.com/shorts/mOlxtSSa1NE, at least as early as Sep. 3, 2025.

Available online at https://youtu.be/dD3YBKOUKHK?si=PibnkCacKZfPGD4Y, at least as early as Jul. 9, 2025.

Available online at https://youtu.be/JUz-hyP5PMg?si=s5clcTTKitRXS_OZ, at least as early as Jun. 11, 2025.

Available online at https://www.youtube.com/watch?v=Dp6sqx9BGZs, at least as early as Jun. 11, 2025.

Available online at https://www.youtube.com/watch?v=i1SvmFWu834, at least as early as Mar. 21, 2025.

Available online at https://www.youtube.com/watch?v=r2r26ebhtYQ, at least as early as Feb. 25, 2025.

Available online at https://www.youtube.com/watch?v=uVcBa6NXAbk, at least as early as Feb. 21, 2025.

Available online at https://www.youtube.com/watch?v=|44_zbEwz_w, at least as early as Mar. 19, 2025.

Available online at https://www.youtube.com/watch?v=oe1dke3Cf71, at least as early as May 28, 2025.

Available online at https://www.youtube.com/watch?v=HYwekersccY, at least as early as Aug. 20, 2025.

Available online at https://www.youtube.com/watch?v=dFObux6mfTc, at least as early as Apr. 28, 2025.

Available online at https://www.youtube.com/watch?v=F_7IPm7f1vl, at least as early as Oct. 30, 2024.

Available online at https://www.youtube.com/watch?v=v8UaiRgqvlc, at least as early as Mar. 5, 2025.

Available online at https://www.youtube.com/watch?v=LdxlegrxsBQ, at least as early as Dec. 6, 2024.

Available online at https://www.youtube.com/watch?v=v1Q4Su54iho, at least as early as Jul. 25, 2025.

Available online at https://www.youtube.com/watch?v=0rwYOa7pJCs, at least as early as Apr. 1, 2025.

Available online at https://www.youtube.com/watch?v=mHP1WGIw5Wk, at least as early as Jul. 17, 2025.

Available online at https://www.youtube.com/watch?v=TNryO2uasws, at least as early as Jul. 23, 2025.

Available online at https://www.youtube.com/watch?v=Fb_R6IDDU4A, at least as early as Oct. 9, 2020.

Available online at https://www.youtube.com/watch?v=_mQJw8VhZ7w, at least as early as Oct. 5, 2022.

Available online at https://www.youtube.com/watch?v=a-R4H8-8074, at least as early as Jun. 6, 2015.

Available online at https://www.youtube.com/watch?v=1fC7b2LjVW4, at least as early as Jul. 12, 2016.

Luo et al., Human body trajectory generation using point cloud data for robotics massage applications, 2014, IEEE, p. 5612-5617 (Year: 2014).

Ophaswongse et al., Optimal Design of a Novel 3-DOF Orientational Parallel Mechanism for Pelvic Assistance on a Wheelchair: An Approach Based on Kinematic Geometry and Screw Theory, 2020, IEEE, p. 3315-3322 (Year: 2020).

Shafti et al., Real-time Robot-assisted Ergonomics, 2019, IEEE, p. 1975-1981 (Year: 2019).

Cheng et al., Human posture estimation using voxel data for "smart" airbag systems: issues and framework, 2004, IEEE, p. 84-89 (Year: 2004).

* cited by examiner

HUMANOID ROBOT WITH ADVANCED KINEMATICS

CROSS REFERENCE TO RELATED APPLICATIONS

This application is (i) a continuation in part of U.S. patent application Ser. No. 19/038,657 filed Jan. 27, 2025, (ii) a continuation in part of PCT/US25/16930 filed Feb. 21, 2025, and (iii) claims the benefit of and priority to U.S. Provisional Patent Application Nos. 63/694,304 filed Sep. 13, 2024, 63/852,423 filed Jul. 28, 2025, and 63/852,424 filed Jul. 28, 2025, each of which is expressly incorporated by reference herein in its entirety. This application also claims the benefit of and priority to U.S. Provisional Patent Application No. 63/747,576 filed Jan. 21, 2025.

TECHNICAL FIELD

This disclosure relates to a humanoid robot with advanced kinematics and methods of defining a kinematic configuration to a humanoid robot thereof.

BACKGROUND

The present disclosure relates to the field of robotics, and more specifically, to the kinematic architecture of a general-purpose humanoid robot. Humanoid robots are developed to operate in human-centric environments and perform a wide variety of tasks, from locomotion to complex object manipulation. This humanoid form factor provides a distinct advantage in versatility over non-humanoid platforms like wheeled or quadrupedal robots, which are often limited in their ability to perform such a diverse array of generalized tasks. However, designing and manufacturing a truly functional humanoid robot presents a host of complex engineering challenges that have limited the capabilities of conventional systems.

Conventional humanoid robots are often constrained by their underlying kinematic and mechanical designs. These limitations frequently manifest as a restricted range of motion, which prevents the robot from performing nuanced, human-like movements. Furthermore, the actuator arrangements in many existing designs can create kinematic singularities within the primary operational workspace, degrading performance during critical tasks. The architecture of the robot's central portion is also a common point of compromise; for example, the inclusion of a dedicated torso pitch actuator can severely limit the internal torso volume available for larger batteries and more powerful computing hardware. Inefficiencies in locomotion, such as requiring numerous steps to simply reverse direction, and a lack of component commonality among actuators also contribute to higher costs and increased complexity in prior designs. Consequently, there is a clear need for a humanoid robot with an improved kinematic architecture that overcomes these limitations.

SUMMARY

The presently disclosed subject matter is directed to a humanoid robot configured to be positioned in the extended state. When said humanoid robot is in said extended state, the humanoid robot comprises an upper portion comprising a torso, a head, a left arm assembly, and a right arm assembly. The humanoid robot comprises a lower portion comprising a left lower leg assembly and a right lower leg assembly. The humanoid robot comprises a central portion coupled to the upper portion and comprising: (i) a spine with a torso twist actuator, (ii) a pelvis, (iii) a left upper leg assembly, and a right upper leg assembly, and wherein each upper leg assembly comprises a hip flex actuator coupled to the pelvis and having a hip flex axis positioned at a non-zero downward angle relative to a transverse plane of the humanoid robot; and (iv) a left actuator and a right knee actuator, wherein each of the left and right knee actuators is an electric rotary actuator, has a knee axis that is co-planar with the hip flex axis, and has a momentary peak torque greater than a momentary peak torque of the torso twist actuator. The humanoid robot lacks a distinct torso pitch actuator, and wherein the hip flex actuators are collectively arranged to provide for pitch movements of the torso.

In some embodiments, the humanoid robot further comprises: a hip roll actuator directly coupled to each hip flex actuator and not directly coupled to the pelvis, each hip roll actuator having an associated actuator bearing and a hip roll axis positioned at a downward angle relative to the transverse plane; a torso lean actuator in the pelvis and having an associated actuator bearing; and wherein each hip flex actuator further has an associated actuator bearing and the torso twist actuator has an associated actuator bearing, and wherein a center of the associated actuator bearing of the hip roll actuator is positioned below a respective center of the associated actuator bearing of each of the torso lean actuator, the torso twist actuator, and each hip flex actuator.

The presently disclosed subject matter is directed to a humanoid robot configured to be positioned in the extended state. When said humanoid robot is in said extended state, the humanoid robot comprises an upper portion comprising a torso, a head, a left arm assembly, and a right arm assembly. The humanoid robot comprises a lower portion comprising a left lower leg assembly and a right lower leg assembly. The humanoid robot comprises a central portion coupled to the upper portion and comprising: a spine, a pelvis, a hip flex actuator directly coupled to the pelvis and having a hip flex axis, a hip roll actuator directly coupled to the hip flex actuator, each hip roll actuator having a hip roll axis positioned at a non-zero downward angle relative to a transverse plane of the humanoid robot, and a leg twist actuator coupled to the hip roll actuator, each leg twist actuator having a leg twist axis parallel to a sagittal plane of the humanoid robot. The humanoid robot lacks a dedicated torso pitch actuator configured to provide pitch movements of the torso.

The presently disclosed subject matter is directed to a humanoid robot arm assembly. The arm assembly comprises an arm actuator (J1) having a first rotational axis (A1) oriented at a rearward angle relative to a vertical plane, wherein said rearward angle is between 1 and 45 degrees. The arm assembly comprises a shoulder actuator (J2) having a second rotational axis (A2). The arm assembly comprises an upper arm twist actuator (J3) having a third rotational axis (A3). The arm assembly comprises an elbow actuator (J4) having a fourth rotational axis (A4). The arm assembly comprises a lower arm twist actuator (J5) having a fifth rotational axis (A5). The second rotational axis (A2) and the fourth rotational axis (A4) are arranged to be orthogonal to the third rotational axis (A3). The third rotational axis (A3) is collinear with the fifth rotational axis (A5) when the arm assembly is in a fully extended state.

The presently disclosed subject matter is directed to a humanoid robot. The humanoid robot comprises a torso and a pelvis. The humanoid robot comprises two leg assemblies coupled to the pelvis. The humanoid robot comprises at least one torso actuator configured to provide roll or yaw motion to the torso. The humanoid robot comprises a left and a right hip flex actuator (J11), each directly coupled to a respective side of the pelvis. The robot lacks a dedicated torso pitch actuator for forward bending at a waist of the robot. The left and right hip flex actuators (J11) are configured to act in concert to bend the torso forward from the hips, thereby compensating for the lack of the dedicated torso pitch actuator.

The presently disclosed subject matter is directed to a humanoid robot leg assembly. The leg assembly comprises a hip flex actuator (J11) coupled directly to a pelvis of the robot. The leg assembly comprises a hip roll actuator (J12) coupled directly to the hip flex actuator (J11). The leg assembly comprises a leg twist actuator (J13) positioned kinematically below the hip flex actuator (J11) and the hip roll actuator (J12) and not directly coupled to the pelvis. The leg assembly comprises a knee actuator (J14) that is a rotary actuator. An actuator bearing for the knee actuator (J14) in a left leg assembly and an actuator bearing for the knee actuator (J14) in a right leg assembly are both positioned on a same side of respective vertical planes that are parallel with a sagittal plane of the robot, such that their locations are not mirrored across the sagittal plane.

The presently disclosed subject matter is directed to a humanoid robot having a total number of degrees of freedom (DoF). The humanoid robot comprises an upper portion including a head, two arms, and two hands. The humanoid robot comprises a central portion including a spine and a pelvis. The humanoid robot comprises a lower portion including two legs and two feet. The humanoid robot comprises a plurality of rotary electric actuators organized into a plurality of actuator types based on torque capacity. Over 65% of the total DoF are located in the upper portion. Less than 10% of the total DoF are located in the lower portion. The plurality of actuator types are unequally distributed, with actuators of a first type having a highest torque capacity being located in hips (J11) and knees (J14) of the robot.

The presently disclosed subject matter is directed to a humanoid robot. The humanoid robot comprises a torso. The humanoid robot comprises an arm assembly extending from the torso and including a primary arm actuator having a rotational axis. The rotational axis is oriented at a rearward angle with respect to a vertical plane, said angle being between 1 and 45 degrees. Said rearward angle positions a primary kinematic singularity of the arm assembly outside of a primary operational workspace of the robot.

The presently disclosed subject matter is directed to a humanoid robot. The humanoid robot comprises a torso having an internal volume. The humanoid robot comprises a pelvis. The humanoid robot comprises left and right hip flex actuators directly coupled to the pelvis. The robot lacks a dedicated torso pitch actuator positioned between the torso and pelvis. Coordinated rotation of both hip flex actuators enables the robot to bend forward from the hips while maintaining the internal torso volume at greater than 15 liters.

The presently disclosed subject matter is directed to a humanoid robot leg assembly. The leg assembly comprises a hip flex actuator having an output adaptor directly coupled to a pelvis. The leg assembly comprises a hip roll actuator having a housing directly coupled to the hip flex actuator rather than directly to the pelvis. A rotational axis of the hip roll actuator is angled relative to a transverse plane at an angle between 1 and 45 degrees. A center of an actuator bearing of the hip roll actuator is positioned below actuator bearings of the hip flex actuator.

The presently disclosed subject matter is directed to a humanoid robot. The humanoid robot comprises an upper portion including a head, two arms, and two hands. The humanoid robot comprises a central portion including a torso and hips. The humanoid robot comprises a lower portion including legs and feet. The robot has between 30 and 70 total degrees of freedom. More than 65% of the total degrees of freedom are positioned in the upper portion. Less than 10% of the total degrees of freedom are positioned in the lower portion.

In some embodiments, the humanoid robot is designed with a total of 62 degrees of freedom (DoF) and is powered by 42 rotary actuators, which are classified into seven types based on momentary peak torque capacity. The DoF distribution is heavily concentrated in the upper body, with approximately 77% located in the upper portion, 16% in the central portion, and 6% in the lower portion, where each hand alone comprises 16 DoF. A substantial majority of the rotary actuators directly drive their associated parts without a drive linkage. This design, which features a minimal number of DoF in the central portion and lacks a dedicated torso pitch actuator, increases the internal torso volume by over 270% to be greater than 20 liters, accommodating a battery pack with a volume exceeding 6 liters.

In some embodiments, the robot's torso and leg assemblies feature a unique actuator configuration. The central portion contains a torso lean actuator positioned in the pelvis with a lean axis angled downward between 8 and 16 degrees from a transverse plane, alongside a torso twist actuator with an axis perpendicular to this plane. Each leg assembly includes a hip flex actuator with a peak torque capacity between 204 and 307 N-m, which is approximately twice that of its respective hip roll actuator. Critically, the hip roll actuator is not directly coupled to the pelvis but is instead directly coupled to the hip flex actuator, with its rotational axis angled rearward and downward between 10 and 20 degrees. Positioned below this, a leg twist actuator, which is also not directly coupled to the pelvis, has an axis parallel to the torso twist actuator's axis and provides up to 90 degrees of rotation in either direction. In some embodiments, the knee actuator is housed in the shin, with non-mirrored actuator bearing locations that enable the use of identical lower thigh and shin components for both left and right legs.

In some embodiments, the arm assembly is structured to enhance its range of motion and workspace efficiency. It includes a shoulder actuator with an axis angled rearward between 10 and 20 degrees to position a primary kinematic singularity away from the main operational area. The arm's kinematics are defined by an upper arm twist actuator and an elbow actuator, where the shoulder and elbow axes are orthogonal to the upper arm twist axis. To facilitate hyperextension, the elbow axis is offset rearward by at least 1 mm from the common chord formed by the upper and lower arm twist axes when the arm is extended. In some embodiments, the actuator bearing of the upper arm twist actuator is approximately 40% larger in radius than the bearing of the lower arm twist actuator. The wrist consists of three actuators with mutually orthogonal axes, wherein the wrist flex axis is offset by at least 1 mm from an axis connecting the centers of the bearings for the other two wrist actuators.

BRIEF DESCRIPTION OF THE DRAWINGS

The drawing figures depict one or more implementations in accordance with the present teachings, by way of example only, not by way of limitation. These figures are intended to illustrate and not to restrict the scope of the disclosure. In the figures, like reference numerals refer to the same or similar elements. This convention is maintained throughout the drawings for consistency.

DETAILED DESCRIPTION

Figure 1:
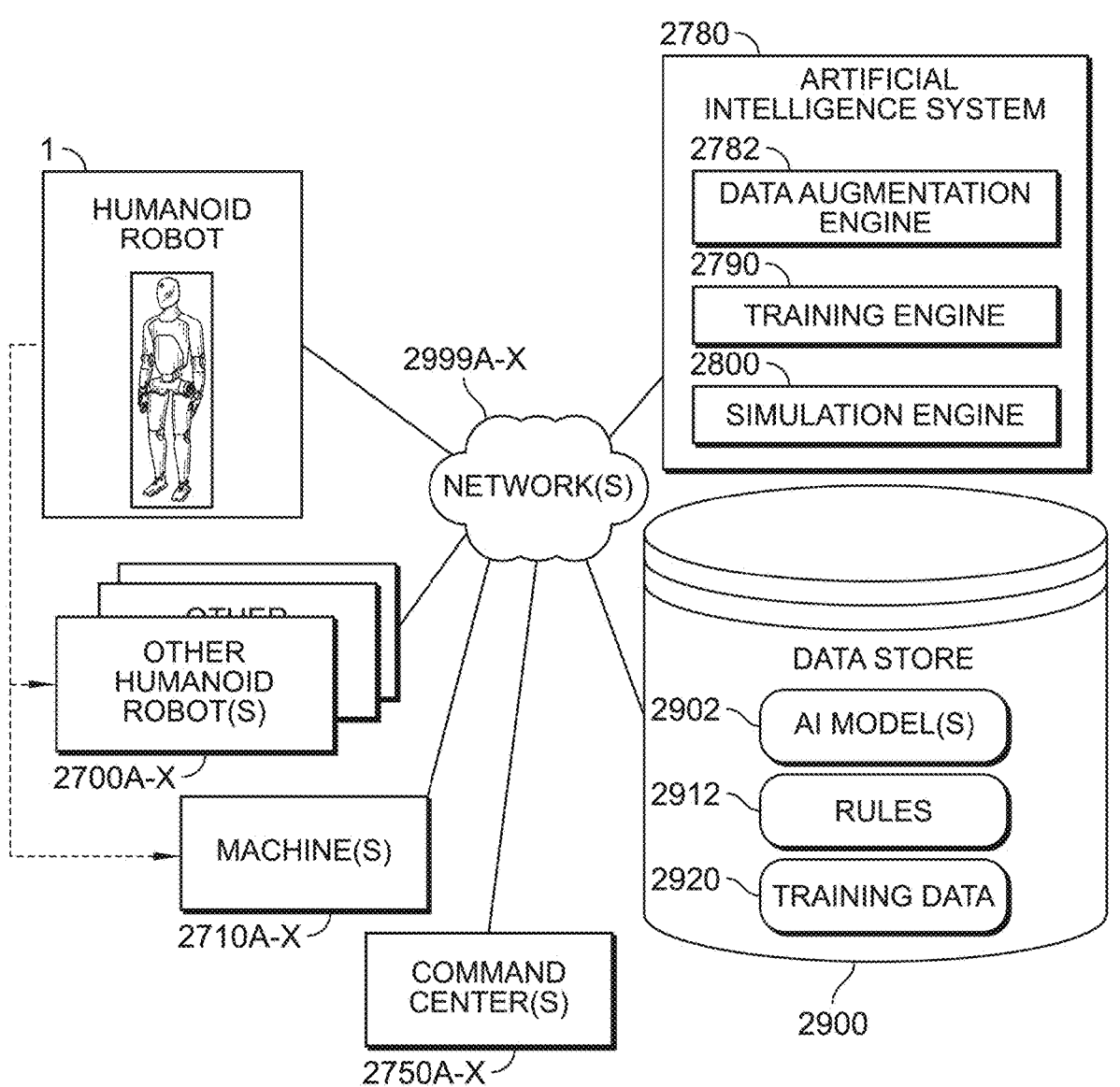
FIG. 1 is a diagram illustrating an environment and a network in which one or more humanoid robots of FIG. 1 may operate, connect, command and/or be commanded by, control and/or be controlled by, and/or interact.

In the following detailed description, numerous specific details are set forth by way of examples in order to provide a thorough understanding of the relevant teachings. These examples are illustrative and not exhaustive. It should be apparent to those skilled in the art that the scope of the teachings is not limited to these specific details. Additionally or alternatively, well-known methods, procedures, components, and/or circuitry have been described at a relatively high-level, without detail, in order to avoid unnecessarily obscuring aspects of the present disclosure.

While this disclosure includes several embodiments, there is shown in the drawings and will herein be described in detail certain embodiments with the understanding that the present disclosure is to be considered as an exemplification of the principles of the disclosed methods and systems and is not intended to limit the broad aspects of the disclosed concepts to the embodiments illustrated. As will be realized, the disclosed methods and systems are capable of other and different configurations, and one or more details are capable of being modified, all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A. Introduction

The challenge of enabling humanoid robots to execute human movements and capabilities may be compounded by the vast array of potential positions, locations, and states the robot could occupy in a dynamic operating environment. These permutations can be reduced through training methodologies, such as: (i) imitation learning or teleoperation, (ii) supervised learning, (iii) unsupervised learning, (iv) reinforcement learning, (v) inverse reinforcement learning, (vi) regression techniques, or (vii) other established methods. While training can help minimize these permutations, improper or non-optimal configurations of parts, assemblies, and components may negate the benefits of training and render specific tasks infeasible. Therefore, it may be beneficial to optimize the arrangements of parts, assemblies, and components, particularly in the robot's kinematic chains, to ensure that the humanoid robot can replicate human movements and perform a wide range of tasks. Without such optimized kinematic configurations, advanced robots may not meet the operational requirements. Thus, the inclusion of at least one optimized component or assembly, such as a single actuator, a hand, or an arm, may be desirable In addition to optimized kinematic configurations, the robot may have high-precision actuators paired with real-time sensor feedback loops and a control system. The sensors may be designed to continuously monitor the robot's orientation, speed, and force exerted on one or more robot components (e.g., arm assembly, leg assembly, etc.). The control system may comprise a computing device including a processor and memory, and instructions, which, when executed by the computing device, cause the computing device to receive data from a plurality of sensors and control the actuators to affect movement of one or more of the robot components. The computing device of the robot may reside in a networked environment and execute additional instructions and/or applications not disclosed herein. The data collected can be processed by an advanced computing architecture, residing in the networked environment, to further train the neural networks that enable the robot to perform its tasks (e.g., enabling it to walk more human-like, climb stairs, or traverse uneven terrain with fluidity and stability), or said data may be used to train other neural networks that are designed to control different robots. Additionally, the disclosed advanced robots may also address technical challenges related to dexterity and object manipulation. For example, the disclosed robots may include end effectors that feature multi-jointed designs with a high number of degrees of freedom, enabling complex and precise movements. Additionally, tactile sensors may be embedded in said end effectors to provide detailed feedback on pressure, texture, and temperature, which again can be used to train local or remote neural networks to improve execution of the set of tasks and/or response to other sensor input.

The robot system disclosed herein provides a robot 1 with between 30 and 70 degrees of freedom (DoF), preferably 62 DoF. In particular, the 62 degrees of freedom are distributed within the robot 1 as follows: (i) 48 degrees of freedom are contained in the upper portion 2 of the robot 1, (ii) 10 degrees of freedom are contained in the central portion 3 of the robot 1, and (iii) 4 degrees of freedom are contained in the lower portion 4 of the robot 1. Stated another way, the 60 degrees of freedom are distributed within the robot 1 as follows: (i) 16 degrees of freedom are contained in each hand 56, (ii) 7 degrees of freedom are contained in each arm assembly 5, (iii) 6 degrees of freedom are contained in each leg assembly 6, and (iv) 2 degrees of freedom are contained in each of the spine/pelvis, and neck 10, 16, 60, 64. The number and distribution of the degrees of freedom provide the inventive robot 1 with several significant advantages over conventional robots. For example, positioning over 75% of the degrees of freedom in the upper portion 2 of said robot 1 allows it to perform complex, dexterous tasks that could not be performed without a substantial majority of the degrees of freedom being positioned in said upper portion. As another example, minimizing the number of degrees of freedom in the central portion 3 allows the robot 1 to have a larger torso, which allows for the inclusion of a larger battery pack and additional computing power; thereby improving the performance and reliability of the robot 1. As a further example, including at least 5% of the degrees of freedom within the lower portion 4 of the robot 1 allows it to minimize the time and number of steps required for turning around, which allows the robot 1 to have more humanlike movements and increases the speed at which certain tasks can be accomplished.

The 62 degrees of freedom of the inventive robot 1 are provided by 42 electric rotary actuators. Of the 42 electric actuators, a majority (e.g., 66%) are not directly connected to a drive linkage; instead, they directly drive the next part of the robot 1. In particular, drive linkages are coupled to 12 rotary actuators contained within the hands and 2 rotary actuators driving the pitch motion of the ankle. In other words, 33% of the rotary actuators are coupled to a drive linkage. These drive linkages allow: (i) the fingers and thumb to be under-actuated, or in other words, the fingers and thumb retain the ability to flex, curl, or rotate around an object while eliminating the need for an actuator to control each joint or degree of freedom and (ii) the foot to pivot around an axis that is located well forward (e.g., more than 10% of the overall length of the foot) of the center of the drive linkage.

The 42 electric rotary actuators can be classified into seven primary types. Six of the seven types have structures that are substantially similar. Although these six common actuator types may be sized differently, they may be assembled in a similar manner and include a number of common components. The primary difference in the six common actuator types is a change in drive size. Although actuators of the same type may have modified housings depending on the location within the robot 1, the internal assemblies and functional properties are substantially the same. The different types of actuators are indicated by different colors in the figures, with the seventh type of actuator being located in the hands and having a different configuration. The similarities and commonalities of the six common actuator types reduce the need for specialized parts, increases assembly speeds, minimize cost, and simplify debugging and documentation of the robot 1.

As shown in the various Figures and described in greater detail below, the seven types of actuators are not equally distributed within the robot 1. The similarities and commonalities of the various actuators and their unequal distribution provides substantial benefits to the robot 1 over conventional robots that lack these features and configuration. Additionally, the robot 1 only uses electric actuators, whereby the robot 1 lacks manual, hydraulic, cable based, or pneumatic actuators. The use of only electric actuators: (i) reduces assembly, maintenance, weight and cost, and (ii) increases durability and safety considerations related to operating the robot 1 within or around other humans.

The positional relationship of the actuators to one another and their general position within the robot 1 provides it with a substantial advantage over conventional robots. For example, the arm actuator (J1) is positioned at a rearward angle relative to a vertical plane. This configuration places the singularity of the robot's arm in a location that is outside of normal use for the tasks that robot 1 is tasked with performing. In addition, the arrangement of actuators contained within the central portion 3 of the robot 1 and the configuration of the same ensures that the leg of the robot 1 cannot be put in a singularity. For example, the axis $A_{11}$ of hip flex actuator (J11) is positioned at a downward angle relative to a horizontal plane at an angle between about 9-13 degrees, preferably between about 10-12 degrees. Further, omitting an actuator that controls spine pitch or torso pitch (i.e., bending forward at the robot's belly) reduces the number of actuators and moves this functionality into the hips/legs of the robot 1. In other words, the robot 1 maintains the ability to bend forward or backward, but eliminates the need for including an actuator or multiple actuators to allow for the robot 1 to perform this movement. Moreover, several actuators are offset relative to one another to provide the robot 1 with the range of motions disclosed below.

Unlike conventional robots, the hip flex actuator (J11) is directly coupled to the pelvis of the robot 1 and it is positioned closer to both the: (i) torso lean actuator (J9), and (ii) torso twist actuator (J10), then all other actuators. Additionally, the hip roll actuator (J12) is not directly connected to the pelvis; instead, it is directly connected to the hip flex actuator (J11). By coupling the hip roll actuator (J12) to the hip flex actuator (J11) at an angle (e.g., more than 10 degrees) relative to the transverse plane (PT), the center of the actuator bearing of the hip roll actuator (J12) is positioned below the actuator bearing 624.6, 684.6, 724.6 for each and every one of the following actuator assemblies:

(i) the torso lean actuator (J9), (ii) the torso twist actuator (J10), and (iii) the hip flex (J11). This positional arrangement is beneficial because it increases the range of motion of hip roll actuator (J12), allowing robot 1 to bend further down (e.g., deep squat) than needed to engage an object resting on the floor or a low shelf. Finally, the leg twist actuator (J13) is positioned below all other actuators that perform hip or spine movements and is not directly coupled to the pelvis of the robot 1.

The various actuators are purposely spatially located and arranged in the robot 1 to provide it with a humanoid configuration and enable it to perform humanlike movements. The spacing between the actuators in the vertical direction enables said robot 1 to have a total or overall height of approximately 1725 mm, wherein the spacing between the actuators in the horizontal direction enables the robot 1 to have an arm span (as measured from fingertip to fingertip) of approximately 1800 mm. Accordingly, the robot's arm span (from fingertip to fingertip) is appreciably greater than the total height of robot 1. This configuration allows the robot 1 to reach items on a high shelf or over an object to pick up another object. In addition, the length of each arm, which extends between the outermost extents of the wrist actuators is less than 20% less than the length of each leg. The torso has a volume of about 20 Liters and an uninterrupted height that is more than 250 mm, preferably 300 mm.

B. Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Although selected human medical terminology is used to describe features and/or relative positions related to the humanoid robot, it should be understood that said medical terminology may not directly correspond to the exact same features of a human. It should be understood that names of various assemblies and components (e.g., including housings and assemblies contained within) may generally relate to a location of similar anatomy of a human body and may not have an exact correlation in dimension, function, or shape. The reference system including three orthogonal reference planes is defined with respect to the robot in a neutral standing position to describe relative positions of components of the robot. Although standard human medical terminology is used to describe the anatomical reference planes (i.e., sagittal, coronal, transverse) of the robot, the planes may be shifted from the typical location on a human to be meaningful for the kinematic layout and features of the robot.

Humanoid Robot: a robot that is capable of bipedal locomotion and includes components (e.g., head, torso, etc.) that generally resemble parts of a human. However, the robot does not need to include every part of a human (e.g., hands with over ten degrees of freedom), nor do its components need to have a shape that exactly or substantially resembles human parts. Furthermore, it should be understood that a humanoid robot is not designed to be primarily quadruped or have a wheeled base.

Neutral State: a state where the robot is standing upright on a horizontal support surface (PG) and facing a forward direction with its torso substantially vertically aligned over its pelvis and legs, where the legs are substantially straight with the knees substantially aligned under the hips and substantially above the ankles, such that the robot's weight is balanced over its feet. In the neutral state, the robot's head is facing forward (i.e., in the forward direction), the arms are located at the sides of the robot, the hands are oriented with the palms facing substantially inward, and the fingers pointing in a substantially downward direction toward the horizontal support surface. An illustrative example of the neutral state for the humanoid robot 1 is shown FIG. 7.

Figure 9:
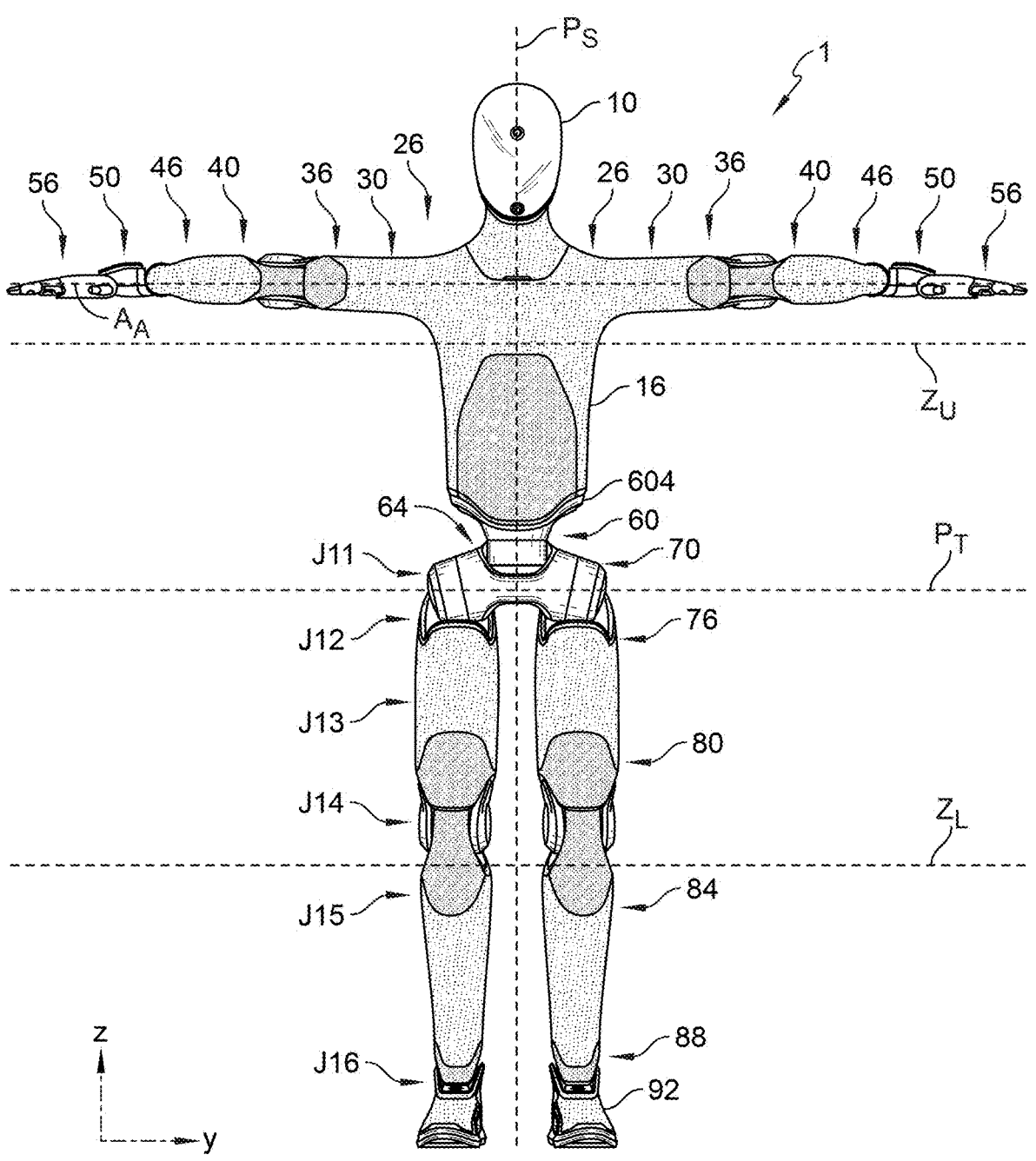
FIG. 9 is a front view of the robot of FIG. 7 in the extended position.

Extended State: a state of the robot with the arms extended outward laterally at the shoulder (as illustrated in FIG. 9) and oriented with the palms of the hands substantially facing downward and the fingers pointing in a substantially outward direction, where the central and lower portions of the robot remain in a neutral state.

Figure 7:
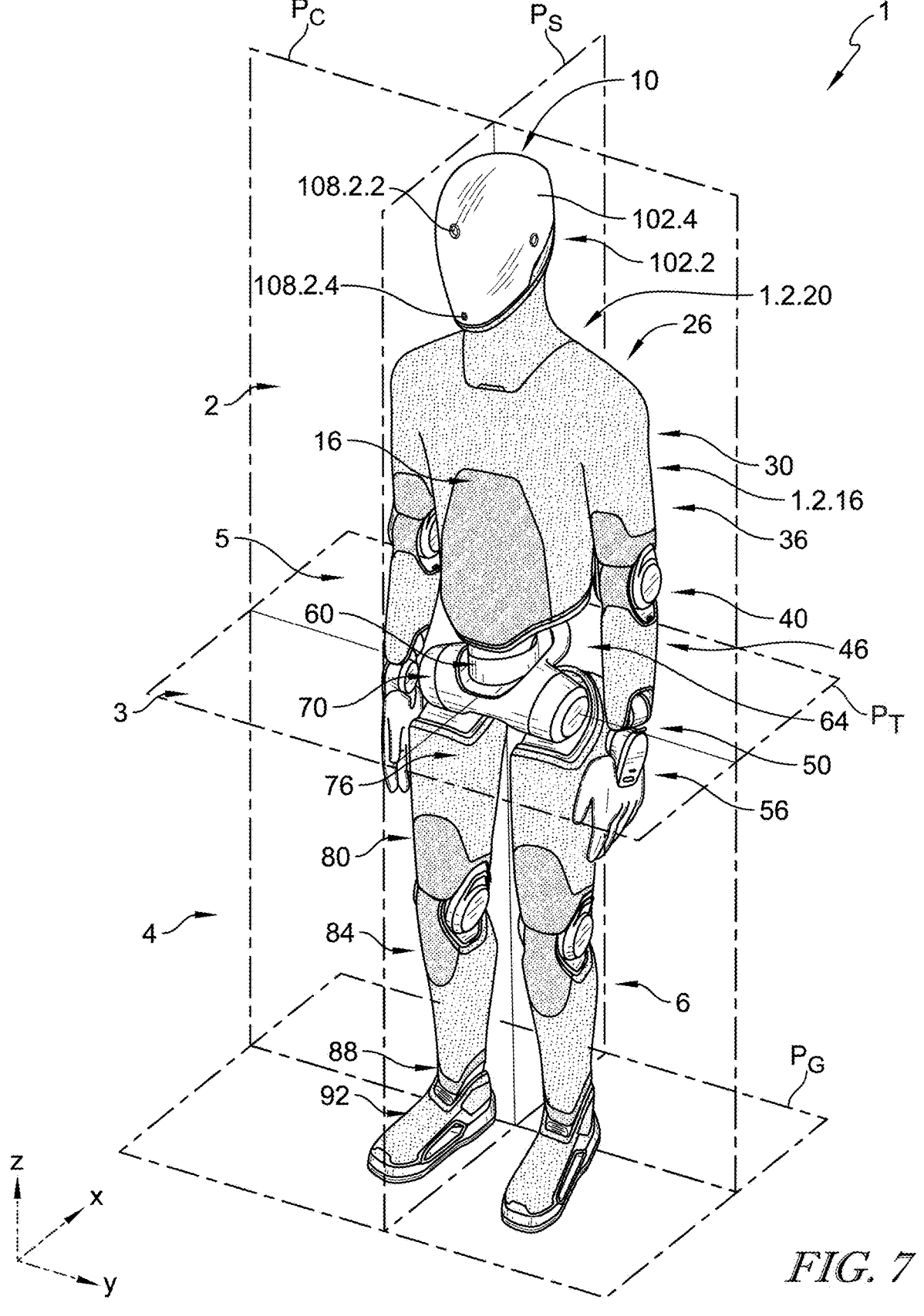
FIG. 7 is a perspective view of a humanoid robot of FIG. 1 in a neutral position.

Sagittal Plane: a vertical plane when the robot is in the neutral state that aids in defining left and right sides of the robot for all states. Accordingly, the sagittal plane may: (i) divide the robot and/or the torso into left and right portions or halves, (ii) extend through an axis of rotation about which the torso twists or rotates relative to the pelvis and legs, (iii) contain an origin point of the robot, and/or (iv) be positioned between the left and right legs, and/or left and right arms. In an illustrative embodiment, the sagittal plane ($P_S$) (e.g., as illustrated in FIG. 7) is a vertical plane positioned at a midway point between the left and right legs and the left and right arms and contains a rotational axis $A_{10}$ of a torso twist actuator (J10) (e.g., as illustrated in FIG. 9) located in the spine 60 of the robot 1 and divides the left and right sides of the robot 1 (e.g., as illustrated in FIG. 7). In other words, in an illustrative embodiment, the sagittal plane ($P_S$) is a plane that is colinear with the rotational axis A10 of the torso twist actuator (J10).

Figure 11:
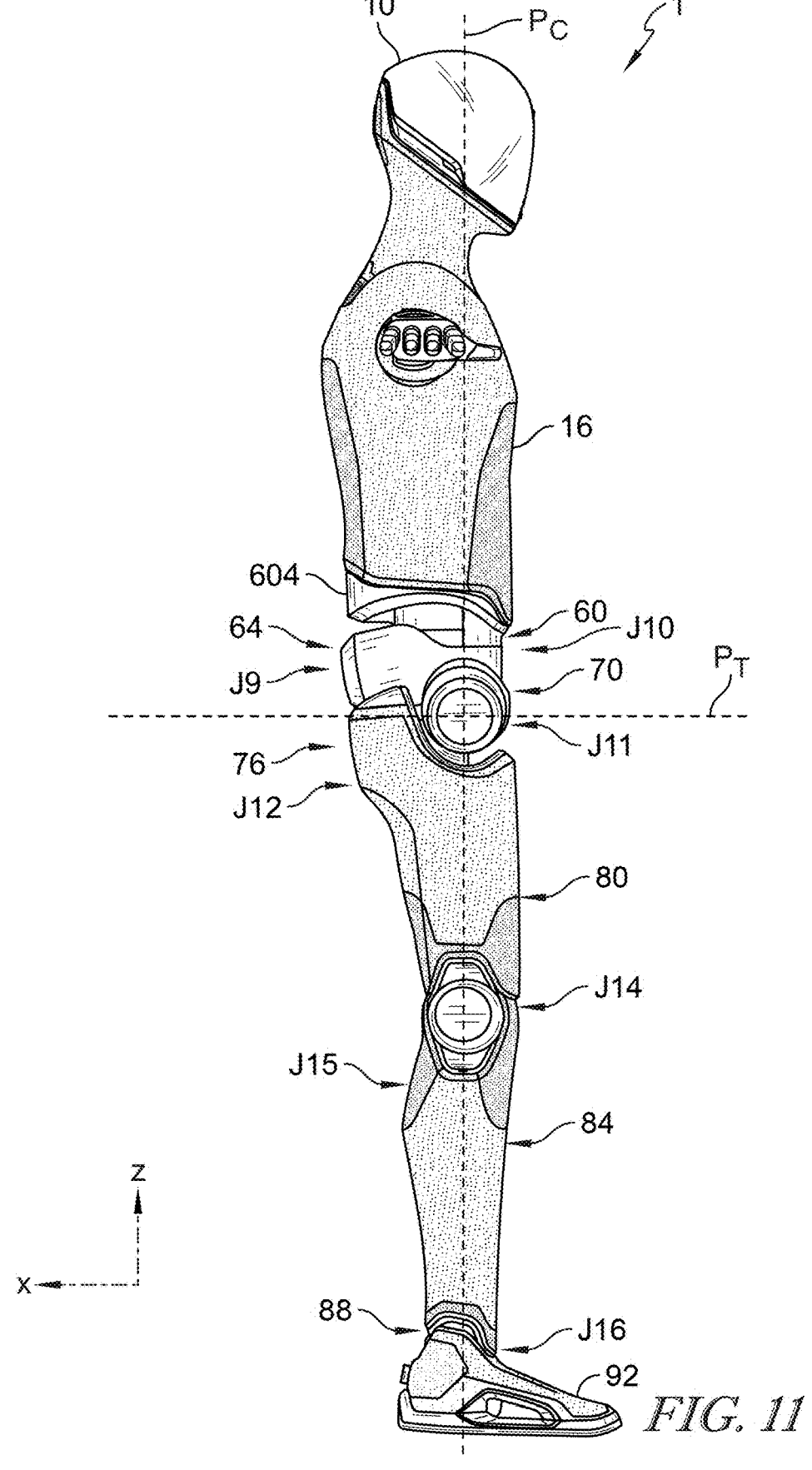
FIG. 11 is a right side view of the robot of FIG. 7 in the extended position.
Figure 12:
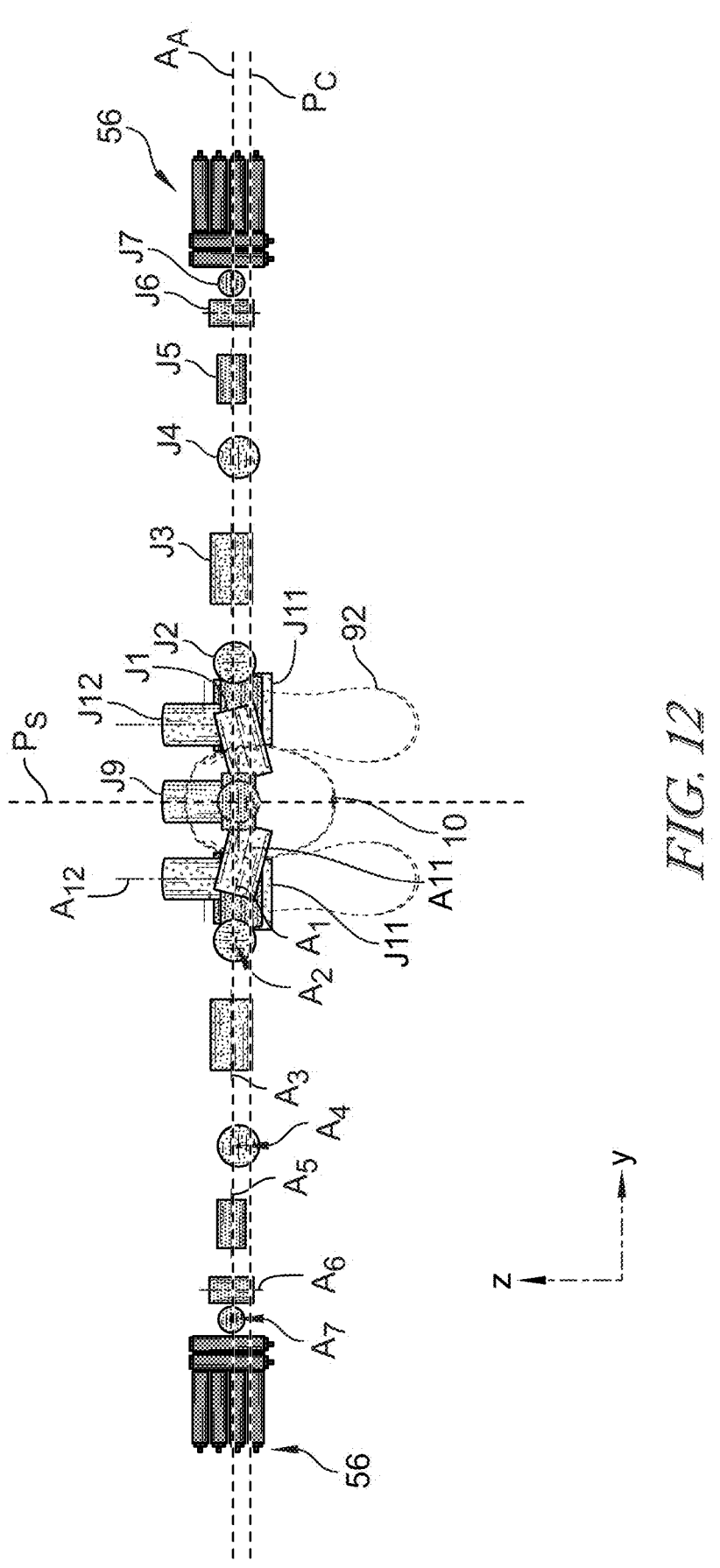
FIG. 12 is a top side view of the robot of FIG. 4 showing the actuators contained therein.
Figure 13:
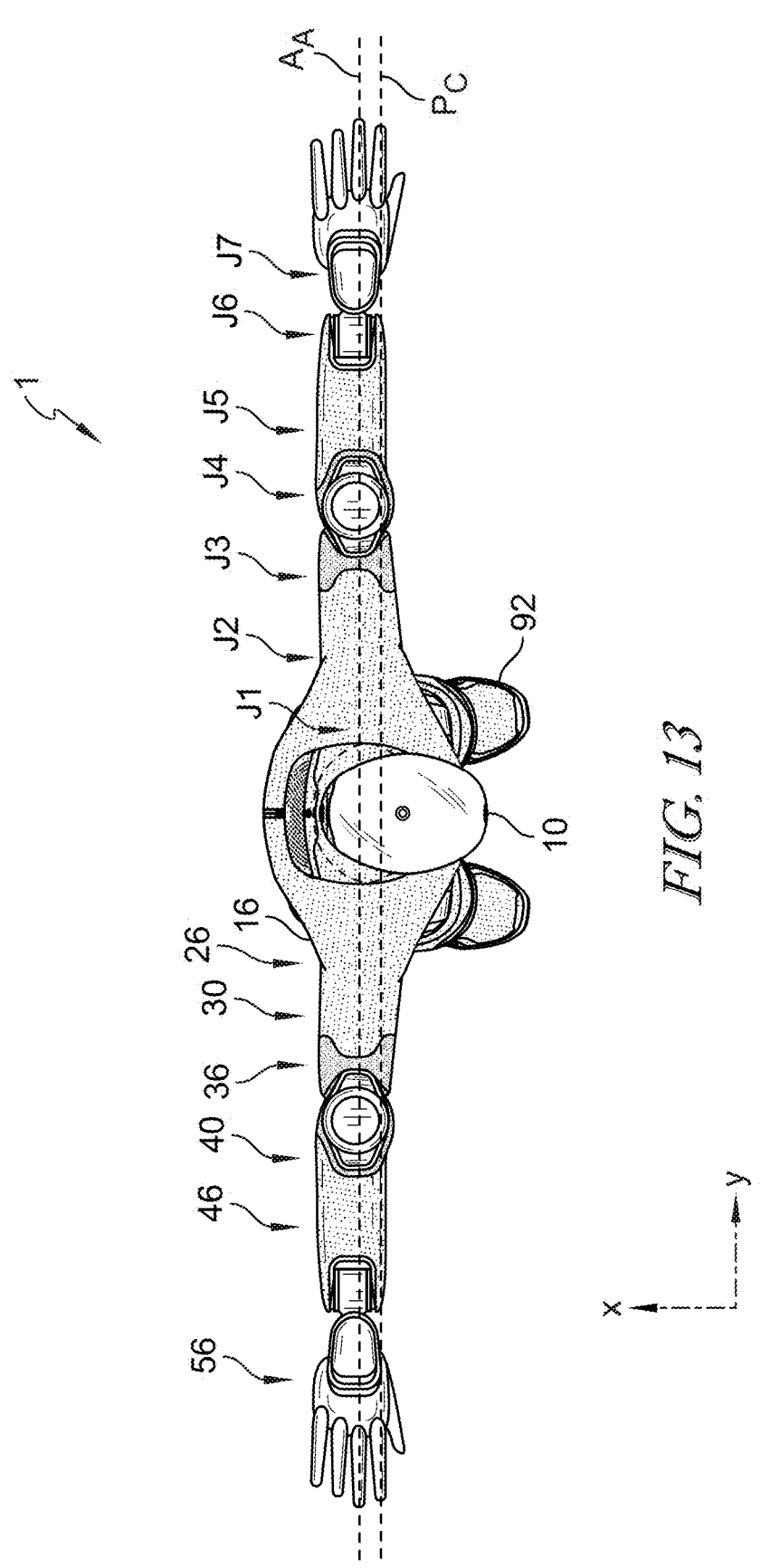
FIG. 13 is a top view of the robot of FIG. 7 in the extended position.
Figure 14:
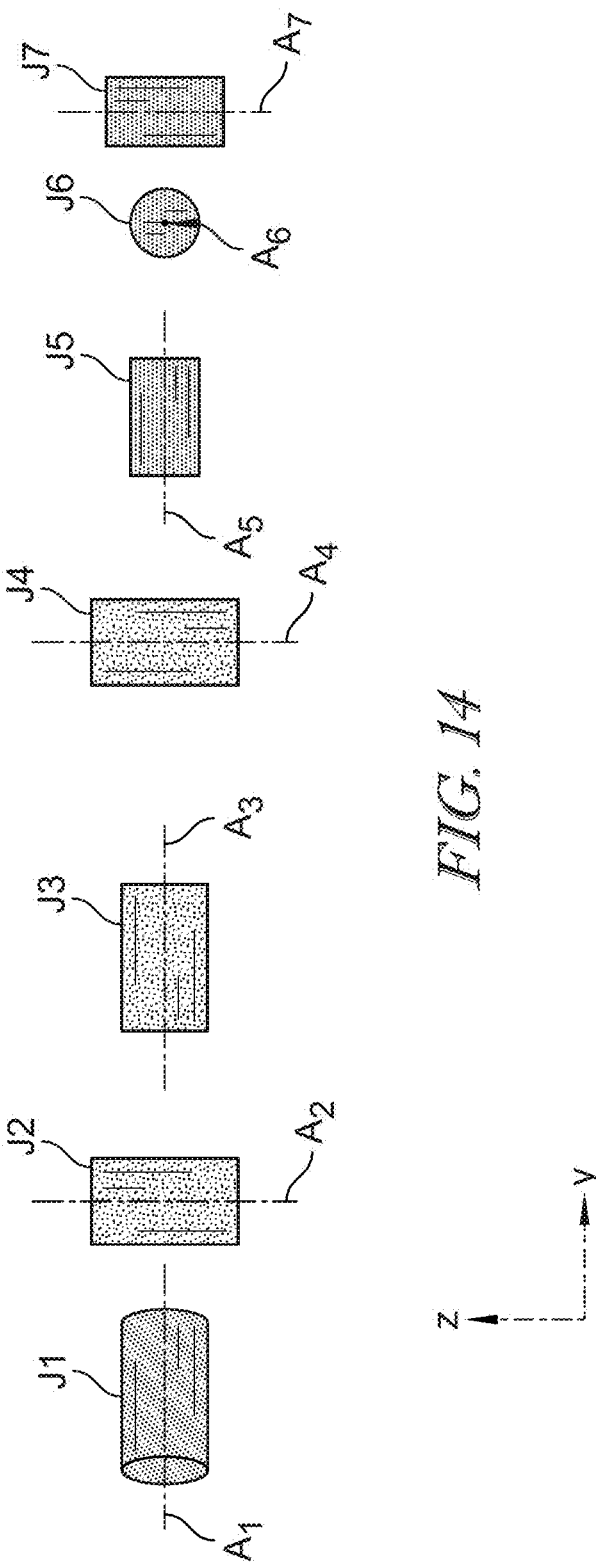
FIG. 14 is a front view of the left arm actuators shown in FIG. 8.

Coronal Plane: a vertical plane when the robot is in the neutral state that aids in defining front and back portions of the robot for all states. Accordingly, the coronal plane may: (i) divide the robot and/or the torso into front and back portions or halves, (ii) contain an axis of rotation about which the torso pitches forward or backward from the neutral state, (iii) contain an axis of rotation of a knee joint about which a lower shin pitches forward and backward, and/or (iv) contains an axis of rotation of an elbow joint about which a lower forearm moves forward and backward, when the robot is in the extended state. In various embodiments, said axis of rotation for torso pitch may be two colinear axes, a single centrally located axis, an axis defined by a line connecting the midpoints of two non-collinear actuator axes that provide the torso pitch function, or an axis defined by a line connecting the center of actuator bearings of two actuators that provide the torso pitch function. In the illustrative embodiment (see, e.g., FIGS. 7 and 11), the coronal plane ($P_C$) is a vertical plane that contains the rotational axes $A_{11}$ of the hip flex actuators (J11) located in the hips 70 (and likewise may contain an axis defined by a line connecting the midpoints of a left hip flex actuator (J11) axis ($A_{11}$) and a right hip flex actuator (J11) axis ($A_{11}$) and rotational axis A10 of torso twist actuator (J10) located in the spine 60 of the robot 1. As shown in these figures, the coronal plane ($P_C$) does not bisect the robot, or torso, into equal front and back halves, as it is offset forward of a majority of the arm actuators in the extended position, and other positional relationships that can be understood from the figures.

Transverse Plane: a horizontal plane that aids in defining the upper and lower portions of the robot. Accordingly, the transverse plane may: (i) divide the robot into upper and lower portions or halves, and/or (ii) contain an axis of rotation about which the torso pitches forward or backward, as discussed above. In the illustrative embodiment, the transverse plane ($P_T$) is a horizontal plane that contains the mid-point of the rotational axes $A_{11}$ of the hip flex actuators (J11) located in the hips 70 of the robot 1.

Origin Point: an orthogonal intersection point of the sagittal plane, coronal plane, and transverse plane, all of which extend through the humanoid robot disclosed herein. In the illustrative embodiment of the robot 1 shown in FIG. 7, an origin point ($C_P$) is present and shown.

Reference Axes: consist of: (i) the Z-axis (vertical) is defined pursuant to the intersection of the sagittal plane and coronal plane, (ii) the Y-axis (horizontal) is defined pursuant to the intersection of the coronal plane and transverse plane; and (iii) the X-axis (depth) is defined pursuant to the intersection of the sagittal plane and transverse plane. FIG. 7 illustrates example Z, Y, X reference axes where the sagittal, coronal, and transverse planes share a common origin point.

Kinematic Chain: a representation of an assembly of rigid bodies connected by joints to provide constrained motion. Within this application, e.g., FIG. 8, a kinematic chain is illustrated by cylindrical bodies, where the respective central axis of each individual cylindrical body represents the position and orientation of the axis of rotation for the individual joints. For example, each rotary actuator has a central rotational axis. Other types of actuators may include linkages that provide rotational movement about one or more rotational axes via linkages, bearing or other rotation features, or other means.

Range of Motion: a range of rotational motion of an actuator about an axis of rotation, where a first and second angle define a rotational limit in opposing rotational directions from a neutral position of the actuator with the limits expressed in Radians.

Degrees of Freedom (DoF): the number of parameters that define the configuration of the kinematic chain and possible movements associated therewith.

Singularities: geometric configurations of the robot's joints in which one or more degrees of freedom are effectively lost due to the alignment or overlap of rotational or translational axes, which in some cases is also affected by interference of extents of components where one or more of the components are moved by the joint.

Actuator Bearing: a specific component of the individual actuator that is generally ring-shaped with parallel edge guides, wherein the rotational axis ($A_n$) of the actuator is centered within the actuator bearing and orthogonal to the parallel edge guides. Within this application, the actuator bearings of individual actuators are referenced to further define orientation of the rotational axes and/or relative size of the individual actuator.

Actuator bearing plane ($B_n$): a plane defined mid-width of actuator bearing between parallel edge guides and orthogonal to the rotational axis ($A_n$).

Textile: a flexible (e.g., fabric-like), highly durable cover material that has high elastic stretch capabilities and is resistant to pilling, abrasions, and cuts. A textile includes both common textiles (e.g., traditional woven cloth), engineered textiles, and non-fabric-like materials (e.g., plastics or polymers), and/or a combination of the above.

C. Robot(s) and Environment

FIG. 1 illustrates an exemplary network and/or operational environment in which a humanoid robot (also referred to as a bipedal robot) 1, which is further detailed in additional figures herein, may operate. The environment may include a plurality of interconnected components, such as: (i) the humanoid robot 1, (ii) one or more other humanoid robots 2700A-X which may the same as or different from the robot 1, (iii) one or more machines 2710A-X, (iv) one or more command centers 2750A-X, (v) one or more remote artificial intelligence (AI) system(s) 2780 which are remote from the robot 1, such as a cloud-base AI system, and (vi) one or more data stores 2900. Each component may be interconnected with another component, directly or indirectly, by at least one of: (i) one or more networks 2999A-X, (ii) direct communication systems (not illustrated—e.g., a data store 2900 may have direct communication with a remote AI system 2780) and/or (iii) physical contact with one another (e.g., the humanoid robot 1 may be in direct physical contact when operating a machine 2710A-X). The one or more networks 2999A-X may include, for example, the Internet, a local area network, a wide area network, a private network, a cloud computing network, or a network based on a wireless communication protocol. Additionally, it should be understood that the humanoid robot 1 may be interconnected with one or more other humanoid robots 2700A-X through a wireless communication protocol, such as a Bluetooth connection or a connection based on a near-field communication protocol, or through a wired connection.

The humanoid robot 1 may be collocated with one or more of the other humanoid robots 2700A-X to collectively or separately perform a given task or workflow. Such operations may occur, e.g., at a worksite such as a factory, warehouse, industrial facility, or home. Furthermore, the humanoid robot 1 may also be situated in a separate geographical location relative to other humanoid robots 2700A-X. For example, the humanoid robot 1 may be located in a given worksite, while another humanoid robot 2700A-X is located at another worksite in a different geographical location.

The operational environment may generally include machines 2710A-X, which may be embodied as any device, heavy machinery, or object with which a humanoid robot 1 and/or other humanoid robots 2700A-X may interact. For instance, a machine 2710A-X can include, among other things, tools, packaging machinery, forklifts, drilling machines, pallet movers, HVAC equipment, carts, bins, and platform machines.

The command centers 2750A-X may be comprised of one or more physical computing devices or virtual computing instances executing on a local or cloud network. These centers 2750A-X may be utilized for one or more of monitoring, managing, and configuring tasks, as well as for issuing control directives to the humanoid robot 1 and other humanoid robots 2700A-X at one or more worksites. A command center 2750A-X may be collocated with any of the humanoid robot 1 or the other humanoid robots 2700A-X, or it may be located in a different geographical location from the robots 1 and other humanoid robots 2700A-X. The computing devices of the command centers 2750A-X may execute software that is used to monitor (e.g., charge level, task performance, etc.), manage the robots 1 and other humanoid robots 2700A-X, and/or transmit long-horizon goals, tasks, and control directives to the robots 1 and other humanoid robots 2700A-X over the networks 2999A-X. Additionally and as such, the humanoid robots 1 and other humanoid robots 2700A-X may each be configured to: (i) send data to the command centers 2750A-X, (ii) perform a given task based on the transmitted long-horizon goals, tasks, and control directives, and/or (iii) infer a task based on the transmitted long-horizon goals, tasks, and control directives.

The command centers 2750A-X may determine, based on available humanoid robots 1 and the capabilities of each robot, which of the robots may be best suited for a given task. For example, the command centers 2750A-X may identify a humanoid robot 2700A-X to transfer parts to the other room once they are placed in the jig. The command centers 2750A-X may thereafter relay the assignment to the assigned other humanoid robot 2700A-X, which may be identified based on a unique identifier (e.g., serial number) assigned to each of the humanoid robots 1 and 2700A-X, and also to the other humanoid robots 2700A-X to indicate which other humanoid robot 2700A-X has been assigned the task.

The remote AI system 2780 may be comprised of one or more computing devices that are configured to perform global operations related to AI/ML for the entire computing environment. For example, the remote AI system 2780 may store, retrieve, and otherwise manage data within the data store 2900. This data may include one or more AI models 2902, rules 2912, and training data 2920. The AI models 2902 may be embodied as any type of model that: (i) can be run in an environment that is remote from the humanoid robot 1 and 2700A-X, while being in communication with the humanoid robot 1 to enable the humanoid robots 1 and 2700A-X to perform the functions described herein (e.g., observing, reasoning, and performing tasks), (ii) can be sent to the humanoid robot 1 and 2700A-X, where the humanoid robot 1 and 2700A-X runs the model locally to perform the functions described herein, and/or (iii) can be used in the training of any model described herein. For instance, the AI models 2902 may comprise artificial neural networks, convolutional neural networks, recurrent neural networks, generative adversarial networks, variational autoencoders, diffusion models, transformer models, natural language processing models (e.g., speech-to-text and/or text-to-speech), object detection models, image segmentation models, facial recognition models, transfer learning models, autoregressive models, large language models, visual language models, vision-action models, multi-modal language models, graph neural networks, reinforcement learning models, or any other type of model known in the art or disclosed herein. The rules 2912 may be comprised of sets of rules and conditions that are used to enable: (i) deterministic behavior by the humanoid robot 1 and the other humanoid robots 2700A-X, (ii) training the models that enable the humanoid robots 1 and 2700A-X to perform the functions described herein, and/or any other known rule. For example, the rules 2912 may include any combination of finite state machines, reactive control protocols, safety rules, configuration files, task sequencing protocols, safety protocols, and/or protocols for compliance with standards, safety, morals and/or regulations.

The training data 2920 may be embodied as any type of data that is used to train one or more of the AI models 2902. For example, the training data 2920 may include: (i) image data, such as raw image data, annotated image data, or synthetic data comprising computer-generated images used to augment real image datasets, particularly in instances where usable data is scarce; (ii) video data, such as raw video data, annotated video data, or synthetic data; (iii) text data, such as natural language instructions, dialogue data, machine-readable instructions, or natural language mapping data; (iv) depth data, such as map data or point cloud data; (v) robot joint trajectories; (vi) robot joint locations; (vii)

robot joint location data, which may be obtained from teleoperation of a robot; (viii) robot joint rotations data, which may also be obtained from teleoperation of a robot; (ix) other robot sensor data, such as inertial measurement unit (IMU) data, force and torque data, or proximity sensor data; (x) simulation data; (xi) human demonstration data, such as first person or third person images or videos of humans performing a task; (xii) robot demonstration data, such as images or videos of other robots performing a task; (xiii) any combination of the aforementioned data types; and/or (xiv) any other known data type. For clarity, it should be understood that any data type that is described above may be either labeled or unlabeled.

The remote AI system 2780 may include a data augmentation engine 2782, a training engine 2790, and a simulation engine 2800. The data augmentation engine 2782 may be embodied as any combination of hardware, software, or circuitry that is configured to increase the size and diversity of the training data 2920, particularly in instances where the training data is limited. For example, the data augmentation engine 2782 may be configured to perform: (i) image augmentation of visual data such as images and video frames (e.g., identifying anatomical point and/or kinematic chains), (ii) sensor data augmentation to simulate real-world inaccuracies like noise, thereby assisting in training the AI models 2902 to account for such inaccuracies, (iii) trajectory augmentation to modify the speed or timing of movements, which assists the AI models 2902 in learning to recognize and adapt to different behaviors, or to alter the trajectories or paths of the robot 1 in simulations, and (iv) domain randomization, which involves altering parameters including textures, lighting, and object positions.

The illustrative training engine 2790 may be embodied as any combination of hardware, software, or circuitry for training the AI models 2902, given a set of rules 2912 and training data 2920. To do so, the training engine 2790 may apply a variety of AI/ML techniques, such as supervised learning techniques (e.g., classification, regression), unsupervised learning techniques (e.g., clustering, dimensionality reduction, anomaly detection), semi-supervised learning techniques (e.g., training with both labeled and unlabeled data), reinforcement learning techniques (e.g., model-free methods, model-based methods), ensemble learning, active learning, and transfer learning techniques (e.g., by leveraging pre-trained models 2902). It should be understood that each of these techniques may be applied online or offline.

The simulation engine 2800 may be embodied as any combination of hardware, software, or circuitry for executing one or more of the AI models 2902 within a virtualized simulation environment. This allows for the simulation and analysis of various aspects of the humanoid robot 1, such as its kinematics, sensor behavior, overall behavior, anomalies, and the like. For example, the simulation engine 2800 may generate the simulation environment based on real-world mapping data that was previously observed and/or generated by the humanoid robot 1 or other humanoid robots 2700A-X, or that was obtained from third-party services. The simulation engine 2800 may also generate a physics-accurate model of the humanoid robot 1, which has a specified configuration (e.g., a physical structure, joints, sensors, actuators, and other components with predefined parameter sets). The data generated from the simulations may then be used by the training engine 2790 to build, train, alter, fine-tune, or modify a previously generated model, a new model, and/or rules. Advantageously, the simulation engine

2800 is designed to improve efficiencies in the manufacture, testing, and deployment of a given humanoid robot 1 for a specified purpose.

The remote AI system 2780 may account for the substantial computing and resource demands required by AI/ML-based techniques by processing at least a portion of data, requests, and/or training. As such, the humanoid robots 1 may be configured with considerably less powerful compute, network, and storage resources. For instance, the humanoid robot 1 may prioritize certain processes, such as those relating to the performance of a presently assigned task, and offload other processes, such as the refining of local AI/ML models, to the remote AI system 2780. The remote AI system 2780 may also periodically update the humanoid robots 1 and 2700A-X with refined AI models 2902 and training data 2920, or it may receive updates and propagate them to the robots 1, for instance, via over-the-air updates or push subscription-based updates. The remote AI system 2780 may also push updated rules 2912 to the robots 1 and 2700A-X. Additionally, the remote AI system 2780 may receive data from each of the humanoid robots 1 and 2700A-X, which may include behavioral information, learning information, model reinforcement data, and the like. The remote AI system 2780 may store such data as training data 2920 and subsequently use this data to refine the AI models 2902.

Although FIG. 1 depicts the data augmentation engine 2782, the training engine 2790, and the simulation engine 2800 as executing on a single remote AI system 2780, one of skill in the art will recognize that each of these engines may execute on separate systems or computing nodes associated with the remote AI system 2780. Such an arrangement may be advantageous in improving the performance and resource management of each of the engines 2782, 2790, and 2800.

D. Humanoid Robot

Figure 2:
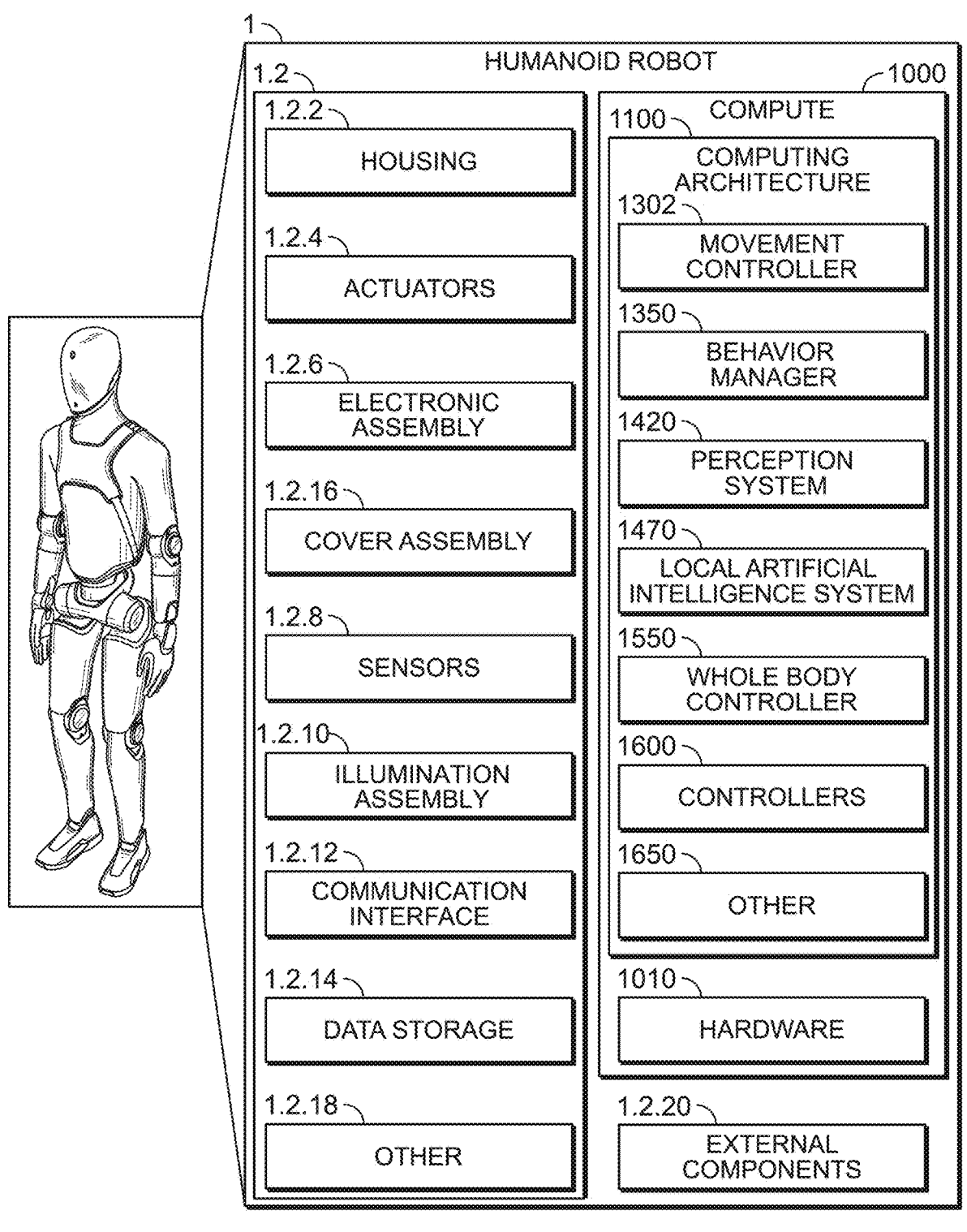
FIG. 2 is a block diagram illustrating components of the humanoid robot of FIG. 1.

FIG. 2 is a block diagram of a humanoid robot 1 that includes a variety of architectures and other components that may include: (i) a mechanical/electrical architecture 1.2 that includes housings 1.2.2, actuators 1.2.4, electronic assembly 1.2.6, sensors 1.2.8, communication interface 1.2.12, illumination assembly 1.2.10, data storage 1.2.14, exterior covering assembly 1.2.16, external components 1.2.20, other components 1.2.18, and (ii) compute 1000 that includes a computing architecture 1100 including instructions to be executed on computing hardware 1010 comprising at least one processor.

a. Humanoid Robot Configuration

The high-level configuration for the robot 1 includes assemblies that function together to provide the robot with a humanoid shape and enable said robot to perform human-like movements. As such, the structures and kinematic principles that are inherent to non-humanoid systems cannot be simply adopted or implemented into a humanoid robot 1 without undergoing careful analysis and empirical verification against the complex realities of design, testing, and manufacturing. Theoretical designs that attempt such direct modifications are insufficient, and in some instances woefully insufficient, because they amount to mere design exercises that are not tethered to the complex realities of successfully creating a functional, general-purpose humanoid robot.

i. Robot Components

In addition to the general systems, assemblies, components, and parts described above, the humanoid robot 1 in the illustrative embodiment shown in FIG. 7 may include the following systems, assemblies, components, and parts, which can be broadly categorized into three regions. As shown in FIG. 7, these three regions include: (i) an upper portion 2, which includes a head and neck assembly 10, a torso 16, left and right arm assemblies 5, and left and right hands 56; (ii) a central portion 3, which includes a spine 60, a pelvis 64, and left and right upper leg assemblies 6.1 of left and right leg assemblies 6; and (iii) a lower portion 4, which includes left and right lower leg assemblies 6.2 of leg assemblies 6.

In the illustrative embodiment shown in FIG. 7, each arm assembly 5 may include a shoulder 26, an upper humerus 30, a lower humerus 36, an upper forearm 40, a lower forearm 46, and a wrist 50. The hand 56 is coupled to the wrist 50. Each leg assembly 6 may include: (i) an upper leg assembly 6.1, which may comprise a hip 70, an upper thigh 76, and a lower thigh 80, and, (ii) a lower leg assembly 6.2, which may comprise a shin 84, a talus 88, and a foot 92. In other embodiments, some of these systems, assemblies, components, or parts may be omitted, combined, or replaced with alternative designs.

1. Head and Neck Assembly

The head and neck assembly 10 of the humanoid robot 1 may be designed to enhance its anthropomorphic characteristics, while also providing functional capabilities that support interaction, perception, and communication. The head and neck assembly 10 is coupled to a torso 16 and possesses an overall shape that generally resembles the general shape of a human head. The head and neck assembly 10 is, however, specifically designed to lack pronounced human facial structures, such as checks, eye protrusions, a mouth, or other moving parts, to maintain a non-humanlike appearance. The exterior surface of the head 10.1 is characterized by an absence of large flat surfaces (e.g., the head 10.1 is not a cube or prism) and the head is also not formed with significant cylindrical features or perfect circles. Instead, almost all exterior surfaces of the head 10.1 are curvilinear or contain substantial curvilinear aspects, which presents a generally egg-shaped appearance when viewed from the front or top.

Structurally, the head 10.1 is symmetrical about the sagittal plane $P_S$ but is asymmetrical about Z-Y and X-Y planes that intersect the head and are parallel to the coronal plane ($P_C$) and the transverse plane ($P_T$), respectively. The width (parallel to the y-axis) and depth (parallel to the x-axis) of the head 10.1 change constantly from top to bottom, reaching a maximum dimension in the temple region, which is located at approximately 30-50% of the head's height from its top end.

The head 10.1 itself may house a range of components, such as high-resolution cameras, microphones, and displays, all of which are contained within an impact-resistant polymer shell 102.2. This shell 102.2 includes a large, freeform (i.e., not conforming to a regular or formal structure or shape) frontal shield 102.4 that covers the frontal and crown regions of the head 10.1. The frontal shield 102.4 is formed as a separate and distinct piece from the displays positioned behind it, thereby protecting the displays and internal electronics from damage. This separation provides a significant advantage during the performance of industrial tasks, as a damaged frontal shield 102.4 is substantially cheaper and easier to replace than a damaged display. The frontal shield 102.4 extends rearward beyond an auricular region into an occipital region and extends down to a chin region, but it does not extend below a jaw line.

Cameras embedded within the head 10.1 may include RGB, depth-sensing, thermal imaging capabilities and/or any other cameras disclosed herein, which are designed to enable the humanoid robot 1 to perform tasks such as object recognition, environmental mapping, and facial expression analysis. For the specific purpose of generating a low-latency Virtual Reality (VR) view, a pair of high-resolution, high-frame-rate RGB cameras with global shutters may be utilized. For example, this pair of cameras may be the vertically arranged cameras 108.2.2 and 108.2.4, or they may be horizontally arranged internal/external cameras. Microphones may be arranged in an array to facilitate directional audio input and noise cancellation, which enhances the ability of the humanoid robot 1 to understand and respond to verbal commands.

Displays integrated into the head 10.1 may serve as user interfaces, providing visual feedback or conveying expressions to improve communication and user engagement. Unlike the heads of conventional robots, the disclosed head 10.1 includes a main display 108.4 that is curved in at least one direction and is positioned at an angle relative to a sagittal plane. This curved design permits the inclusion of a larger display with a greater surface area compared to a flat screen, which increases the amount of information that can be conveyed, such as robot status and sensor data. This information is displayed using generic blocks or shapes rather than anthropomorphic features like eyes or a mouth. In addition to the main display 108.4, two side-facing displays are included to show indicia such as the identification number/serial number, battery life, current task, any required safety indicia, and/or any other information associated with the humanoid robot 1.

Further, an extent of the illumination assembly 1.2.10, which comprises a plurality of light emitters, is positioned adjacent to an edge (e.g., lower) of the frontal shield 102.4. These light emitters may be configured to function as indicator lights to communicate the status of the robot 1 to nearby humans—for instance, by emitting light that appears to humans in different colors (e.g., yellow for working, green for idle, red for an error state, or blue for thinking) or illumination sequences—without relying on the main displays. This method of communication may be more power-efficient than displays, and may relay information more rapidly.

Additionally, the head 10.1 may house: (i) other sensors, such as gyroscopes and accelerometers, (ii) heat management systems (e.g., heat pipes, fans, etc.), (iii) wireless communication modules (e.g., 5G cellular, Wi-Fi, Bluetooth) and antennas. To maximize bandwidth and ensure connectivity, a plurality of 5G cellular radios may be positioned in the torso 16 and wired through the neck to the antennas in the head 10.1. The head and neck assembly 10 may also incorporate advanced materials and shock-absorbing structures to protect the sensitive electronic components housed within, which may improve the overall durability and reliability of the humanoid robot 1.

The head and neck assembly 10 may include two primary actuators: a head twist actuator (J8.1) 120, which is responsible for enabling rotational movement of the head 10.1 about axis $A_{8.1}$, which is a vertical (yaw) axis when the robot is in the neutral state, and a head nod actuator (J8.2) 140, which enables rotation of the head 10.1 about the axis $A_{8.2}$, which is a horizontal axis when the robot is in the neutral state. Together, these two actuators may provide two degrees of freedom for the head 10.1, allowing it to perform movements that emulate natural human head motions. The head twist actuator (J8.1) 120 may be positioned within the head and neck assembly 10, while the head nod actuator (J8.2) 140 may be located at the base of the neck. This head twist actuator (J8.1) 120 and head nod actuator (J8.2) 140 may each utilize a motor, a gear reduction system, and sensors or encoders that are similar to the actuator types discussed herein.

The head actuators, J8.1 and J8.2, may work in coordination to position the head 10.1 accurately, enabling the humanoid robot 1 to track objects, focus on specific areas of interest, or maintain eye contact during human-robot interactions. The actuators may be controlled, in conjunction with input from visual and inertial sensors, to execute smooth, human-like movements. For example, the head twist actuator (J8.1) 120 may rotate the head 10.1 to follow a moving object, while the head nod actuator (J8.2) 140 adjusts the pitch to maintain an optimal viewing angle.

Variations of this design may include the addition of a third actuator to provide roll motion, which would further increase the range of movement of the head 10.1 to three degrees of freedom (3-DoF) and could enable more expressive head gestures, such as tilting the head sideways to convey curiosity or empathy. Alternatively, for specialized applications, the actuators (J8.1) and/or (J8.2) may be replaced with compact linear actuators or parallel-link mechanisms.

Additionally, variations of head 10.1 may include modular head designs that allow for the quick customization or replacement of sensory and communication components. These modular designs may facilitate easy upgrades or modifications to the capabilities of the humanoid robot 1 without requiring extensive changes to the overall head and neck assembly 10. Furthermore, advanced control algorithms may be implemented to enable more natural, biomimetic head movements, potentially incorporating machine learning techniques to adapt and refine the motion patterns of the head 10.1 based on interaction data and environmental feedback.

2. Torso

The torso assembly 16 is a central component within the humanoid robot 1, extending vertically between the waist and the head and neck assembly 10, and horizontally between the shoulders 26. The torso 16 is designed to provide the robot 1 with a generally humanoid shape, offer structural and operable support for the arm assemblies 5 and the head and neck assembly 10, and house and protect internal components, including the arm actuators (J1) 190 and an electronics assembly 1.2.6 housed at least partially within the torso 16.

The electronics assembly 1.2.6 contained primarily within the torso 16 includes various interconnected components that are essential for the operation of the robot 1, including the battery pack, the compute 1000 (which includes CPUs and GPUs), power distribution unit, and a charging system. The components are strategically positioned to optimize space and balance. The battery pack may be rearwardly offset, positioned in a rear section of the torso 16, while the compute 1000 is placed in a forward section. This spatial distribution helps to maintain a balanced posture, allows for efficient cooling, and maximizes the size and power density of the battery pack. A cooling system may be integrated between the battery pack and the compute 1000 to manage their respective thermal loads. The electronics assembly 1.2.6 may be designed with modularity to facilitate easier maintenance, repair, and upgrades. The charging system may support both wired and wireless protocols. A wired system might use a docking station, while a wireless system could utilize inductive charging, with coils that may be embedded in a housing 1.2.2 and/or the feet 92. The charging system may also include safety features such as overcharge protection and temperature monitoring.

The torso 16 may have a total volume of more than 10 liters, preferably more than 15 liters, and most preferably more than 20 liters. However, the torso 16 has a total volume that is less than 40 liters and most preferably less than 30 liters. The torso 16 also has an uninterrupted internal height that is more than 250 mm, and is preferably near to 300 mm, but is less than 350 mm. This substantial internal volume may accommodate a battery pack that exceeds 2 liters, preferably more than 4 liters, and most preferably more than 6 liters in capacity. Consequently, the humanoid robot 1 may incorporate a battery pack with a capacity exceeding 2.5 kWh, which may provide an operational runtime of over 3.5 hours under normal conditions, and preferably more than 4.5 hours, and most preferably more than 6 hours. In some implementations, the torso 16 may adopt a quasi-trapezoidal prism configuration, wherein its front surface is smaller than its back surface, with angled side shrouds connecting these two sections. This geometric design may enhance the range of motion of the robot 1, particularly by improving its ability to reach across its own body.

3. Arm Assemblies

The arm assemblies 5 include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the arm assembly may incorporate features such as hard-stops, cooling channels, heat sinks, or other materials, structures, components, or assemblies described herein. For example, a heat pipe may extend from the hand to the lower forearm. Furthermore, the wrist 50 may include a quick-release mechanism that enables the interchange of different end-effectors or tools. Moreover, the housing of each component may be designed with internal reinforcement structures, may be made from various materials (e.g., metal alloys or advanced materials like carbon-fiber-reinforced polymers).

4. Leg Assemblies

The leg assemblies 6 include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the leg assembly may incorporate features such as hard-stops, cooling channels, heat sinks, or other materials, structures, components, or assemblies described herein. For example, a heat pipe may extend from the knee to the shin 84. Furthermore, the talus 88 may include a quick-release mechanism that enables the interchange of a different foot 92. Moreover, the housing of each component may be designed with internal reinforcement structures, may be made from various materials (e.g., metal alloys or advanced materials like carbon-fiber-reinforced polymers).

To enhance the stability and adaptability of the humanoid robot 1, the leg assemblies 6 may incorporate advanced sensing and control systems, as well as comprehensive protective systems. For instance, force sensors located in the feet 92 and ankles may provide real-time feedback on ground contact forces and pressure distribution. This data may be used by the control system of the humanoid robot 1 to make rapid adjustments in order to maintain balance, especially when moving on uneven or dynamic surfaces. Inertial measurement units (IMUs) positioned in the leg assemblies 6 and the pelvis 64 may also provide crucial information on the orientation and acceleration of each leg segment, thereby allowing for the precise control of leg positioning during movement.

ii. Kinematics a. Upper Portion

As illustrated in, e.g., FIGS. 7-13, an upper portion of the torso 16 is designed to receive and secure two arm actuators (J1) 190 each arm assembly 5 extends from its respective arm actuator (J1) 190 and comprises a series of actuators that are arranged to provide extensive mobility and dexterity. Each arm actuator (J1) 190 is engineered to provide the principal rotational movement for the entire respective arm assembly 5. Each arm actuator (J1) 190 may utilize a motor, a gear reduction system, and sensors or encoders that are similar to other actuators in the robot 1, but potentially with a larger motor and a different gear ratio that is specifically optimized for high-torque shoulder movements.

The rotational axis $A_1$ of the arm actuator (J1) 190 is oriented at a rearward angle ($\alpha$) with respect to a vertical or coronal plane ($P_C$). This angle $\alpha$ is intentionally selected such that the rotational axis $A_1$ is neither orthogonal nor parallel to the other arm axes ($A_2$~$A_7$) and $\alpha$ is chosen from a range of between 1 and 45 degrees, with a preferred range between 10 and 20 degrees, and most preferably between 12 and 18 degrees. This specific rearward angle strategically positions a primary kinematic singularity of the arm 5 in the illustrative embodiment of robot 1 at a location that is away from the intended primary operational workspace of the robot 1. This configuration is beneficial because it places that singularity of the robot's arm 5 in a location that is outside of the volume of normal use for the tasks that the robot 1 is designed to perform. For example, when the robot 1 holds an object with a narrow grip directly in front of its torso 16, it is significantly less likely to encounter this performance-degrading singularity.

Generally, an upper portion of the arm assembly 5 includes three actuators (shoulder actuator J2, upper arm twist actuator J3, elbow actuator J4), while a lower portion of said arm assembly 5 includes three actuators (lower arm twist actuator J5, wrist flex actuator J6, wrist pivot actuator J7). The rotational axes $A_2$ of the shoulder actuator (J2) 280 and $A_4$ of the elbow actuator (J4) 374, respectively, are arranged such that they are orthogonal to the rotational axis $A_3$ of the upper arm twist actuator (J3) 320. In addition, the rotational axis $A_3$ is collinear with the rotational axis $A_5$ of the lower arm twist actuator (J5) 468 when the arm 5 is fully extended, forming a continuous axis for axial rotation along the length of the arm. The rotational axis $A_4$ of the elbow actuator (J4) 374 is oriented orthogonal to the collinear rotational axes $A_3$ and $A_5$ when the arm 5 is in the extended configuration. Additionally, the axis $A_4$ is offset rearward along the X-axis from a common chord that is defined by the alignment of $A_3$ and $A_5$, with this offset measuring between 1 mm and 50 mm, preferably between 5 mm and 25 mm. This rearward placement of the elbow axis $A_4$ increases its range of motion.

Referring to FIGS. 16-20 and 47, the actuator bearing 324.6 of the upper arm twist actuator (J3) 320 may be at least 10% larger, preferably at least 25% larger, and most preferably approximately 40% larger in radius than the actuator bearing 472.6 of the lower arm twist actuator (J5) 468. the upper arm bearing 324.6 may have a radius between 40 mm and 80 mm, while the lower arm bearing 472.6 may have a radius between 25 mm and 50 mm. This size differential may address specific mechanical and functional requirements: the larger bearing 324.6 in the upper arm twist actuator (J3) 320 may accommodate higher torque loads typically encountered in the upper arm 30, while the smaller bearing 472.6 in the lower arm twist actuator (J5) 468 may facilitate a more compact and slender forearm 46 design that reduces the distal mass of the arm assembly 5. This tapered configuration enhances the anthropomorphic appearance of the arm 5 and reduces the moment of inertia by approximately 15% to 30%, enabling faster and more energy-efficient movements during high-velocity operations.

Figure 20:
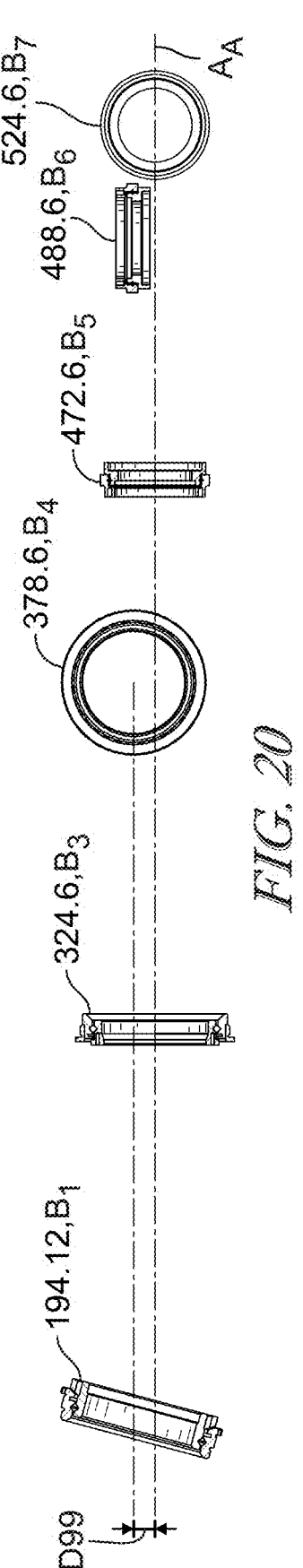
FIG. 20 is a cross sectional view of the actuator bearings contained in the right arm assembly and taken along line 20-20 in FIG. 16.

The elbow actuator (J4) 374 may introduce an offset in the kinematic chain of the arm assembly 5, with its axis $A_4$ oriented perpendicular to both axis $A_3$ and axis $A_5$ when the arm 5 is in the extended configuration. This orthogonal configuration may mimic the primary degree of freedom of the human elbow, enabling flexion and extension motions through a range of 0 to 150 degrees. As shown in FIG. 20, the center of the actuator bearing 378.6 of the elbow actuator (J4) 374 may be offset from the axis connecting the upper arm twist actuator (J3) 320 and the lower arm twist actuator (J5) 468 by at least 1 mm, preferably between 5 mm and 30 mm, and most preferably between 10 mm and 20 mm. This offset may facilitate a hyperextension capability of the elbow joint, potentially enabling a −15-degree positioning angle, and may improve the arm's versatility in confined spaces and tasks requiring backward reach. Structural accommodations, such as recessed areas in the lower humerus 36 and upper forearm 40 with depths ranging from 5 mm to 25 mm, may ensure that this hyperextension does not compromise mechanical integrity. As an alternative, the actuator bearing 378.6 of the elbow actuator (J4) 374 may not be offset, and/or the elbow joint could employ spherical plain bearings to allow multi-axis rotation and provide additional flexibility with up to ±5 degrees of off-axis movement. The actuator bearing plane $B_4$ is positioned along the mid-width of actuator bearing 378.6 and may be offset along the Z-axis from the center of axes $A_3$ and $A_5$ by a distance ranging from 5 mm to 40 mm. This Z-axis offset may contribute to the humanoid appearance of the arm assembly 5, potentially aligning the upper humerus 30 with the lower forearm 46 to replicate natural human arm proportions. Also, the deliberate reduction in the size of the actuator bearing 472.6 of the lower arm twist actuator (J5) 468 to less than 60% of the radius of the actuator bearing 324.6 of the upper arm twist actuator (J3) 320 may help create a more slender forearm profile.

The three actuators (J5, J6, J7) situated in the lower portion of the arm are arranged with their respective axes ($A_5$, $A_6$, and $A_7$) mutually orthogonal to one another, which provides three degrees of freedom and enables complex orientation of the lower arm and the hand 56. This arrangement allows for control of roll via the lower arm twist actuator (J5) 468, pitch via the wrist flex actuator (J6) 484, and yaw via the wrist pivot actuator (J7) 520, thereby governing the final position and orientation of the hand 56 with six total degrees of freedom from the shoulder. In the wrist 50, the rotational axis $A_5$ of the lower arm twist actuator (J5) 468 is positioned orthogonal to the rotational axis $A_7$ of the wrist pivot actuator (J7) 520. The elbow axis $A_4$ and the wrist pivot axis Az are parallel to one another in the extended state but are not aligned within the same ZY-plane, with an offset distance ranging from 10 mm to 100 mm, preferably between 30 mm and 70 mm.

The spatial arrangement of actuators (J5-J7) in the lower arm, namely the lower arm twist actuator (J5) 468, the wrist flex actuator (J6) 484, and the wrist pivot actuator (J7) 520, within the arm assembly 5 of robot 1 represents a sophisticated kinematic design that optimizes functionality, range of motion, and biomimetic properties. As illustrated in FIGS. 16-20, the axis As of the lower arm twist actuator (J5) 468 is perpendicular to the axis $A_7$ of the wrist pivot actuator (J7) 520. This design allows for independent control of forearm rotation and wrist pivoting, enabling complex manipulations that closely mimic human wrist movements. Additional alternatives to this configuration could include the use of non-orthogonal axes to create asymmetric rotational ranges.

The wrist flex actuator (J6) 484 includes an axis $A_6$ that is perpendicular to both axis As of the lower arm twist actuator (J5) 468 and axis $A_7$ of the wrist pivot actuator (J7) 520, creating a three-dimensional rotational capability that closely mimics the human wrist's range of motion. The center of the actuator bearing 488.6 of actuator (J6) 484 is strategically offset (by at least 1 mm, preferably between 3 mm and 15 mm) from the axis connecting the centers of the actuator bearing 472.6 of actuator (J5) 468 and the actuator bearing 524.6 of actuator (J7) 520. The wrist flex actuator (J6) 484 is positioned forward of both the lower arm twist actuator (J5) 468 and the wrist pivot actuator (J7) 520 by a distance ranging from 10 mm to 50 mm. This configuration may enable a greater range of wrist flexion and extension while maintaining a compact form factor with an overall wrist assembly length under 150 mm.

The perpendicular orientation of axis $A_6$ relative to axes $A_3$-$A_5$ and $A_7$, combined with its non-alignment with axes $A_1$-$A_2$, creates a complex rotational workspace for the wrist 50. This arrangement allows the wrist 50 to perform intricate movements for fine manipulation tasks while avoiding kinematic singularities that could limit the arm's dexterity. Variations of this design may include modular actuators that can be easily replaced or reconfigured to suit different applications. The forward offset of the center of the actuator bearings 378.6 for axis $A_4$ from the common chord may contribute to a more anthropomorphic arm profile while also potentially reducing the moment of inertia around the primary arm rotation axis.

Figure 18:
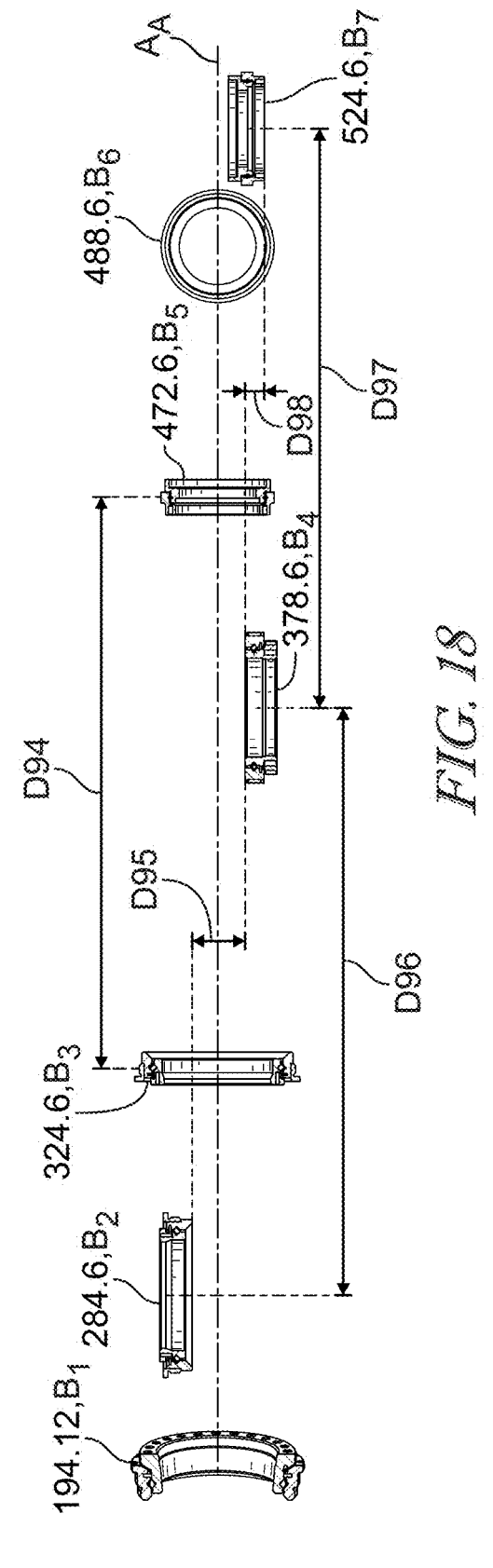
FIG. 18 is a cross sectional view of the actuator bearings contained in the right arm assembly and taken along line 18-18 in FIG. 16.
Figure 19:
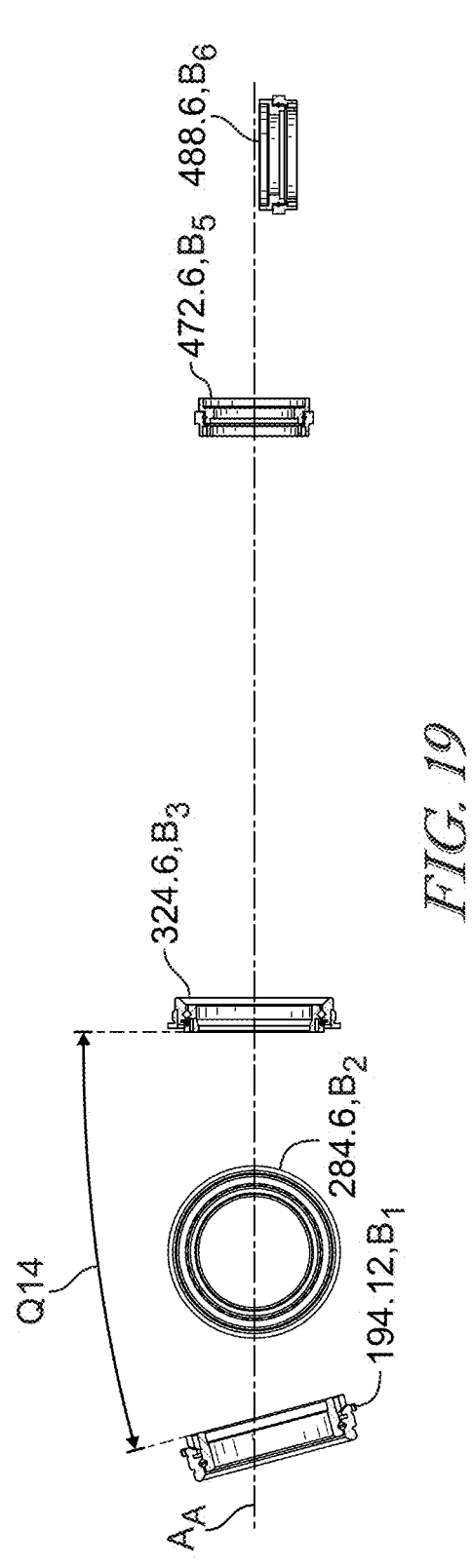
FIG. 19 is a cross sectional view of the actuator bearings contained in the right arm assembly and taken along line 19-19 in FIG. 16.

As shown in FIG. 18, the wrist pivot actuator (J7) 520 includes a bearing plane $B_7$ and the elbow actuator (J4) 374 includes the actuator bearing plane $B_4$ that are substantially parallel, where axis $A_4$ of the elbow actuator (J4) 374 is parallel with axis $A_7$ of the wrist pivot actuator (J7) 520. This alignment creates a kinematic linkage between the elbow and wrist movements, potentially allowing for more natural and coordinated arm motions. The spatial relationship between the elbow actuator (J4) 374 and the wrist pivot actuator (J7) 520 is such that if the actuator bearing 378.6 of (J4) 374 were translated along the Y-axis by 100 mm to 200 mm, moved rearward along the X-axis by 20 mm to 50 mm, and reduced in size by 40% to 60%, it would occupy nearly the identical position as the wrist pivot actuator (J7) 520. This relationship may facilitate simplified control algorithms and more intuitive motion planning for complex arm movements.

As illustrated in FIG. 20, the overall arrangement of actuator axes $A_3$, $A_5$, and $A_7$ along a common chord creates a unified kinematic chain through the arm 5. Axis $A_3$ and axis $A_5$ are co-linear, providing a continuous rotational axis for arm twisting movements, while axis $A_7$ is perpendicular to axes $A_3$ and $A_5$, enabling wrist pivoting. This configuration allows for smooth, coordinated movements that can seamlessly transition between different arm postures. In alternative designs, additional actuators or passive compliance mechanisms could be integrated along these axes to provide enhanced adaptability or energy efficiency during operation. For example, spring-loaded mechanisms or dampers with damping coefficients between 0.1 and 10 N·s/m could be used to minimize energy consumption during repetitive tasks. The forward offset of axis $A_4$ from the common chord containing axes $A_3$, $A_5$, and $A_7$ is a design element that enhances the arm's range of motion, particularly in flexion and extension movements. While axes $A_4$ and $A_7$ are parallel with one another, their non-alignment in the same Z-plane, with an offset ranging from 20 mm to 80 mm, contributes to the arm's ability to achieve more human-like postures and movements. This offset may be adjusted in alternative configurations to accommodate specific task requirements, such as increased reach or compact storage profiles. Additionally, automated adjustment mechanisms could be integrated to modify the offset dynamically during operation, optimizing the arm's performance in varying environments.

The humanoid robot 1 may further include head and neck actuators to complete its human-like form. For example, a head twist actuator (J8.1) 120 with a rotational axis $A_{8.1}$ and a head nod actuator (J8.2) 140 with a rotational axis $A_{8.2}$ may be included to provide two degrees of freedom (e.g., yaw and pitch, respectively) to orient sensors, cameras, or displays that are housed within the head 10.1. Although the head 10.1 and neck are not intended to manipulate objects, the head 10.1 completes the human-like form and may contain components such as stereo cameras for depth perception, displays for user interaction, or other sensor suites. The head twist actuator (J8.1) 120 and the head nod actuator (J8.2) 140 may be used to direct the field of view of one or more cameras or sensors that are contained within the head 10.1 and may cooperate with each other, but they are not generally kinematically linked to other actuators in the robot's 1 kinematic chains.

The alignment and positioning of these actuators and bearings may be achieved through advanced manufacturing techniques, such as five-axis CNC machining and coordinate measuring machine (CMM) verification. Tight tolerances, potentially on the order of ±0.01 mm for mating surfaces, may be utilized to ensure proper function and longevity of the arm assembly 5. Advanced robotic assembly processes and real-time quality assurance systems could further optimize the alignment and integration of these components. In summary: (i) axes $A_3$, $A_5$, and $A_7$ may be substantially aligned along a common chord, wherein axes $A_3$ and $A_5$ may be co-linear and axis $A_7$ may be perpendicular to axes $A_3$ and $A_5$, (ii) axis $A_4$ may be offset forward of said common chord, (iii) axes $A_4$ and $A_7$ may be parallel with one another, but may not be aligned in the same Z-plane, (iv) axis $A_6$ may not be aligned with axes $A_1$-$A_2$ and may be perpendicular to axes $A_3$-$A_5$ and $A_7$, (v) the center of the actuator bearings 378.6 for axis $A_4$ may be offset forward of said common chord; and (vi) any other calculations, ratios, comparisons, or information that can be gathered from the figures disclosed herewith.

b. Central Portion

Figures 35, 36:
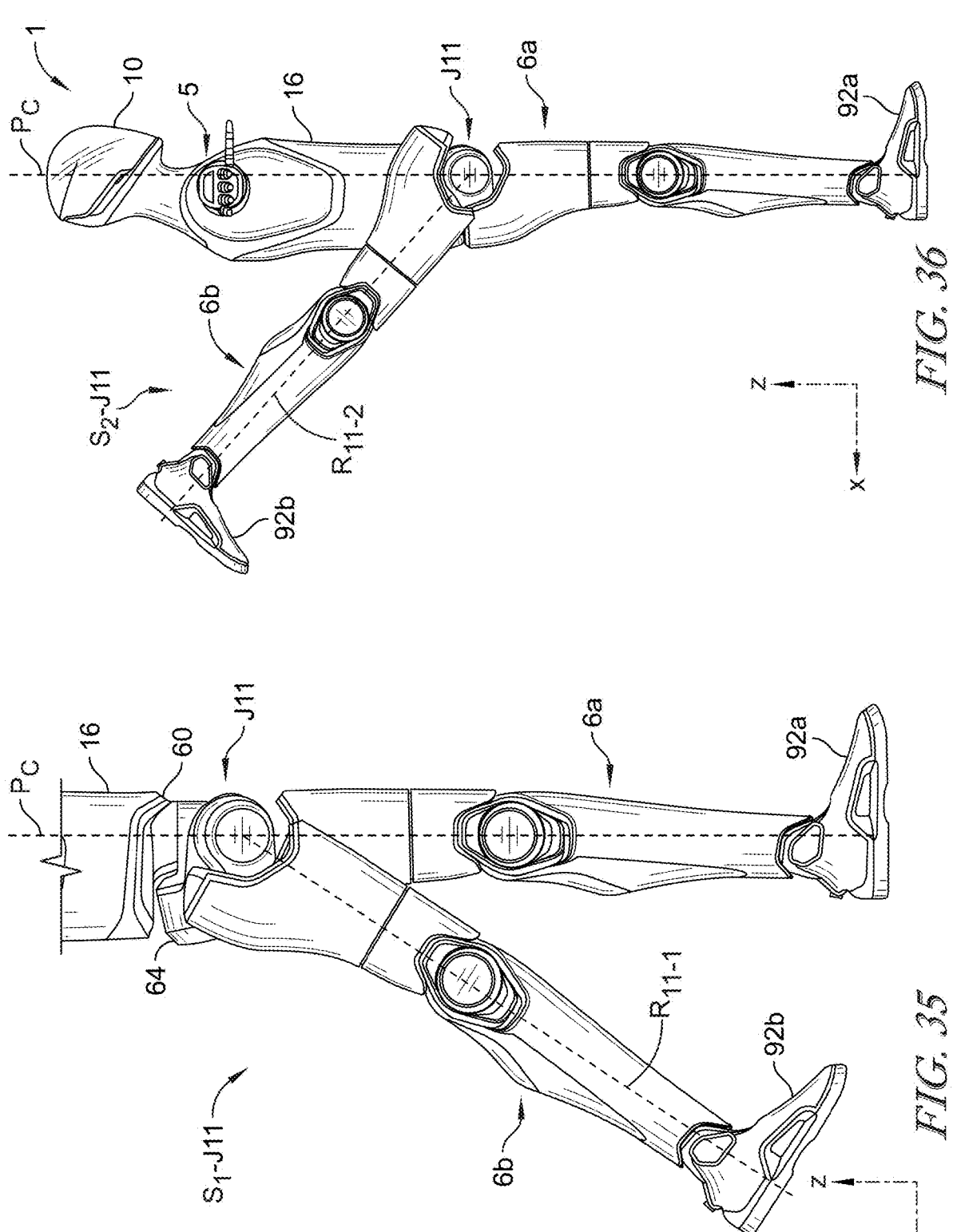
FIG. 35 is a right side view of a central and lower portion of the robot of FIG. 9, where the hip flex actuator (J11) is rotated to a first limit angle.
FIG. 36 is a right side view of a portion of the right arm of the robot of FIG. 9, where the hip flex actuator (J11) is rotated to a second limit angle.
Figure 44:
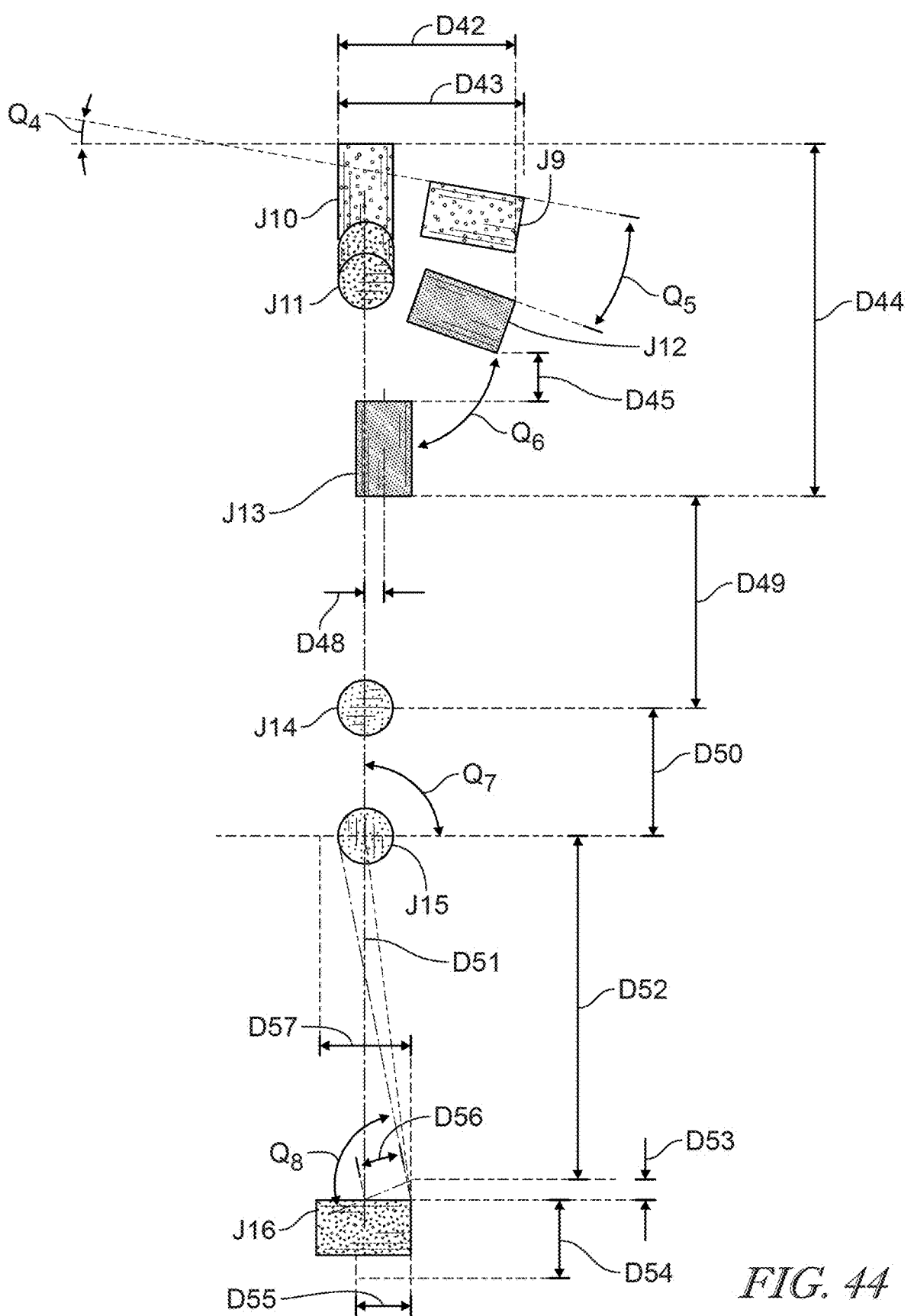
FIG. 44 is a left side view of the actuators contained central and lower portions of the robot of FIG. 7, along with dimensions associated therewith.
Figure 46:
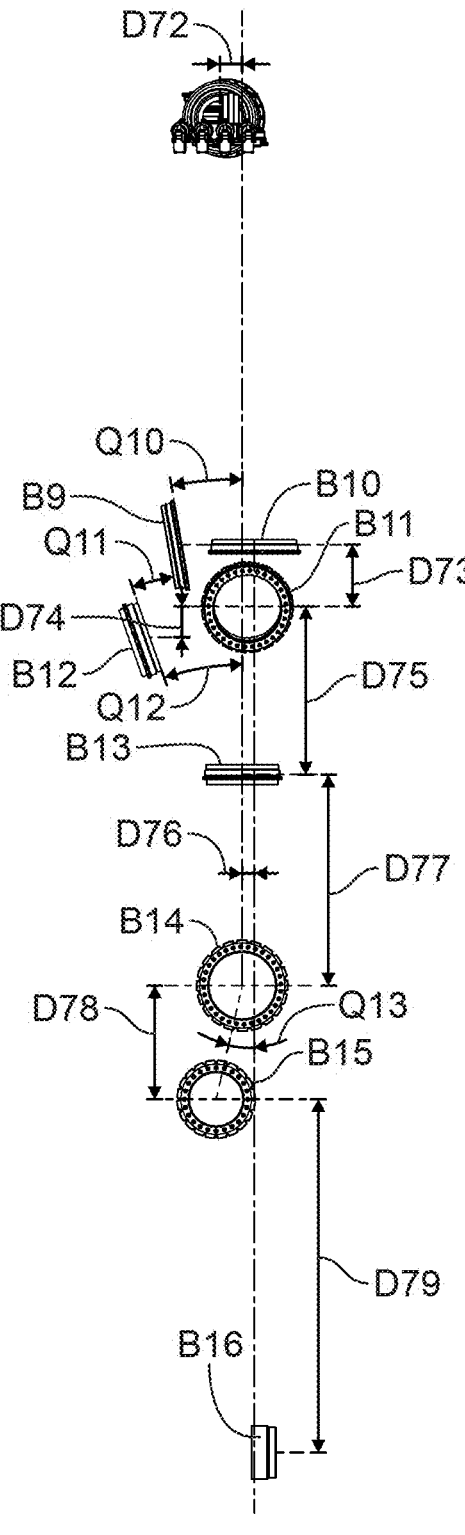
FIG. 46 is a right side view of the actuator bearings contained in the robot of FIG. 25.
Figure 47:
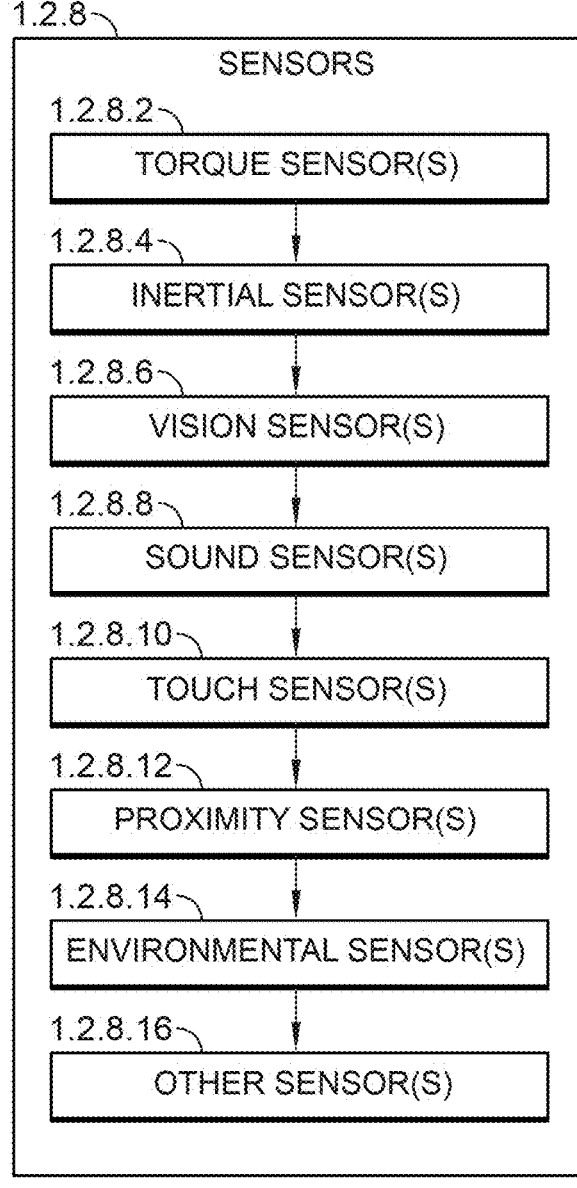
FIG. 47 is a block diagram of sensors for the humanoid robot of FIG. 1.
Figure 48:
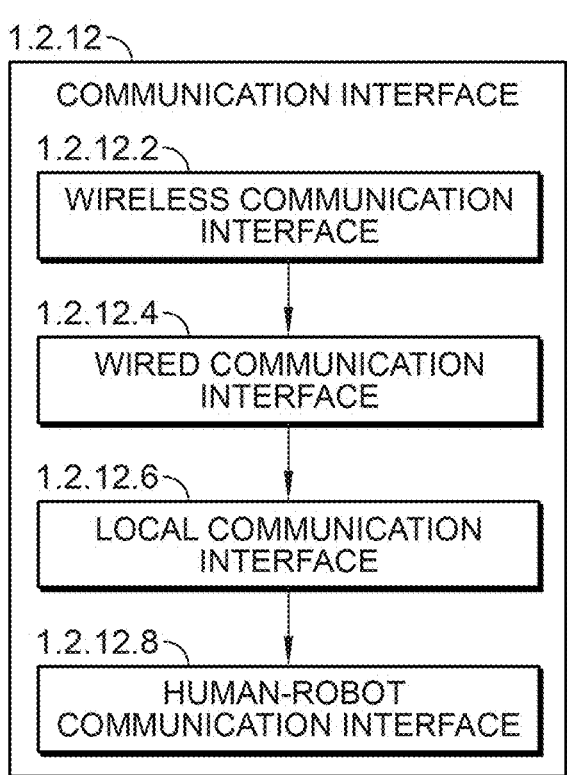
FIG. 48 is a block diagram of a communication interface for the humanoid robot of FIG. 1.

FIGS. 35-36 show the arrangement of actuators in the central portion 3 of the robot 1 including actuators J9-J14. The torso lean actuator (J9) 680 is positioned in the pelvis 64 and is coupled to the spine 60, while the torso twist actuator (J10) 620 is located in the waist of the robot 1 and is coupled to the spine 60. Additionally, it should be understood that the waist 604 is coupled to a lower extent of the torso 16. These two actuators, J9 and J10, are positioned to provide two degrees of freedom for the torso 16 (i.e., torso twist (yaw) and torso lean (roll)) and are centered along the sagittal plane ($P_S$), enabling capabilities such as allowing the robot 1 to twist its body to pick up an item that is positioned at 90 degrees to its side and to lean over an obstacle to complete another task. Referring to FIGS. 44 and 46, the torso lean actuator (J9) 680 and torso twist actuator (J10) 620 are arranged such that: (i) axis A9 is angled downward with respect to the transverse plane ($P_T$) at an angle beta ($\beta$) of about 8-12 degrees and positioned within the sagittal plane ($P_S$), and (ii) axis $A_{10}$ is parallel with the coronal plane ($P_C$), positioned within the sagittal plane ($P_S$), and perpendicular with the transverse plane ($P_T$). As such, A9 is angled with respect to A10. Finally, the center of the actuator bearing 684.6 of the torso twist actuator (J10) 620 is offset downward along the Z-axis from the center of the actuator bearing 624.6 of the torso lean actuator (J9) 680.

As illustrated in FIGS. 7-13, the hip flex actuators (J11) 720 are coupled to the left and right sides of the pelvis 64. Each rotational axis $A_{11}$ of the hip flex actuators (J11) 720 are positioned within the coronal plane ($P_C$) and are positioned at a respective downward angle such that an angle ($\gamma$) is formed with respect to the transverse plane ($P_T$) of between 1 and 30 degrees, preferably 8-16 degrees, a configuration to provide a pitch-like motion (e.g., extension and flexion, a front kick or a torso 16 forward lean motion). Each axis $A_{11}$ is also offset from axes $A_{10}$ and $A_9$ along the Z-axis, which helps position the leg 6 directly beneath a frontal extent of the torso 16. In an unconventional arrangement, the hip flex actuators (J11) 720 are directly coupled to the pelvis 64 and are positioned closer to the torso lean actuator (J9) 680 than are any other leg actuators. This high placement (e.g., relative to the leg assemblies 6) within the kinematic chain increases the torque requirements for the hip flex actuators (J11) 720, which are sized accordingly with approximately twice the torque capacity of the hip roll actuators (J12) 768 and leg twist actuators (J13) 782. This positional relationship also causes the hip flex axis $A_{11}$ of the hip flex actuators (J11) 720 to intersect the torso twist axis $A_{10}$ of the torso twist actuator (J10), when both the hip flex axis $A_{11}$ and the torso twist axis $A_{10}$ are extended to or along, respectively, a Z-axis of the humanoid robot 1.

The disclosed robot 1 lacks a dedicated torso pitch actuator that would allow the robot 1 to bend forward (i.e., in a ZX-plane from the neutral state) at the robot's belly region. The elimination of this actuator can increase the internal volume of the torso 16 by over 300% (e.g., from approximately 7 liters to approximately 20 liters), with the additional volume providing space for batteries with a capacity exceeding 2.5 kWh and computing modules with a volume exceeding 2.5 liters. This expanded volume allows for the inclusion of a relatively larger battery pack with an energy density exceeding 250 Wh/kg and a relatively larger volume for high-performance compute hardware. This lack of a torso pitch actuator would be a significant sacrifice in mobility, but for the ability to generally move this functionality into the robot's hips, specifically the hip flex actuators (J11) 720. By rotating both hip flex actuators (J11) 720 in concert, the robot 1 can effectively bend its entire upper body forward from the hips. While the functionality of the hip flex actuators (J11) 720 does not fully replace the inclusion of a specific torso pitch actuator because it alters the location from where the robot 1 can bend forward, the designer of the disclosed robot 1 made this trade-off in order to gain the above-described benefits. It should be understood, however, that said robot 1 could be modified to include a torso pitch actuator to add this additional functionality if needed for specific applications.

The hip roll actuators (J12) 768 can each independently provide roll-like movement (e.g., abduction and adduction, hip pivot, a sideways kick) about rotational axis $A_{12}$ for the portions of the respective leg assemblies 6 that are moved about the hip roll actuators (J12) 768. In the illustrative embodiment of robot 1, the hip roll actuators (J12) 768 are each coupled to a respective hip flex actuator (J11) 720, rather than being coupled directly to the pelvis 64. This arrangement allows the hip roll axis $A_{12}$ to be angled rearward and downward such that an angle (δ) is formed with respect to the transverse plane ($P_T$) of between 1 and 45 degrees, preferably 10-20 degrees. The hip roll axis $A_{12}$ is neither parallel nor orthogonal to any other of the leg actuator axes J13, J14, J15, or J16, each described in further detail below. This specific configuration provides a greater range of motion for actions such as performing deep squats and rising from the ground, which further compensates for the absence of a dedicated spine pitch actuator.

Due to the position of the hip roll actuators (J12) within the robot 1, said $A_{12}$ is not parallel or perpendicular with any other axis. This positional relationship allows J11 to provide the hip/leg pitch and hip roll actuator (J12) to provide the hip/leg roll. Based on the above disclosed information and the figures, it can be seen that the hip roll actuator (J12) 768 is not directly connected to the pelvis 64. Instead, the hip roll actuator (J12) 768 is directly connected to the J11 actuator. This configuration is beneficial because it allows the hip roll actuator (J12) 768 to be angled relative to J11 and the pelvis 64. In addition, the center of the actuator bearing 772.6 of the hip roll actuator (J12) 768 is positioned below, closer to the support surface, or further away from the robot's torso/head than J11. In other words, the center of the actuator bearing 772.6 of the hip roll actuator (J12) 768 is positioned below the actuator bearings 624.6, 684.6, and 724.6 for each and every one of the following: (i) J9, (ii) J10, and (iii) J11. This unconventional solution places the main stresses in supporting the robot on an angled link that is not co-linear with other axes in the leg or hip.

Still referring to FIGS. 7-9 and 12-14, the J13 actuator is positioned near J12 within the hip housing and its output adaptor is coupled to an extent of the lower thigh 80. The leg twist actuator (J13) 782 provides the robot 1 with leg yaw or leg twist, and its axis $A_{13}$ is parallel with $A_{10}$ of the torso twist actuator (J10) 620 and is positioned perpendicular to axis $A_{11}$ of the hip flex actuator (J11) 720. This placement helps ensure that the weight of the robot 1 is supported by the hips/leg when the robot 1 is at rest. The actuator bearings associated with the torso twist actuator (J10) 620 could be positioned in the location of the J13's actuator bearing by translating the J10's actuator bearing in the downward Z direction and translating it in the Y direction to either one of the legs that contains J13.

A left and right leg twist actuator (J13) 782 is positioned near actuator (J12) 768 within the hip housing and is coupled to the lower thigh 80. Its rotational axis, $A_{13}$, is parallel with the torso twist axis $A_{10}$. Each leg twist actuator (J13) 782 can each independently provide a yaw movement about rotational axis $A_{13}$ for lower portions of the respective leg assembly 6 that are moved about the leg twist actuator (J13) 782. Each leg twist actuator (J13) 782 is not directly coupled to the pelvis 64, and each is positioned below all of the other hip and spine actuators (J9-J12). Stated another way, the J13 actuator is positioned below, closer to the support surface, and further away from the robot's torso/head 10.1 than each and every one of the following: (i) J9, (ii) J10, (iii) J11, and (iv) J12. In other words, J13 is positioned below all other actuators that perform the hip or spine movements. This is different than conventional robots and is potentially less desirable due to the fact that it increases the weight in the lower leg, which increases the torque requirements of the other actuators contained in the hip. However, in this configuration, as described above, the hip flex actuator (J11) 720 has been configured with a greater torque capacity to address this issue. This particular design may also suggest that any hip housing be split into two separate components, which may add a degree of manufacturing complexity and cost.

Figure 45:
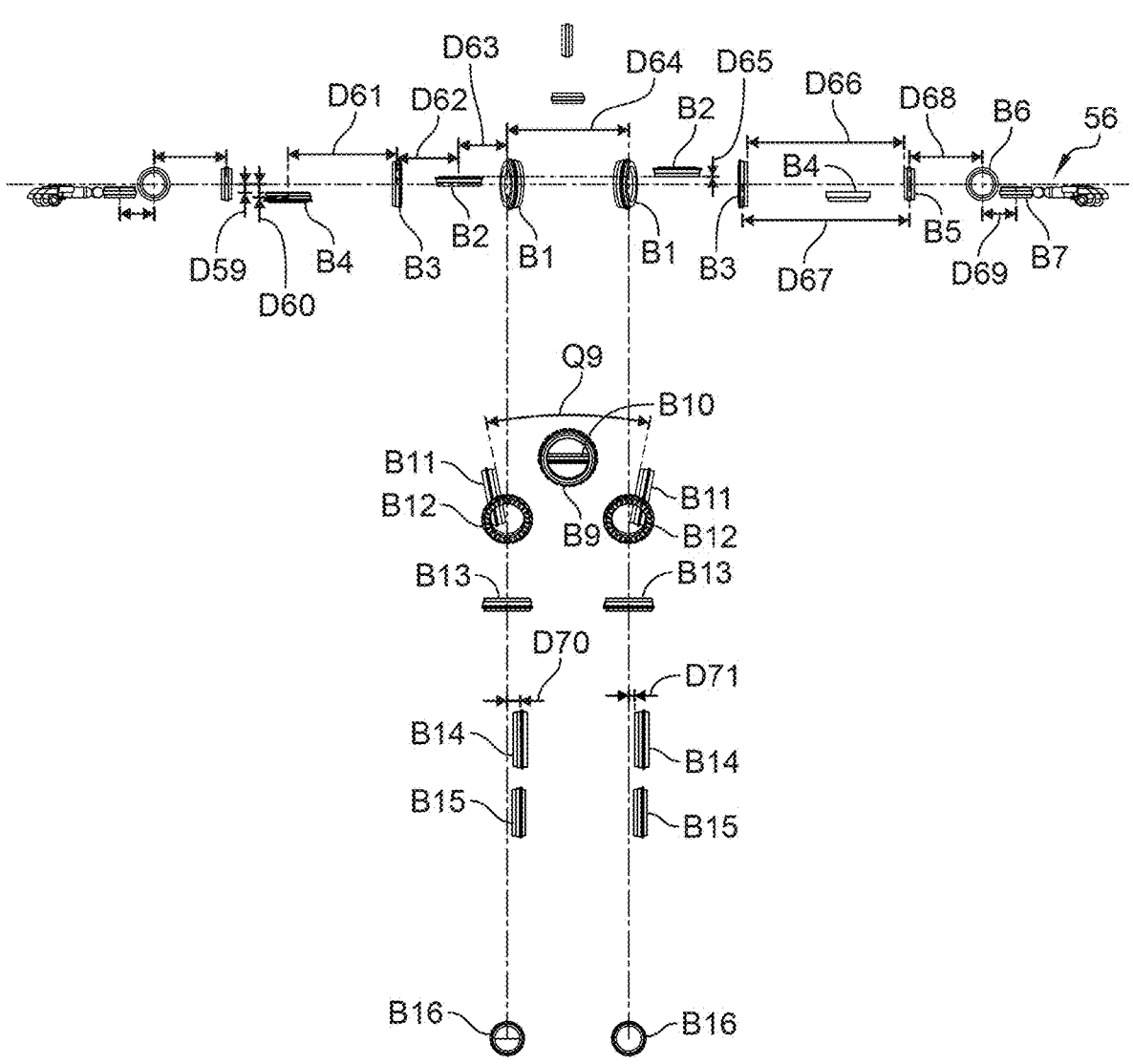
FIG. 45 is a front view of the actuator bearings contained in the robot of FIG. 25.

As best shown in FIGS. 3A-3F and 43, a knee actuator (J14) 820 is housed in the shin 84 and provides bending motion to the leg 6. Unlike other conventional robots, the J14 is not a linear actuator and is not driven by a linkage. Instead, said knee actuator (J14) 820 is a rotary actuator that is coupled to the housings associated with the lower thigh 80 and the shin 84. As shown in FIGS. 45-46, the actuator bearing 824.6 for the knee actuator (J14) 820 contained in both legs are positioned on the left side of vertical planes that are parallel with the sagittal plane ($P_S$) and aligned with $A_{13}$. As shown in the Figures, the foot flex axis A15, knee axis A14, the hip flex axis $A_{11}$, and the spine axis $A_{10}$ are coplanar and lie in the coronal plane. Many other positional relationships can be determined by the accompanying figures. This is unlike the position of all other actuator bearings contained within the robot 1, as said knee actuator (J14) 820 actuator bearing 824.6 is not in a mirrored location across the robot's sagittal plane ($P_S$). This is beneficial because it allows the lower thigh 80 and shin 84 on both legs to be identical to one another, which reduces manufacturing cost, unique parts, etc.

c. Lower Portion

Each leg assembly 6 of the robot 1 includes a foot assembly which includes a foot flex actuator (J15) 860 with a rotational axis A15, which is housed in the shin 84 and utilizes a rotary actuator and an associated linkage to provide a pitch movement (e.g., flexion and extension) for the foot 92 which is not about the rotational axis $A_{15}$. Each foot 92 further includes a foot roll actuator (J16) 900 with a rotational axis A16, which is housed within the talus 88 and provides a roll movement for respective portions of the foot 92 that are moved about the foot roll actuator (J16) 900. Placing the roll actuator (J16) 900 in the foot is an uncommon design solution that tends to increase the torque requirements on other leg actuators (J11, J12, J14). However, the housing of actuator (J16) 900 is advantageously designed to couple directly to the output of actuator (J15) 860, a configuration that reduces the total number of parts and minimizes potential failure modes.

iii. Range of Motion

The table provided below identifies the actuators 1.2.4 and their associated range of motion. It should be understood that the listed ranges of motion are exemplary and are provided to demonstrate the ability of the robot 1 not only to possess a significant number of degrees of freedom exceeding 60 total but also to ensure that each degree of freedom is associated with a significant range of motion. This characteristic stands in stark contrast to conventional robots that often lack these large ranges of motion, a limitation which prevents said conventional robots from completing the complex, human-like tasks that the disclosed robot 1 is capable of performing.

TABLE 1

| Actuator | First Angle | Second Angle | Range of Motion | Preferred First Angle | Preferred Second Angle | Preferred Range of Motion |
|---|---|---|---|---|---|---|
| (J1) 190 | −3.77 | 1.88 | 5.65 | −3.46 | 1.73 | 5.18 |
| (J2) 280 | −1.15 | 3.05 | 4.20 | −1.06 | 2.79 | 3.85 |

TABLE 1-continued

| Actuator | First Angle | Second Angle | Range of Motion | Pre-ferred First Angle | Pre-ferred Second Angle | Pre-ferred Range of Motion |
|---|---|---|---|---|---|---|
| (J3) 320 | −0.63 | 3.25 | 3.87 | −0.58 | 2.98 | 3.55 |
| (J4) 374 | −3.04 | 0.21 | 3.25 | −2.78 | 0.19 | 2.98 |
| (J5) 468 | −3.16 | 3.16 | 6.33 | −2.90 | 2.90 | 5.80 |
| (J6) 484 | −2.09 | 2.15 | 4.24 | −1.92 | 1.97 | 3.89 |
| (J7) 520 | −1.57 | 1.68 | 3.25 | −1.44 | 1.54 | 2.98 |
| (J8.1) 120 | −0.84 | 0.84 | 1.68 | −0.77 | 0.77 | 1.54 |
| (J8.2) 140 | −0.94 | 0.94 | 1.88 | −0.86 | 0.86 | 1.73 |
| (J9) 680 | −0.63 | 0.63 | 1.26 | −0.58 | 0.58 | 1.15 |
| (J10) 620 | −1.88 | 1.88 | 3.77 | −1.73 | 1.73 | 3.46 |
| (J11) 720 | −4.78 | 0.69 | 5.47 | −4.38 | 0.63 | 5.01 |
| (J12) 768 | −0.77 | 1.81 | 2.59 | −0.71 | 1.66 | 2.37 |
| (J13) 782 | −1.88 | 1.88 | 3.77 | −1.73 | 1.73 | 3.46 |
| (J14) 820 | 0.00 | 2.83 | 2.83 | 0.00 | 2.59 | 2.59 |
| (J15) 860 | −1.26 | 0.84 | 2.09 | −1.15 | 0.77 | 1.92 |
| (J16) 900 | −0.94 | 0.94 | 1.88 | −0.86 | 0.86 | 1.73 |

It should be understood that in other embodiments, additional components and axes, such as rotational axes, may be utilized. For example, an actuator may be added and located within the belly of the robot 1. In other embodiments, the robot 1 may include fewer components and axes, such as rotational axes. For example, the torso lean actuator (J9) 680, the foot roll actuator (J16) 900, or an actuator located within the hand 56 may be removed.

It should also be understood by those of skill in the art of designing humanoid robots that each portion of the robot 1 has a different number of degrees of freedom, a specific range of motion, and a unique arrangement of its axes of rotation. Said degrees of freedom, ranges of motion, and arrangements of axes of rotation are either directly or indirectly (e.g., via a drive linkage) associated with an actuator. It is understood that the number and location of degrees of freedom, the number and location of actuators, the ranges of motion, and the arrangement of axes of rotation associated with the disclosed humanoid robot 1 materially and substantially differ from those associated with a non-humanoid robot. As such, the structures, number and location of degrees of freedom, number and location of actuators, ranges of motion, and arrangements of axes of rotation associated with a non-humanoid robot cannot be simply adopted or implemented into a humanoid robot 1 without careful analysis and verification against the complex realities of designing, testing, and manufacturing a general-purpose humanoid robot. Theoretical designs that attempt to implement such modifications from a non-humanoid robot are insufficient, and in some instances woefully insufficient, because they amount to mere design exercises that are not tethered to the complex realities of successfully designing, testing, and manufacturing a general-purpose humanoid robot meeting industrial standards.

iv. Degrees of Freedom

The high-level configuration of the robot 1 provides between 30 and 70 degrees of freedom (DoF), with optimal performance achieved between 50 and 65 DoF, and preferably includes a total of 62 degrees of freedom provided by 42 rotary actuators with combined power consumption under 1000 W during typical operation. In particular, the 62 degrees of freedom are distributed within the illustrated embodiment of robot 1 as follows with specific functional allocations:

Upper Portion 2: 48 degrees of freedom (preferably above 50% of total DoF, most preferably above 65% of total DOF, and in the illustrated embodiment, approximately 77% of the total DoF)

Head/Neck 10: 2 degrees of freedom (preferably below 5% of total DoF, preferably above 2% of total DoF, and in the illustrated embodiment approximately 3% of the total DoF)

Each Arm Actuator: 2 degrees of freedom (preferably below 5% of total DoF, preferably above 2% of total DoF, and in the illustrated embodiment approximately 3% of the total DoF)

Each Arm Assembly 5: 6 degrees of freedom (preferably below 12% of total DoF, preferably above 8% of total DoF, and in the illustrated embodiment approximately 10% of the total DoF)

Each Upper Portion of the Arm Assembly: 3 degrees of freedom (preferably below 6% of total DoF, preferably above 4% of total DoF, and in the illustrated embodiment approximately 5% of the total DoF)

Each Shoulder 26: 1 degree of freedom (preferably below 5% of total DoF, preferably above 1% of total DoF, and in the illustrated embodiment approximately 2% of the total DoF)

Each Upper Humerus 30:1 degree of freedom (preferably below 5% of total DoF, preferably above 1% of total DoF, and in the illustrated embodiment approximately 2% of the total DoF)

Each Elbow: 1 degree of freedom (preferably below 5% of total DoF, preferably above 1% of total DoF, and in the illustrated embodiment approximately 2% of the total DoF)

Each Lower Portion of the Arm Assembly: 3 degrees of freedom (preferably below 6% of total DoF, preferably above 4% of total DoF, and in the illustrated embodiment approximately 5% of the total DoF)

Each Lower Forearm 46: 1 degree of freedom (preferably below 5% of total DoF, preferably above 1% of total DoF, and in the illustrated embodiment approximately 2% of the total DoF)

Each Wrist 50: 2 degrees of freedom (preferably below 5% of total DoF, preferably above 2% of total DoF, and in the illustrated embodiment approximately 3% of the total DoF)

Each Hand 56: 16 degrees of freedom (preferably below 50% of total DoF, preferably above 10% of total DoF and more preferably above 17% of total DoF, and in the illustrated embodiment approximately 26% of the total DoF)

Each Finger: 3 degrees of freedom (preferably below 10% of total DoF, preferably above 2% of total DoF, and in the illustrated embodiment approximately 5% of the total DoF)

Thumb: 4 degrees of freedom (preferably below 10% of total DoF, preferably above 2% of total DoF, and in the illustrated embodiment approximately 6% of the total DoF)

Central Portion 3: 10 degrees of freedom (preferably below 30% of total DoF, preferably above 10% of total DoF, and in the illustrated embodiment approximately 16% of the total DoF)

Spine 60: 1 degree of freedom (preferably below 5% of total DoF, and in the illustrated embodiment approximately 1% of the total DoF)

Pelvis 64: 1 degree of freedom (preferably below 5% of total DoF, and in the illustrated embodiment approximately 1% of the total DoF)

Each Hip 70: 1 degree of freedom (preferably below 5% of total DoF, and in the illustrated embodiment approximately 1% of the total DoF)

Each Upper Thigh 76: 2 degrees of freedom (preferably below 10% of total DoF, preferably above 2% of total DoF, and in the illustrated embodiment approximately 3% of the total DoF of the robot 1)

Each Lower Thigh 80: 1 degree of freedom (preferably below 5% of total DoF, in the illustrated embodiment approximately 1% of the total DoF of the robot 1)

Lower Portion 4:4 degrees of freedom (preferably below 10% of total DoF, preferably above 2% of total DoF, and approximately 6% of the total DoF)

ach Shin 84: 1 degree of freedom (preferably below 5% of total DoF, and in the illustrated embodiment approximately 1% of the total DoF)

Each Talus 88/Foot 92: 1 degree of freedom (preferably below 5% of total DoF, and in the illustrated embodiment approximately 1% of the total DoF)

The number and specific distribution of these degrees of freedom provide several significant advantages over conventional robots. For example, positioning more than 50%, preferably more than 65%, and most preferably more than 75% of the total degrees of freedom in the upper portion 2 of the robot 1 allows said robot 1 to perform highly dexterous tasks that could not be performed without a substantial majority of the degrees of freedom being concentrated in this upper portion. Additionally, minimizing the number of degrees of freedom within the central portion 3 enables the robot 1 to be designed with a larger internal torso volume, which allows for the inclusion of a larger battery pack and additional computing power, thereby improving performance and reliability. Finally, including less than 15% and preferably less than 10%, and/or approximately 6% of perform physical functions in response to electrical charges or electrical signals. As illustrated comprehensively in additional figures herein, the robot 1 is composed of a plurality of assemblies and components that are specifically arranged to emulate or generally resemble human anatomical structures and their functional characteristics. A humanoid form is advantageous because it enables the robot 1 to execute a wide range of general tasks that are typically performed by humans, such as walking between different locations, handling and moving objects, and retrieving items from various positions and orientations within a workspace volume exceeding 2m³. Non-humanoid forms (e.g., wheeled robots or quadrupeds) typically lack the versatility and effectiveness to perform such a diverse array of generalized tasks with success rates exceeding 95%.

i. Actuators

The actuators 1.2.4 contained within the robot 1 include thirty actuators (J1)-(J16), excluding the end effectors, that are housed within various components of the robot 1 to actuate movement of said components. An additional aggregate total of twelve actuators are in both hands 56 combined providing grip force exceeding 50N per hand. Below is a summary table showing the actuator 1.2.4 reference names and numbers for the thirty actuators (J1)-(J16), the quantity of each, descriptive actuator names used herein for consistency, common corresponding informal actuator names, and associated rotational axes from the high-level configuration of the illustrative embodiment robot 1. The listed axes, bearings, and bearing planes are also referred to by the same name as the related actuator for nomenclature consistency. For example, the elbow actuator (J4) 374 includes an elbow axis $A_4$, an elbow bearing 378.6, and a bearing plane $B_4$. Specific actuators in each hand 56 (e.g., six actuators in each hand) are not individually included in the below table

TABLE 2

| Actuator | Qty | Actuator Name | Informal Actuator Name(s) | Axis | Bearing |
|---|---|---|---|---|---|
| (J1) 190 | 2 | arm | primary arm | $A_1$ | 194.12 ($B_1$) |
| (J2) 280 | 2 | shoulder | (none) | $A_2$ | 248.6 ($B_2$) |
| (J3) 320 | 2 | upper arm twist | upper arm x, upper arm roll | $A_3$ | 324.6 ($B_3$) |
| (J4) 374 | 2 | elbow | arm z, arm yaw, lower humerus | $A_4$ | 378.6 ($B_4$) |
| (J5) 468 | 2 | lower arm twist | lower arm x, lower arm roll | $A_5$ | 472.6 ($B_5$) |
| (J6) 484 | 2 | wrist flex | wrist/hand y, wrist/hand pitch, flick | $A_6$ | 488.6 ($B_6$) |
| (J7) 520 | 2 | wrist pivot | wrist/hand z, wrist/hand yaw, wave | $A_7$ | 524.6 ($B_7$) |
| (J8.1) 120 | 1 | head twist | head no | $A_{8.1}$ | 124.6 ($B_{8.1}$) |
| (J8.2) 140 | 1 | head nod | head yes | $A_{8.2}$ | 144.6 ($B_{8.2}$) |
| (J9) 680 | 1 | torso lean | spine x, torso/spine roll | $A_9$ | 624.6 ($B_9$) |
| (J10) 620 | 1 | torso twist | spine z, torso/spine yaw | $A_{10}$ | 684.6 ($B_{10}$) |
| (J11) 720 | 2 | hip flex | hip y, hip/leg pitch, forward kick | $A_{11}$ | 724.6 ($B_{11}$) |
| (J12) 768 | 2 | hip roll | hip x, hip/leg roll, sideways kick | $A_{12}$ | 772.6 ($B_{12}$) |
| (J13) 782 | 2 | leg twist | hip z, hip/leg yaw | $A_{13}$ | 786.6 ($B_{13}$) |
| (J14) 820 | 2 | knee | lower thigh, lower leg y, lower leg pitch, rear kick | $A_{14}$ | 824.6 ($B_{14}$) |
| (J15) 860 | 2 | foot flex | foot y, foot pitch, or first ankle | $A_{15}$ | 864.6 ($B_{15}$) |
| (J16) 900 | 2 | foot roll | talus, foot roll, foot x, second ankle | $A_{16}$ | 904.6 ($B_{16}$) | the total degrees of freedom within the lower portion 4 of the robot 1 beneficially minimizes the torque that is placed on the knees and hips during locomotion and manipulation tasks and allows the robot to minimize the time and number of steps required for turning, which enables more humanlike movements with walking speeds exceeding 1.5 m/s and increases the speed at which certain tasks can be accomplished by 30-50%.

b. Mechanical and Electrical Architecture

The mechanical and electrical architecture 1.2 may be embodied as any combination of hardware, software, and circuitry that enables the humanoid robot 1 to operate and It should be understood that in other embodiments, some of these systems, assemblies, components, and/or parts may be omitted, combined, or replaced with alternative systems, assemblies, components, and/or parts.

A substantial majority of the actuators 1.2.4 (e.g., about twenty-eight of the forty-two actuators or about 66.7% of the actuators) in the illustrative embodiment robot 1 are not connected to a drive linkage; instead, they directly drive the associated part of the robot 1. Conversely, in the illustrative embodiment robot 1, fourteen of the forty-two actuators 1.2.4, or about 33.3% (but more than 10%, and preferably more than 25%), of the rotary actuators are coupled to a drive linkage. Drive linkages are coupled to an aggregate total of twelve rotary actuators contained within both hands 56 and to the foot flex actuators (J15) 860 in each shin 84. These drive linkages allow: (i) the fingers and thumb to be under-actuated, meaning they retain the ability to flex, curl, or rotate around an object while eliminating the need for an actuator to control each joint or degree of freedom, and (ii) the foot 92 to pivot around an axis that is located well forward (e.g., more than 10% of the overall length of the foot) of the center of the rotary actuator. The robot 1 only uses electric actuators, and thereby lacks manual, hydraulic, cable-based, or pneumatic actuators. The exclusive use of electric actuators reduces assembly, maintenance, weight, and cost, and increases durability and safety considerations related to operating the robot 1 within or around other humans.

1. Commonality of Actuator Types

As noted above, the forty-two rotary actuators can be classified into seven primary types shown in the table below, wherein each row indicates a momentary peak torque (N–m) for the type. This commonality between the actuators beneficially reduces manufacturing costs, shortens assembly time, decreases the number of unique parts that are required, streamlines debugging time, and increases the overall modularity and serviceability of the robot 1. In fact, this commonality extends to the point that all of these actuator types may have an identical arrangement of internal components.

TABLE 3

| Actuator Type | Actuator | Momentary Peak Torque (N-m) | Preferred Momentary Peak Torque (N-m) |
|---|---|---|---|
| 1, G | (J11) 720 (J14) 820 | 204-307 | 230-281 |
| 2, E | (J1) 190 (J12) 768 (J13) 782 (J15) 860 | 125-188 | 141-172 |
| 3, C | (J9) 680 (J10) 620 | 204-307 | 230-281 |
| 4, B | (J2) 280 (J3) 320 (J4) 374 | 81-122 | 91-112 |
| 5, D | (J16) 900 | 45-68 | 51-62 |
| 6, A | (J5) 468 (J6) 484 (J7) 520 (J8.1) 120 (J8.2) 140 | 15-22 | 17-20 |
| 7, F | Hands | 2.5-6 | 4-5.5 |

As shown in the above table, the left knee actuator (J14) 820 and the hip flex actuator (J11) 720 have a momentary peak torque that is greater than the momentary peak torque of any other actuator contained in the robot 1, including the torso twist actuator (J10) 620. The types of actuators are not equally distributed within the robot 1; instead, an unequal distribution is utilized. Of the types listed above, the first type has the greatest torque, with four such actuators provided in the hips (J11) and knees (J14) 820. Eight actuators of the second type are distributed with two (J1) in the upper portion 2, four (J12, J13) in the central portion 3, and two (J15) 860 in the lower portion 4. The upper portion 2 additionally contains six actuators (J2-J4) of the fourth type, eight actuators (J5-J7, J8.1, J8.2) of the sixth type, and twelve actuators of the seventh type (in the hands). The remaining third and fifth types of actuators are sized to actuate roll and yaw of the torso/spine (J9, J10) and to actuate the foot (J16). The similarities and commonalities of the various actuators and their unequal distribution provide substantial benefits to the robot 1 over conventional robots that lack this distribution and configuration.

While the external housing of the individual actuator types may also vary to accommodate different mounting and structural requirements, the internal assembly of each of these actuator types may be substantially similar. It should be noted that the actuators (J1-J16) may utilize a range or a combination of advanced motor types, including but not limited to brushless DC motors, stepper motors, servo motors, coreless DC motors, synchronous and asynchronous AC motors, asynchronous induction motors, linear motors, piezoelectric motors, direct-drive motors, switched reluctance motors, permanent magnet synchronous motors (PMSMs), axial flux motors, and hybrid stepper motors. These motors may employ rare-earth permanent magnets, such as neodymium-iron-boron (NdFeB) alloys, samarium-cobalt (SmCo) magnets, ferrite magnets, alnico magnets, flexible magnets, bonded rare-earth magnets, and high-temperature permanent magnets, in order to achieve high torque density and superior energy efficiency. Motor windings may include high-conductivity copper wire with advanced ceramic or polyimide insulation for superior thermal and electrical performance.

The motors may be coupled with various high-reduction gear mechanisms that are designed for precision and load handling, such as strain wave gearboxes (e.g., harmonic drives), cycloidal reducers, planetary gearboxes, bevel gear systems, worm gears, parallel shaft helical gear mechanisms, spur gear assemblies, crossed helical gear systems, double-enveloping worm gears, herringbone gears, hypoid gears, rack-and-pinion systems, bevel hypoid gears, epicyclic gear trains, and differential gear systems. The reduction ratios provided by these mechanical gear systems may be any suitable reduction ratio, including from 1:1.1 to 1:150. In particular, said reduction ratio may be 1:10, 1:20, 1:30, 1:50, or 1:100. In other words, the reduction ratio may be less than 1:1.1 or it may be more than 1:150, depending on the specific application. Additionally, some implementations may incorporate custom gear profiles that are optimized for torque transfer efficiency, backlash reduction, and/or noise minimization. Furthermore, said actuators may include brakes or clutches to protect the gearbox and/or to allow for power to be removed from the actuators without causing the robot 1 to fall to the ground. In some embodiments, the actuators may also include internal limiting features, such as a hard-stop or other range of motion limiters.

Additionally, to achieve exceptional positional accuracy and ensure reliable operation, actuators may be equipped with advanced encoders, which could be optical, magnetic, capacitive, inductive, resistive, piezoelectric, hall-effect, potentiometric, or ultrasonic encoders. These encoders may facilitate sub-millimeter-level accuracy, which is critical for applications requiring meticulous movement control. To complement this positional data, actuators may include integrated torque sensors that have strain gauges, piczoresistive sensors, magnetoelastic sensors, capacitive sensors, fiber-optic sensors, or rotary transformers. Additionally or alternatively, the actuators may include current sensors, such as Hall-effect sensors, shunt resistors, fluxgate sensors, Rogowski coils, or magnetoresistive sensors. Furthermore, the robot 1 may incorporate micro-electromechanical systems (MEMS) gyroscopes and/or accelerometers, which provide additional sensory data related to orientation, angular velocity, and linear acceleration. This comprehensive sensory integration enhances the robot's ability to navigate complex environments and maintain stability during operation. Furthermore, the actuators or the output of the actuators may include bearing housings that utilize spherical roller bearings, tapered roller bearings, needle roller bearings, magnetic bearings, or hybrid combinations thereof.

ii. External Cover Assembly

The illustrative embodiment robot 1 includes various components (e.g., assemblies) with housings 1.2.2 (e.g., to form an exoskeleton) that are designed to protect the operational systems of the robot 1, such as actuators 1.2.4 and electronics assembly 1.2.6, provide structural support, and give form to the robot 1. Said housings 1.2.2 can be comprised of hard or rigid casings that may include internal mounting features designed to support systems in specific locations, structural features engineered to withstand operational loads, and internal and/or external features that allow for interoperation between adjacent components and/or are formed to resemble human features. Some housings 1.2.2 additionally include one or more detachable shells that may overlay a casing to allow access to internal assemblies or to complete the form of the component.

The requirements of the housings 1.2.2 can vary in shape and form based on the individual structural or material requirements for each specific component. While it may be desirable to utilize a particular material for all housings 1.2.2 to create a consistent exterior appearance, fabrication may be complicated by specific structural or operational needs at different locations. It may not be necessary to utilize the same materials in different housings 1.2.2 that experience different load requirements. Various materials may be preferred for a specific housing 1.2.2 based on properties such as strength, toughness, elasticity, weight, and conductivity. Similarly, the complexity of some housing 1.2.2 designs may be better suited for one type of manufacturing process, such as machining, die casting, injection molding, or composite fabrication, over another. Because there is a desire or need to use different materials within different regions and/or use materials that do not have a consistent exterior appearance, the illustrative embodiment robot 1 includes exterior coverings of the exterior covering assembly 1.2.16 that are designed to at least partially hide the housings 1.2.2 under a textile exterior layer that can be easily swapped if damaged, serve to protect internal components from dust and debris, are designed to fit the form of the robot 1 without substantial wrinkling, and/or allow for venting or address thermal considerations at specified locations.

The exterior coverings may have a multi-layered assembly, which may include: (i) an energy-absorbing material that is coupled to the coupling layer, (ii) a coupling layer (e.g., plastic or polymer based), wherein the coupling layer facilitates attachment to, or attachment at, a housing 1.2.2, and/or (iii) an exterior coverings material (e.g., a textile). Alternatively, the multi-layered assembly may omit the coupling layer, the energy-absorbing material, and/or exterior covering material. In each case, the movement of the nearby joint may cause one housing 1.2.2 to impact or crush the energy absorbing layer instead of another housing 1.2.2, thereby mitigating or eliminating structural stress or load on either housing 1.2.2 and/or the respective actuator 1.2.4. Additionally, the energy attenuation members help to reduce pinch points, and/or allow for a more human-like appearance.

1. Energy Attenuation Assembly

The energy attenuation assembly may be composed of a plurality of integrated or removable energy attenuation members, such as pads, panels, or bumpers, that are attached to housings 1.2.2 of the robot 1 and/or are positioned within the external covers. Said energy attenuation members may: (i) be attached directly to a particular exterior side of a housing 1.2.2 (e.g., overlie the housing), (ii) surround an exterior of a housing 1.2.2 and not be directly attached (e.g., friction fit), (iii) be attached to the edges of an opening formed in the housing 1.2.2 (e.g., act as a deformational extent of the housing), and/or (iv) be attached to or retained by the exterior coverings.

The disclosed robot 1 includes a torso energy attenuation member, elbow energy attenuation members, and leg energy attenuation members. Additionally, energy attenuation members may be included at the hip, shin, and/or foot. Some or all energy attenuation members may also be omitted. Energy attenuation members can be configured to enhance or alter the shape of the robot 1 without adding substantial weight and to provide a deformable structure with energy absorption properties to protect underlying components.

The energy attenuation members can be made from a wide variety of materials, including: (i) polymers, such as polyethylene foam (PE Foam), ethylene vinyl acetate (EVA) foam, polyurethane foam (including Memory Foam and Open-cell Polyurethane Foam); (ii) rubber foams; (iii) natural foams; (iv) engineered foams; (v) composite and hybrid materials; (vi) expanded polystyrene (EPS); (vii) expanded polypropylene (EPP); (viii) Koroyd®; (ix) D30®; (x) Poron® XRD; (xi) thermoplastic elastomers (TPE) or thermoplastic polyurethane (TPU); (xii) any other material known to one of skill in the art that accomplishes the desired energy absorption characteristics; (xiii) any combination of the above. Furthermore, the energy-absorbing material may alternatively or additionally include other structures of said materials, wherein said structures may include lattices and/or repeating units, such as a cube, sphere, cylinder, cone, pyramid, torus, prism, tetrahedron, dodecahedron, octahedron, icosahedron, ellipsoid, paraboloid, cuboid, or hexahedron. It should be understood that the repeating unit or lattice cell may be contained in a specific region or may propagate throughout the entire energy attenuation member. Additionally, the energy attenuation members and/or the assembly may have varying properties, such as thickness, density, C/D ratio, and stiffness. This variation may be arranged in a gradient manner, wherein the energy-absorbing materials transition from softer to firmer layers or regions to provide progressive energy dissipation.

2. Exterior Coverings

The exterior coverings, which can include a neck cover, a torso cover, an upper leg cover, a shin cover, a foot cover, a lower arm cover, and a hand cover, are designed not to interfere with the robot's range of motion, to allow access to underlying components, to potentially add indicators to the external surface, and to improve the robot's overall aesthetic appearance. As shown in the figures, a single exterior covering does not extend over all actuators in the robot 1, and typically does not cover more than five actuators at a time. In other words, the exterior covering does not resemble an oversized jumpsuit with a closure running from, e.g., the robot's pelvis to its head region, nor does it include a hood that extends around a substantial portion of the robot's head. Instead, the exterior covering is strategically and tightly fitted in certain regions and may include different inserts (e.g., a different textile) that are positioned between the moving aspects of joints.

Exterior coverings materials of the exterior covering assembly 1.2.16 can be made from one or more textiles and can be customized or selected to reduce wrinkling and to allow for the twisting or movement of the underlying components without restriction or substantial distortion. For example, the exterior coverings materials may be designed to allow the lower arm to twist and rotate from about −120 degrees to about 180 degrees. Additionally, the exterior coverings materials may be selected to allow for the cooling of components, the viewing of indicator lights, or the operation of buttons through said exterior coverings. This provides a substantial benefit over conventional systems that lack these advanced features. It should be understood that this disclosure contemplates using or including exterior coverings materials that: (i) integrate lights from the robot 1 into said exterior covering, and specifically into a textile itself, (ii) may be translucent or temporarily translucent (e.g., based on time or environment), and/or (iii) can be formed (e.g., woven) in a manner that allows light to be transmitted through the textile.

As such, various types of lights (e.g., fiber optic lighting, led strip lights, led rope lights, micro-led string lights, led neon flex, phosphorescent paint, OLED panels (organic light-emitting diode), laser diode lighting, neon tubing, electroluminescent panels, led edge-lit panels, flexible led sheets, flexible OLED strips, inductive electroluminescent displays, laser fiber cables, quantum dot light-emitting displays, phosphor-coated led strips, laser-activated fluorescent materials, electroluminescent paint, laser-illuminated fiber bunches, phosphor-coated electroluminescent (PCEL) materials, smart RGB led strips, light-up silicone tubing (LED or EL-based), laser wire, or other electroluminescent materials such as EL wire, EL tape, or EL film) that are coupled to the humanoid robot 1 may be visible through the exterior coverings material. The exterior coverings material can include reflective yarn or night-luminous yarn that changes its appearance when light is shining on its surface. In other embodiments, a shiny, reflective, iridescent, matte, or textured polyurethane film can be applied to the surface of the exterior coverings material (e.g., a textile) in certain areas to provide an additional reflective effect or for another purpose, such as displaying a logo, pattern, or labels.

The exterior coverings material can also include features to accommodate the thermal considerations of the robot 1. In various examples, the exterior coverings material can be a custom textile that utilize different weaves in different locations to allow for ventilation in specific areas. Additionally, the exterior coverings material can include textiles or threads that are heat-sensitive and change color with a change in temperature. In summary, the exterior coverings may additionally be made from, include, or specifically omit any one or any combination of the following material types: durable materials, flame-resistant materials, waterproof materials, hazard materials, chemical-resistant materials.

Alternatively or additionally, the exterior covering assembly 1.2.16 may include features such as closures (e.g., a zipper that runs a partial or full length of the exterior covering assembly 1.2.16), attachment points, couplers, self-cleaning nanocoatings, thermoelectric materials, photochromic dyes, or electromagnetic shielding layers, as well as modular, quick-release panels or e-textile technology with conductive fibers woven throughout to create a distributed sensor network that is capable of detecting impacts, monitoring joint angles, or even harvesting energy from movement. The exterior covering assembly 1.2.16 may be designed to include inserts (which may also be textiles or may be other materials) that are positioned strategically between moving joint components to further ensure that pivoting motion is not restricted at the joints of the humanoid robot 1. Different textile materials, patterns, knits, weaves, etc. may be incorporated to facilitate movement in specific regions, thereby enhancing the functional dexterity of the robot 1.

iii. Sensors

Figure 4:
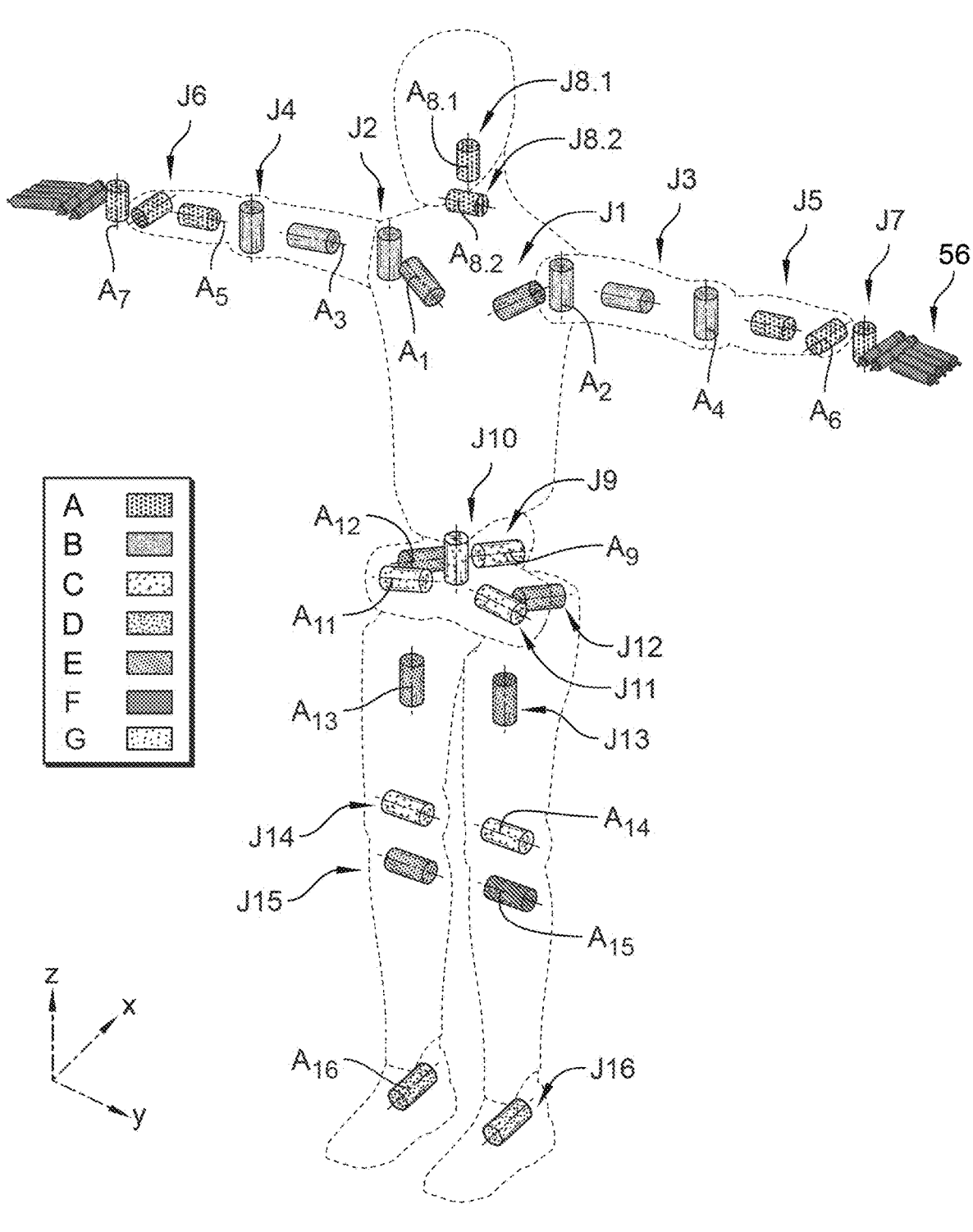
FIG. 4 is a diagram illustrating actuators contained within the humanoid robot of FIG. 1 and the corresponding rotational axes of said actuators.

As illustrated in FIG. 4, sensors 1.2.8 may be embodied as any hardware, software, and/or circuitry for providing sensor data indicative of perceived stimuli, conditions, and measurements to enable the humanoid robot 1 to process, reason, and act appropriately (e.g., based on a given task, a set of rules, and/or other constraints). The sensors 1.2.8 may include one or more torque sensors 1.2.8.2, inertial sensors 1.2.8.4, visual sensors 1.2.8.6, auditory sensors 1.2.8.8, touch sensors 1.2.8.10, proximity sensors 1.2.8.12, environmental sensors 1.2.8.14, and other sensors 1.2.8.16. The sensors 1.2.8 may provide sensor data (e.g., torque, inertia measures, audiovisual sensor data, touch data, proximity data, environmental data, etc.) to the compute 1000 processors, further described below, to enable appropriate interaction between the humanoid robot 1 and the environment.

The torque sensors 1.2.8.2 may comprise one or more torque cells that are positioned within the actuators and are designed to measure the amount of force or torque applied to a part of the humanoid robot 1. The measurements may be transmitted to other components of the humanoid robot 1, such as the whole body controller 1550 or one or more controllers 1600, to enable balance, locomotion, manipulation, and handling by the humanoid robot 1.

The inertial sensors 1.2.8.4 may comprise sensors for measuring the motion, position, and orientation of the humanoid robot 1 relative to the environment for purposes of navigation, stabilization, and interaction with the environment and surroundings. For example, the inertial sensors 1.2.8.4 can include one or more accelerometers (e.g., to measure acceleration forces in one or more directions for use in determining changes in velocity and orientation), gyroscopes (e.g., to measure angular velocity for use in tracking rotational movement and maintaining balance), IMUs (e.g., combining the accelerometers and gyroscopes for use in providing comprehensive motion and orientation data), and Global Positioning System (GPS) receivers (e.g., to provide location data based on satellite signals, for use in outdoor navigation and positioning).

The visual sensors 1.2.8.6 may comprise sensors for capturing visual data, including cameras (e.g., red-green-blue (RGB) standard color cameras, grayscale monocular cameras, and stereo cameras (e.g., to capture depth perception)), depth cameras (e.g., depth cameras using technologies such as structured light or time-of-flight to measure distance to objects, Azure® Kinect® depth camera, Intel® RealSense® depth camera, etc.), LIDAR (Light Detection and Ranging) sensors (e.g., to measure distance to objects by emitting laser pulses, analyze the reflections, and provide detailed 2D or 3D maps of the environment), radar (e.g., to detect objects via radio waves and measure distance and speed for use in various applications including navigation and obstacle detection). Visual sensors 1.2.8.6 may also include event-based cameras, which report changes in pixel intensity rather than full frames, offering advantages in speed and data efficiency for dynamic scenes. Examples of said visual sensors 1.2.8.6 include the cameras 108.2.2 and 108.2.4 contained in the head 10.1 of the robot 1.

The auditory sensors 1.2.8.8 may comprise sensors for capturing audio data, including microphones (e.g., to capture audio signals for voice recognition, environmental noise detection, or communication), ultrasonic transducers (e.g., to capture distance measurement and obstacle detection through high-frequency sound waves), spatial audio sensors such as microphone arrays and direction of arrival sensors (e.g., to capture sound from different locations to determine the direction and distance of sound sources for 3D positioning). Auditory sensors 1.2.8.8 could also include specialized acoustic sensors for detecting specific sound patterns, such as the sound of failing machinery or distress calls, further enhancing the robot's environmental awareness.

The touch sensors 1.2.8.10 may comprise sensors for detecting physical contact or pressure applied to the surface of the humanoid robot 1, e.g., to enable tactile feedback, safety and collision avoidance, object handling and manipulation, and interaction with the environment and surroundings. Example touch sensors 1.2.8.10 may include pressure sensors to measure an amount of pressure applied to a surface by the humanoid robot 1, such as capacitive sensors (e.g., to detect touch or proximity through changes in capacitance), resistive sensors (e.g., to detect pressure or touch by measuring changes in resistance), piezoelectric sensors (e.g., to generate an electrical charge in response to mechanical stress or pressure and detect vibrations or impact), force-sensitive resistors (e.g., to change resistance based on the amount of applied force), and optical touch sensors (e.g., to use light beams or infrared to detect touches or proximity). Alternative touch sensors 1.2.8.10 may involve artificial skin technologies that provide a more distributed and nuanced sense of touch, capable of detecting not only contact but also shear forces and temperature changes on the robot's surfaces.

The proximity sensors 1.2.8.12 may comprise sensors for detecting the presence or absence of objects within a given range without necessarily making physical contact with the object, e.g., to provide obstacle avoidance, navigation, and object detection. Example proximity sensors 1.2.8.12 can include ultrasonic sensors (e.g., to measure distance by emitting ultrasonic waves and detecting reflection of the waves for avoiding obstacles and measuring distance) and infrared rangefinders (e.g., to detect, using infrared light, the presence or distance of objects for proximity sensing and simple obstacle detection). Capacitive proximity sensors may also be used as part of proximity sensors 1.2.8.12, particularly for close-range interactions.

The environmental sensors 1.2.8.14 may comprise sensors for measuring various physical parameters of the environment and surroundings to enable the humanoid robot 1 to interact with the environment and surroundings, adapt to changes in the environment and surroundings, and perform a given task. Example environmental sensors 1.2.8.14 can include thermocouples (e.g., to measure temperature by generating a voltage proportional to temperature difference), thermistors (e.g., to measure temperature based on changes in resistance), magnetometers (e.g., to measure magnetic fields for navigation and orientation), light sensors (e.g., to measure intensity of light in the environment), gas sensors (e.g., to detect presence and concentration of various gases and monitor air quality), and humidity sensors (e.g., to measure relative humidity in the air). Other environmental sensors 1.2.8.14 could include barometric pressure sensors for altitude determination or weather prediction, radiation sensors for operation in hazardous environments, or particulate matter sensors for air quality assessment in industrial settings.

iv. Communication Interfaces

Figure 5:
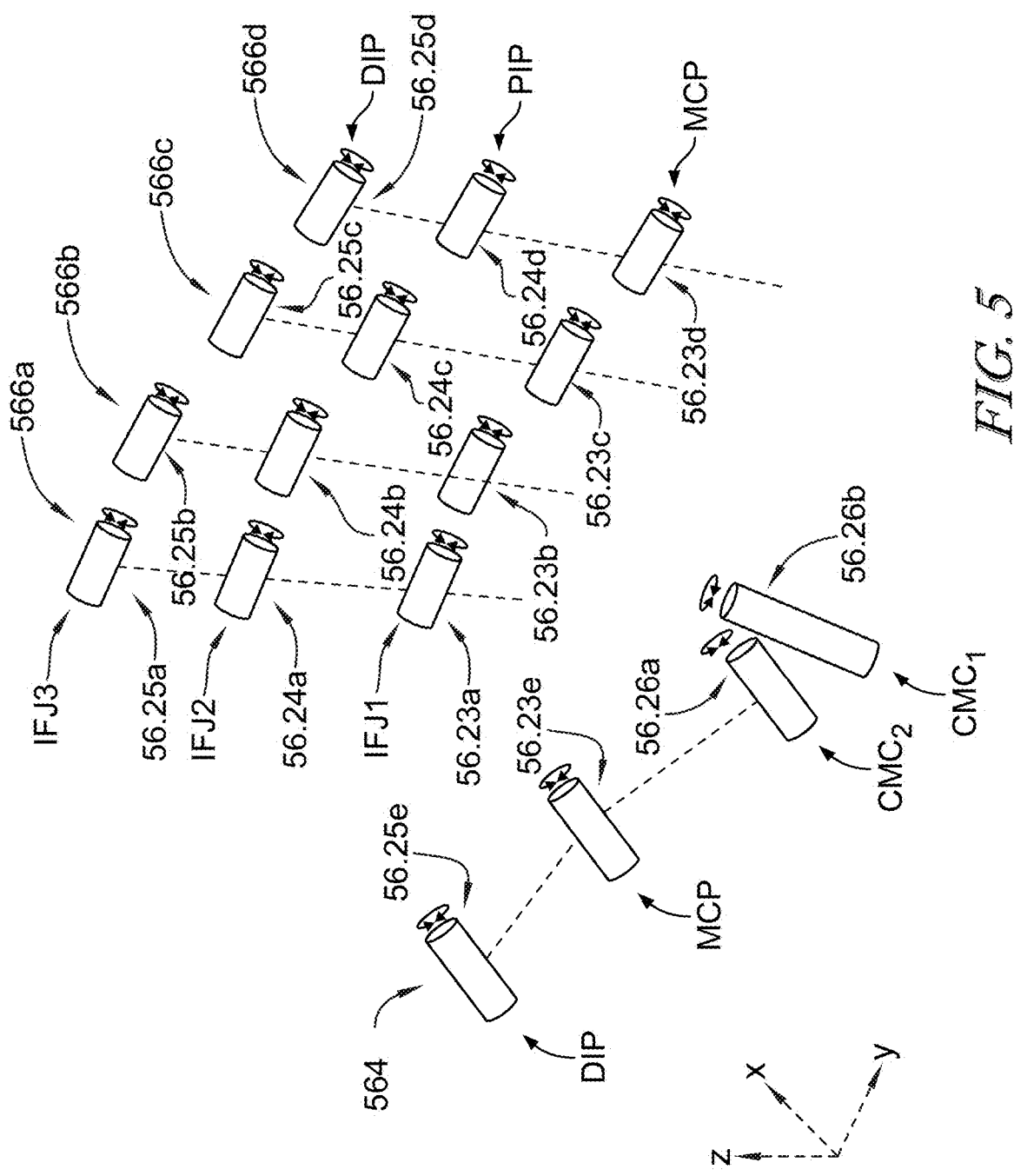
FIG. 5 is a perspective schematic view of kinematic chains contained within the hand of the robot of FIG. 1.
Figure 6:
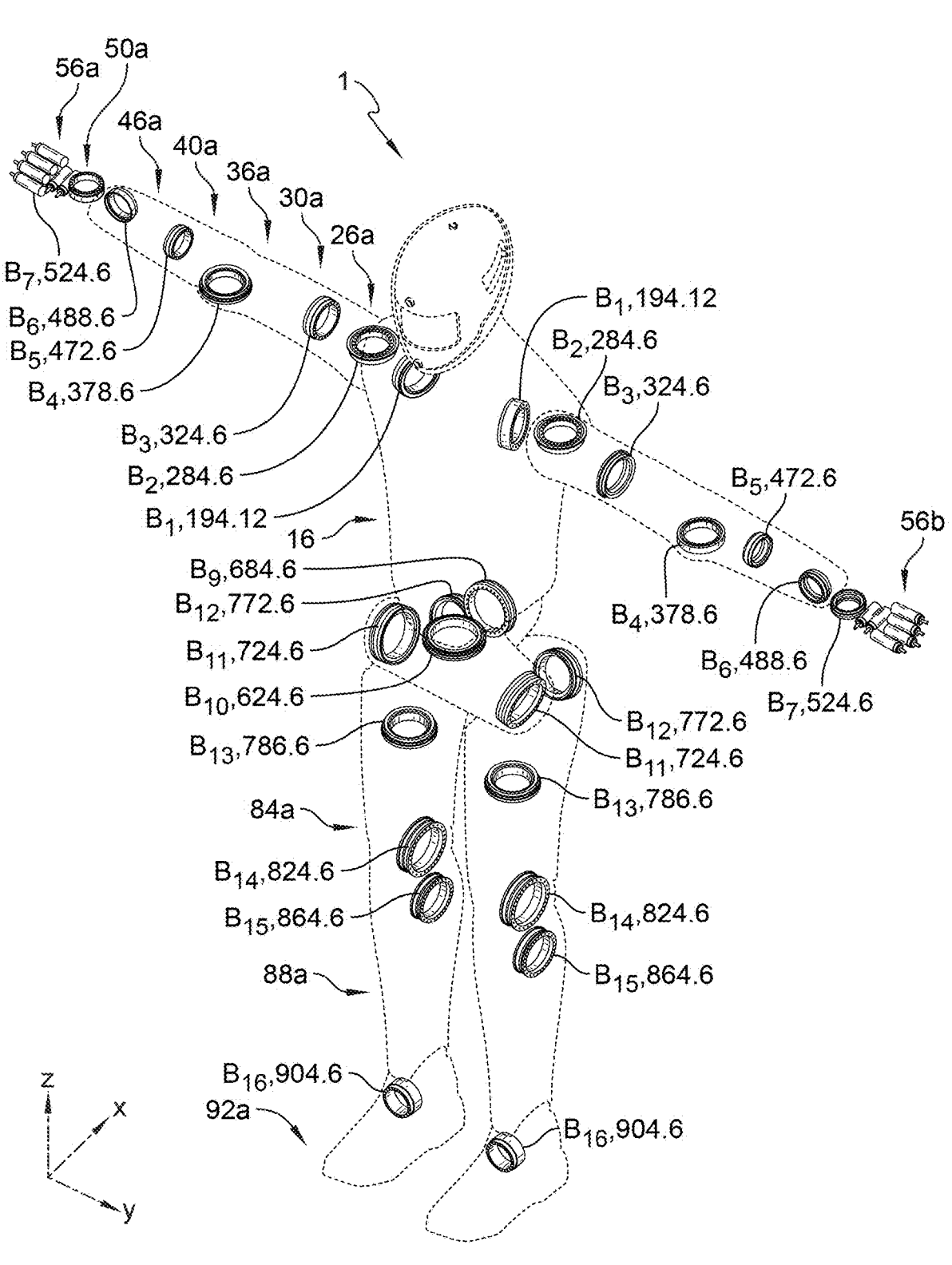
FIG. 6 is a perspective view of an extent of the actuators contained in the robot shown in FIG. 4, wherein said extent is the actuator bearing that is contained within the actuators.

The communication interfaces 1.2.12 may be embodied as any hardware, software, or circuitry to enable the exchange of data, signals, and other forms of communication between different components within the humanoid robot 1, and between the humanoid robot 1 and other systems (e.g., other humanoid robots 2700A-X, the command centers 2750A-X, the remote AI system 2780), and other components and devices interconnected over the networks 2999A-X. Specifically, FIG. 5 shows that the humanoid robot 1 may be configured with a variety of communication interfaces 1.2.12. The communication interfaces 1.2.12 may be embodied as any combination of a communication circuit, device, or collection thereof, capable of enabling communications over a network (e.g., the networks 2999A-X). The communication interfaces 1.2.12 may be configured to use any one or more communication technology (e.g., wired or wireless communications) and associated protocols to effect such communication.

Referring to FIG. 5, examples of communication interfaces 1.2.12 include a wireless communication interface 1.2.12.2 (e.g., Bluetooth®, Wi-Fi®, WiMAX, Cellular (e.g., 3G, 4G, 5G), Zigbee, LoRa (Long Range) and RF (Radio Frequency)), a wired communication interface 1.2.12.4 (e.g., Ethernet, USB, Serial Communication (e.g., RS-232, RS-485), and Controller Area Network (CAN) interface)), a local communication interface 1.2.12.6 (e.g., an I2C (Inter-Integrated Circuit), SPI (Serial Peripheral Interface)), and a human-robot communication interface 1.2.12.8 (e.g., voice recognition systems to enable communication through spoken commands using speech recognition technology, touch interfaces such as touchscreens or physical buttons for direct human interaction with the humanoid robot 1). Alternatively or additionally, the human-robot communication interface 1.2.12.8 may include gesture recognition systems or gaze tracking, allowing for more intuitive and non-verbal interaction with human operators. The communication interfaces 1.2.12 may also include a network interface controller (NIC) (not illustrated), which may also be referred to as a host fabric interface (HFI). The NIC may be embodied as one or more add-in-boards, daughtercards, controller chips, chipsets, or other devices that may be used by the humanoid robot 1 for network communications with remote devices.

E. Kinematic Movements

As illustrated in various figures, the disclosed humanoid robot 1 includes an arrangement of actuators 1.2.2 and has 62 DoF configured such that the robot 1 may be maneuvered into a multitude of positions by manipulating one or more of its kinematic chains. For example, the robot 1 can utilize a plurality of movements to perform the same task. In one example scenario, the robot 1 tasked with picking up a bin from the ground could (i) bend its torso 16 forward at the hip flex actuators (J11) 720, (ii) bend at its knees (J14) 820 to lower the position of the torso 16, or (iii) combine movements of bending the torso 16 forward and bending at the knees (J14) 820. FIGS. 3A-3F illustrate examples of two different bending positions that coordinate the actuation of multiple actuators to position the robot 1 for picking up the bin. Each example bending position may result in the robot 1 holding the bin in a different manner, based on the position of its arms 5 and hands 56, to lift the bin for another evaluation.

Figure 3A:
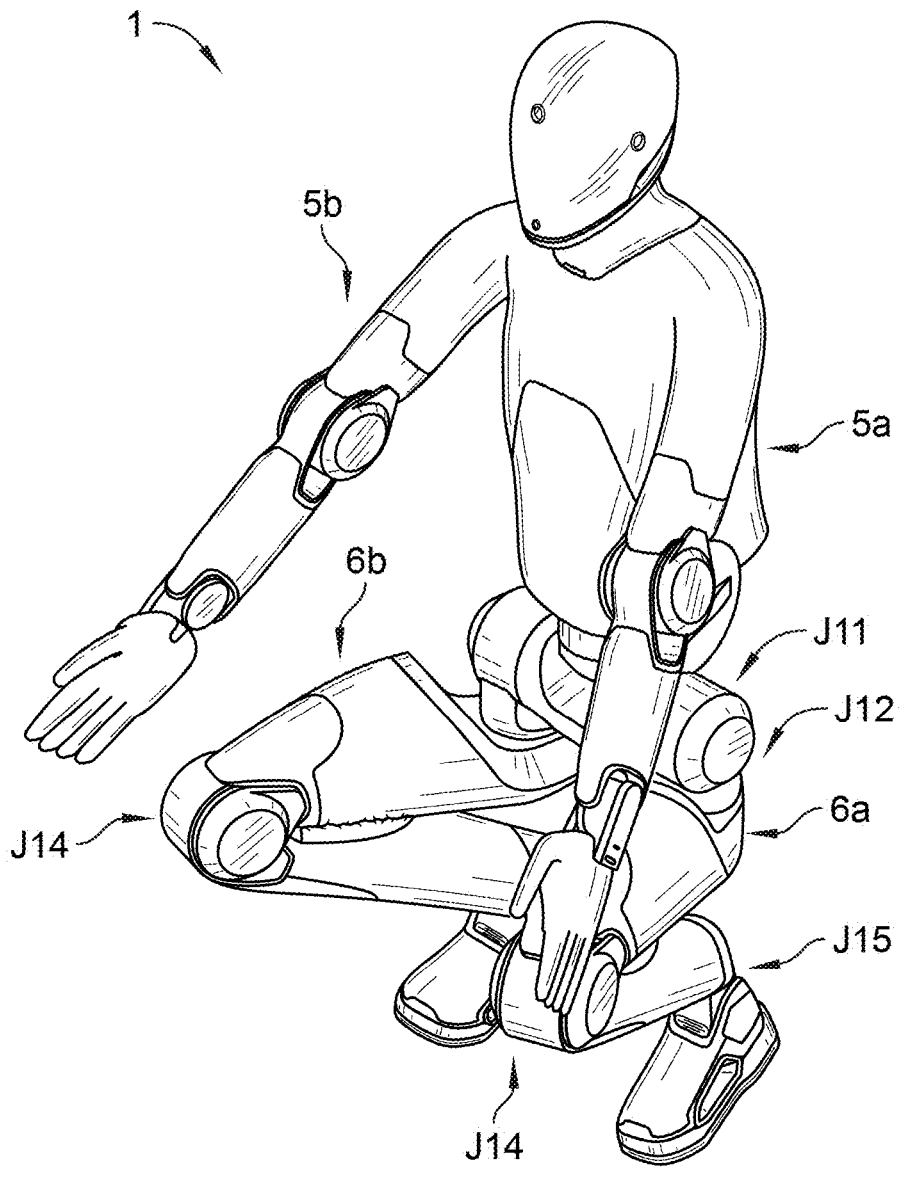
FIG. 3A is a perspective view of a robot of FIG. 1 in a first bending position, where the torso of the robot is in a neutral position and the legs are rotated laterally outward at the hips and bent at the knees and ankles to reach a bin on the floor.
Figures 3B, 3C:
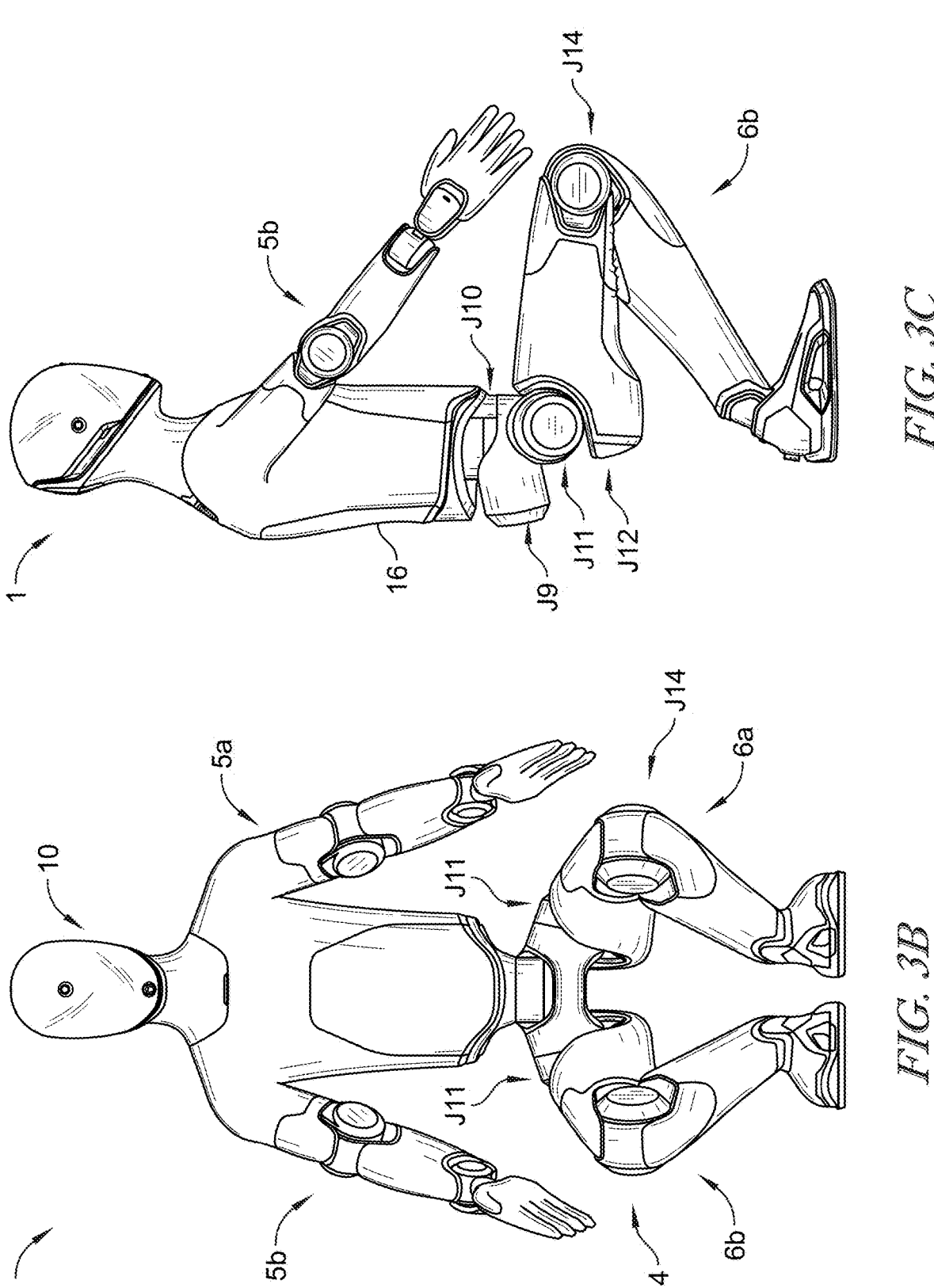
FIG. 3B is a front view of the robot of FIG. 3A.
FIG. 3C is a side view of the robot of FIG. 3A.

FIGS. 3A-3C illustrate a first exemplary bending position for picking up a bin from the ground. The robot 1 may start from a neutral standing position and squat to pick up the bin. In this example, the torso 16 of the robot 1 may maintain a substantially vertical orientation, with the robot 1 bending at the hip flex actuators (J11) 720, knees (J14) 820, and ankles (J15) 860. To achieve this low squatting position, the robot 1 can use its hip roll actuators (J12) 768 to rotate the legs 6 laterally on each side, thereby avoiding interference with other components. The arms 5 can be rotated upwards using the arm actuators (J1) 190 to position the hands 56. In some examples, for a wider bin, the elbow actuator (J4) 374 and/or wrist actuators (J5-J7) can be utilized to further position the hands 56 to hold the bin.

Figures 3D, 3E:
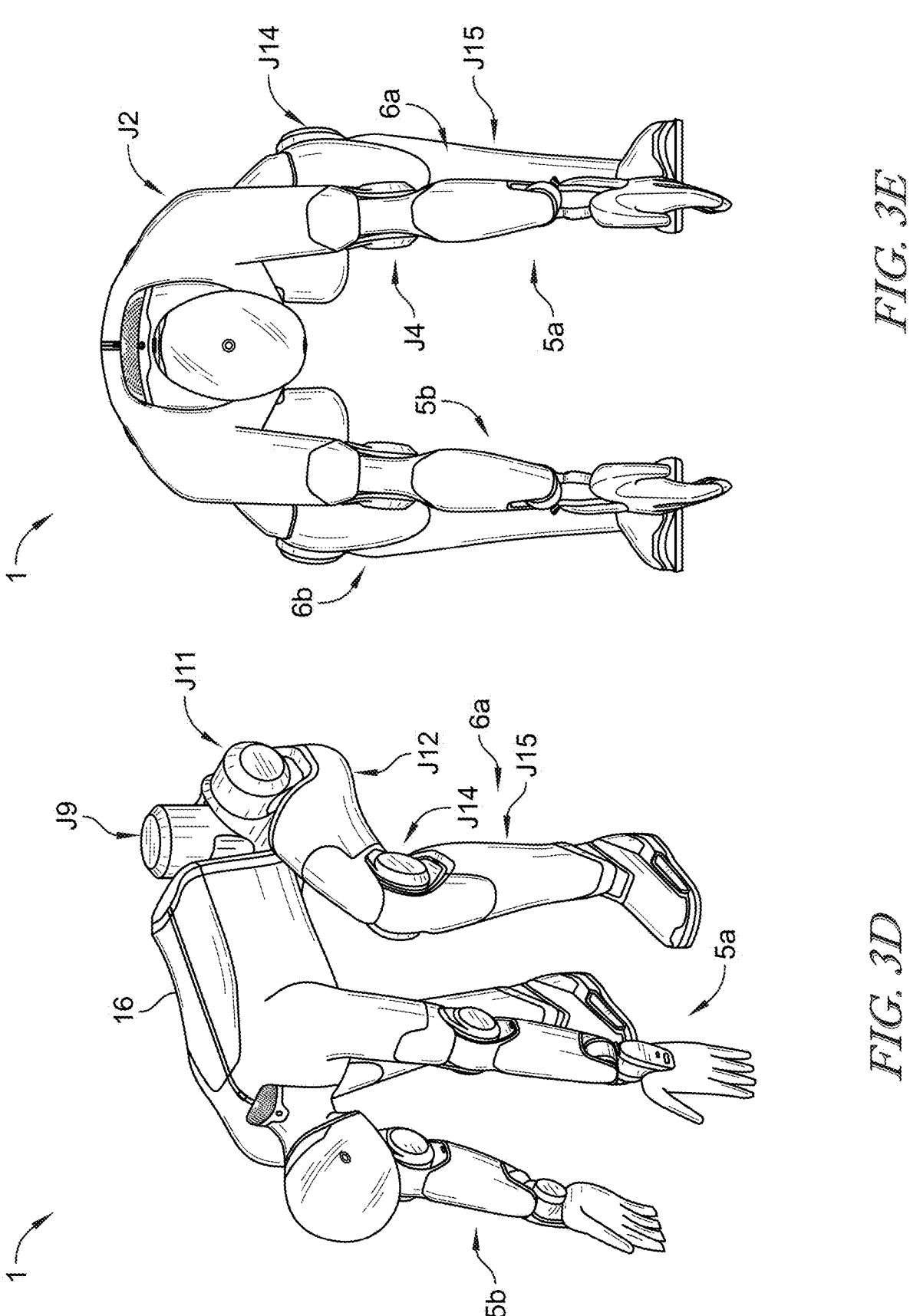
FIG. 3D is a perspective view of a robot of FIG. 1 in a second bending position, where the torso of the robot is in a flexion position bent over and the legs are rotated laterally outward at the hips and bent at the knees to reach a bin on the floor.
FIG. 3E is a front view of the robot of FIG. 3D.
Figures 3F, 3G:
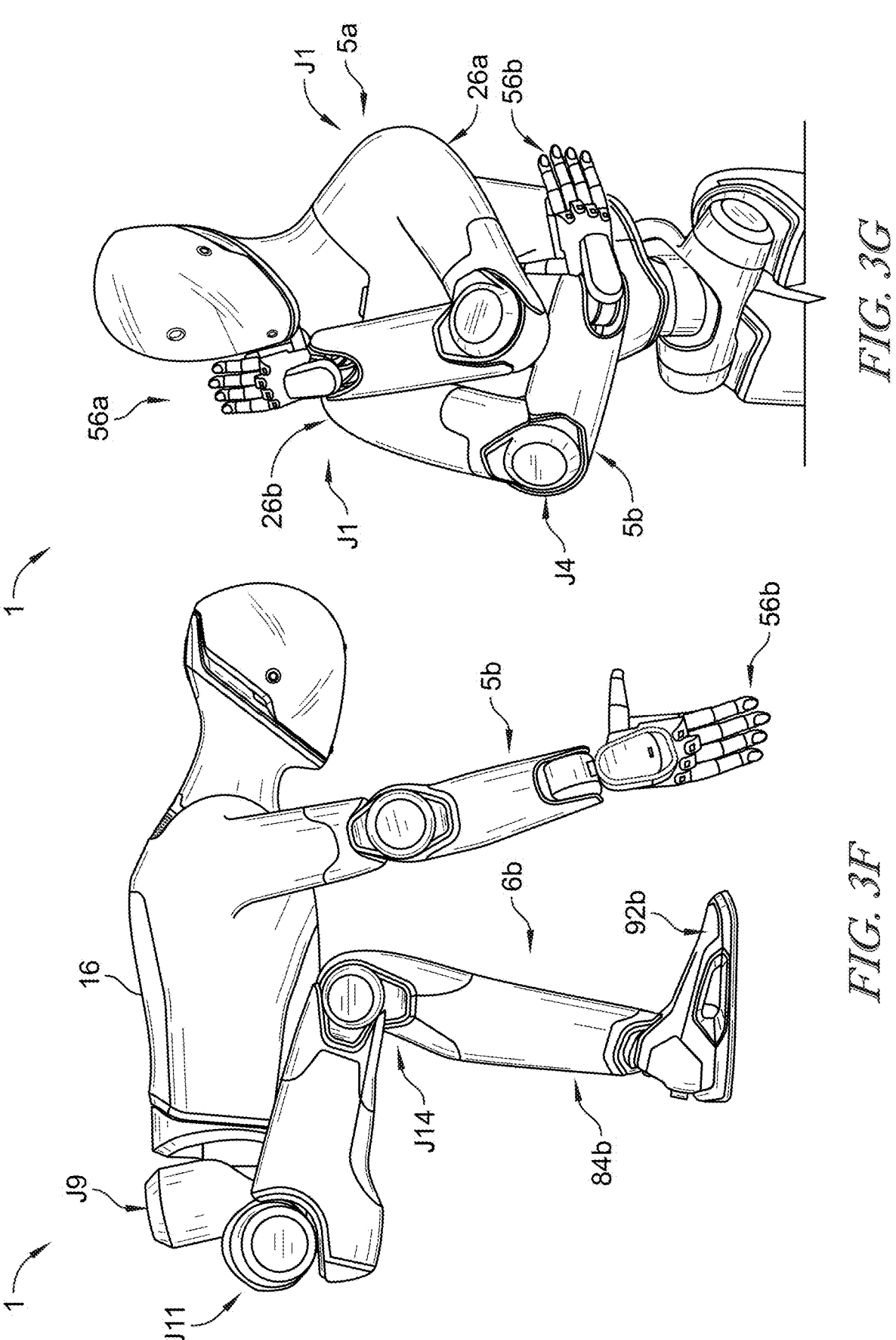
FIG. 3F is a side view of the robot of FIG. 3D.
FIG. 3G is a perspective view of the robot of FIG. 1 with the left and right arms extending medially across the torso in different positions.

FIGS. 3D-3F show a third exemplary bending position for picking up a bin from the ground. This position represents a combination of the first and second positions, wherein the robot 1 bends its torso 16 forward with a flexion pitch movement about axes $A_{11}$ of both the left and right hip flex actuators (J11) 720 and also bends at the knees (J14) 820 without moving to a full squatting position. Similar to the second bending position, the hip roll actuators (J12) 768 can rotate the legs 6 laterally on each side to allow clearance for the torso 16 to be positioned therebetween without interference. In this position the torso 16 may be in contact or close to contact with the legs 6. The arms can be rotated forward at the arm actuator (J1) 190 and/or any combination of arm actuators can position the hands 56 to pick up the bin. As can be understood, these three example bending positions are only a sample of the multitude of combinations of actuator and component positions that can be used to do the same task.

Figures 3H, 3I:
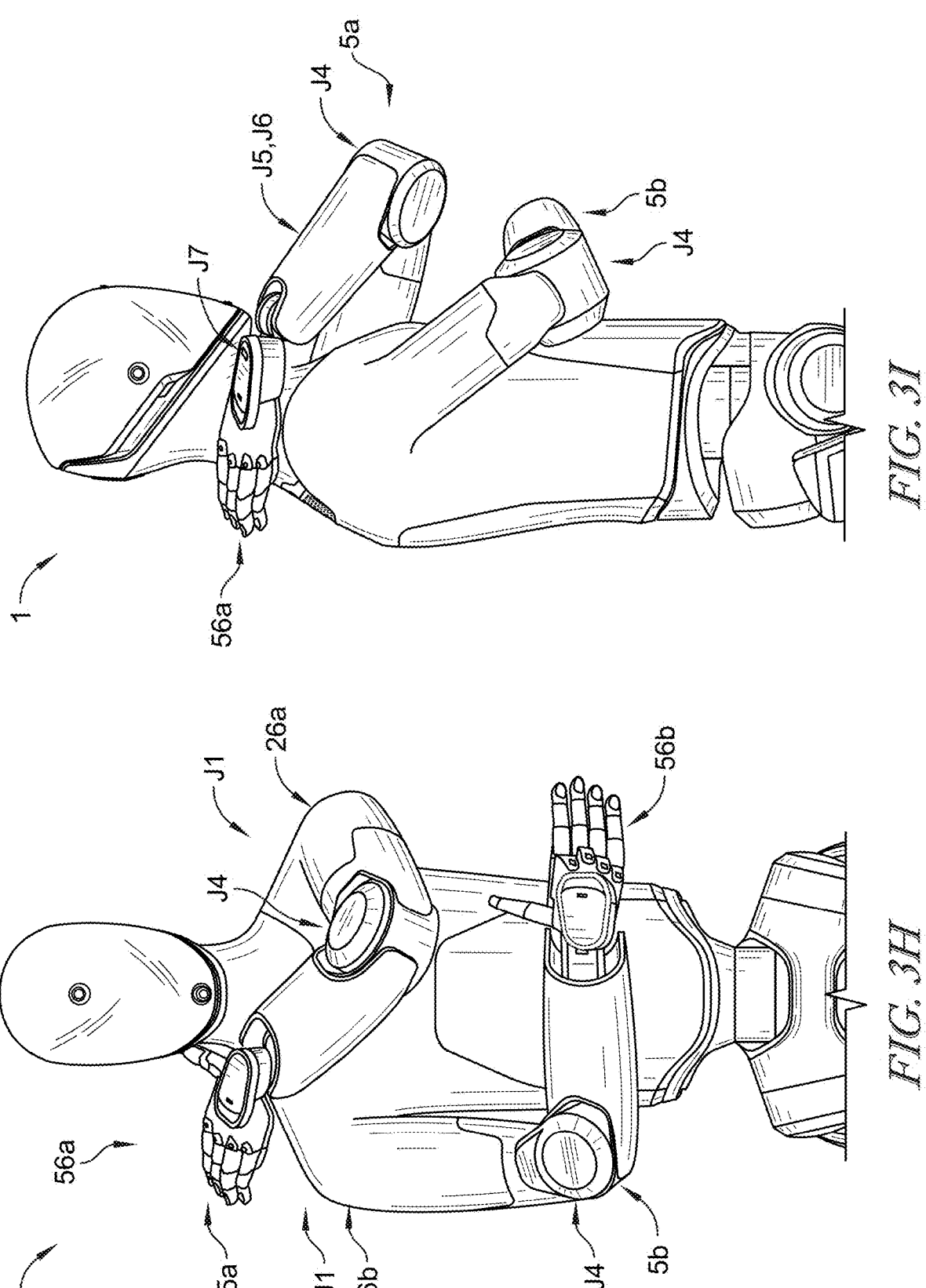
FIG. 3H is a front view of the robot of FIG. 3G.
FIG. 3I is a side view of the robot of FIG. 3G.

While the above bending examples demonstrate substantially symmetrical positions to complete a task, FIGS. 3G-3I illustrate asymmetrical positions of the arms 5. In particular, cross-body positions are shown where the left arm 5a is above the right arm 5b. As such, the various actuators of the left arm are positioned differently than the right arm.

The compound movements shown in FIGS. 3A-3I are further described with examples showing the movements of individual actuators. The combination of the pictorial disclosure and written disclosure of the arm, spine, and leg assemblies provides examples of the principles of the disclosed assemblies, methods, and systems, and is not intended to limit the broad aspects of the disclosed concepts solely to the illustrated embodiments.

a. Upper Portion

Based on the above-described component locations and positions, various examples of the range of motion of the arms 5 of the robot 1 are shown in at least FIGS. 21-32. In these figures, the initial position of the arm 5 is in the extended state as shown in FIG. 9, where an arm axis ($A_A$) serves as a reference axis that is in a plane substantially parallel to the transverse plane ($P_T$). The arm axis ($A_A$) is also in a plane substantially parallel to the coronal plane ($P_C$) and offset rearward. The arm axis ($A_A$) is defined as being collinear with axes $A_3$ and As of the upper arm twist actuator (J3) 320 and lower arm twist actuator (J5) 468, when the robot 1 is in the extended state. The various example arm positions are each based on the movement of a single actuator (J1-J7), individually illustrated at a first limit angle and a second limit angle. Although the examples describe different limit positions for the arm 5, one or more actuators may be used in combination to achieve the positions illustrated in FIGS. 3A-3I.

Figure 15:
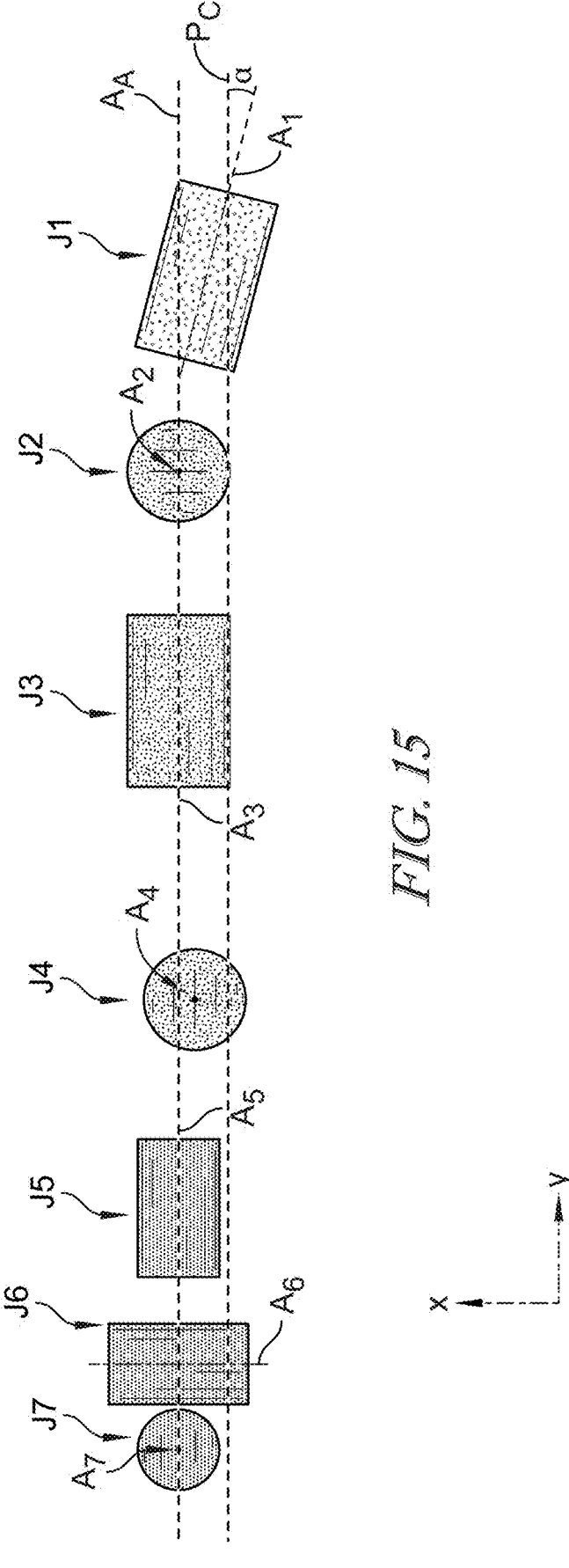
FIG. 15 is a top view of the right arm actuators shown in FIG. 12.
Figure 16:
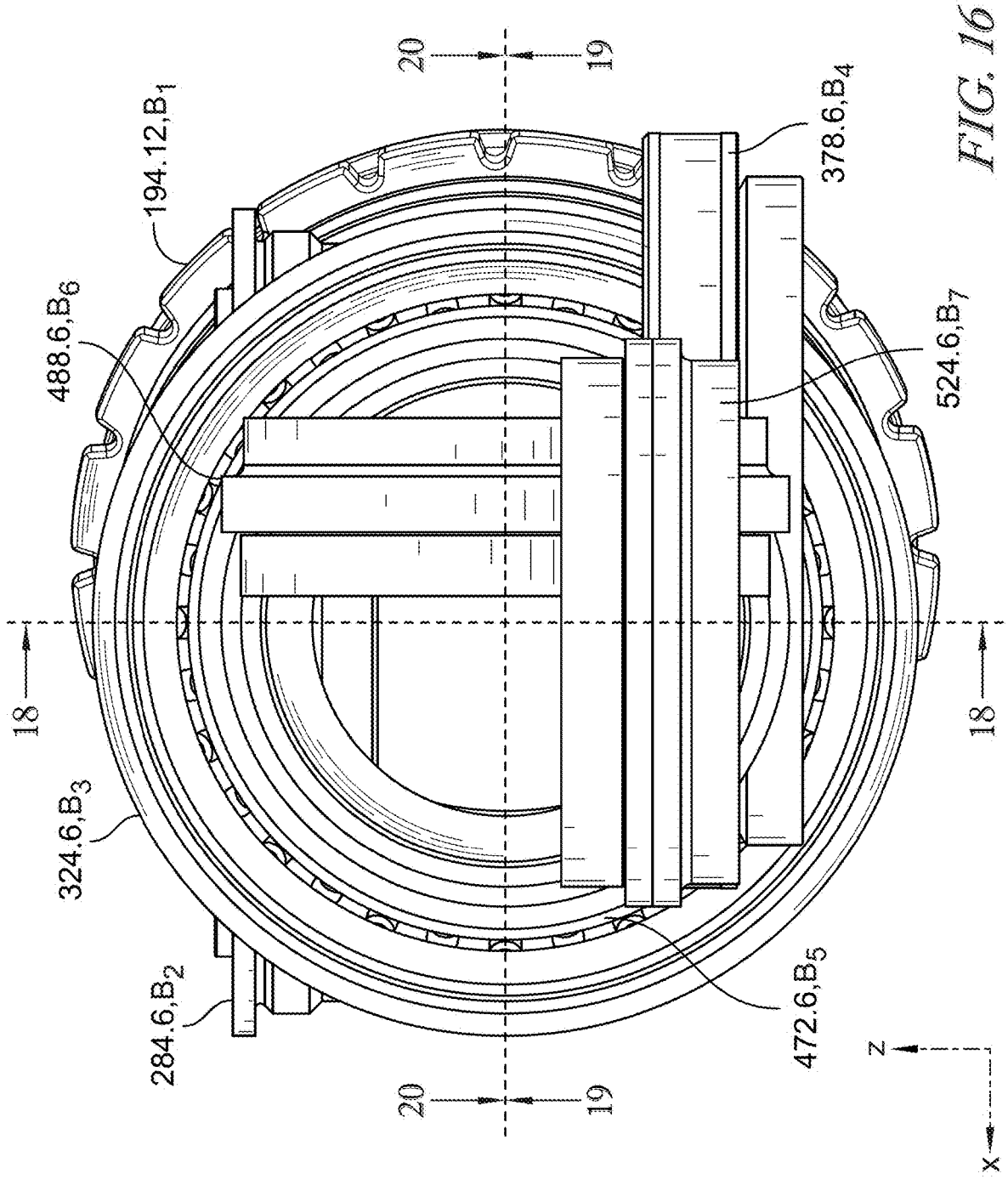
FIG. 16 is a right side view of the actuator bearings contained in the right arm assembly of the robot of FIG. 17.
Figure 17:
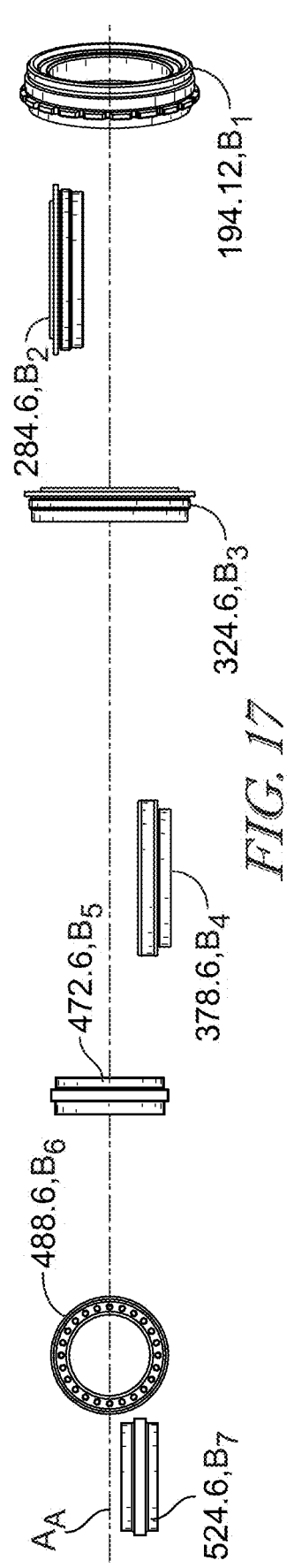
FIG. 17 is a front view of the arrangement of actuator bearings contained in the right arm assembly of the robot of FIG. 6.
Figure 21:
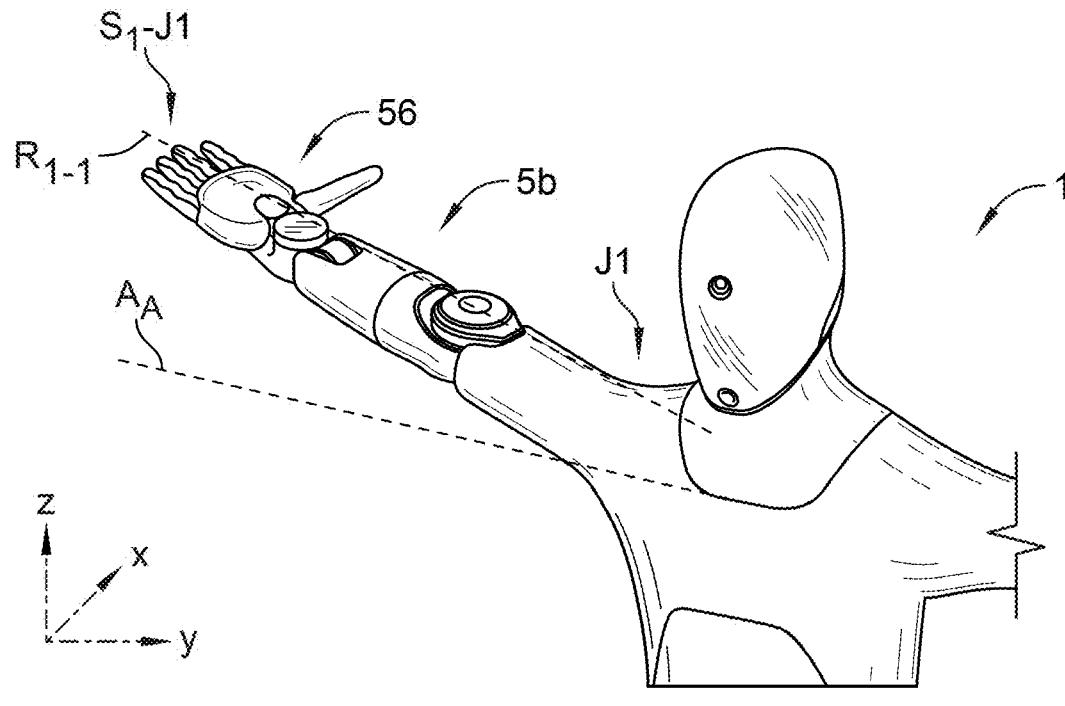
FIG. 21 is a perspective view of an upper portion of the robot of FIG. 9, showing a right arm extending from a portion of the torso, where the arm actuator (J1) is rotated to a first limit angle.
Figure 22:
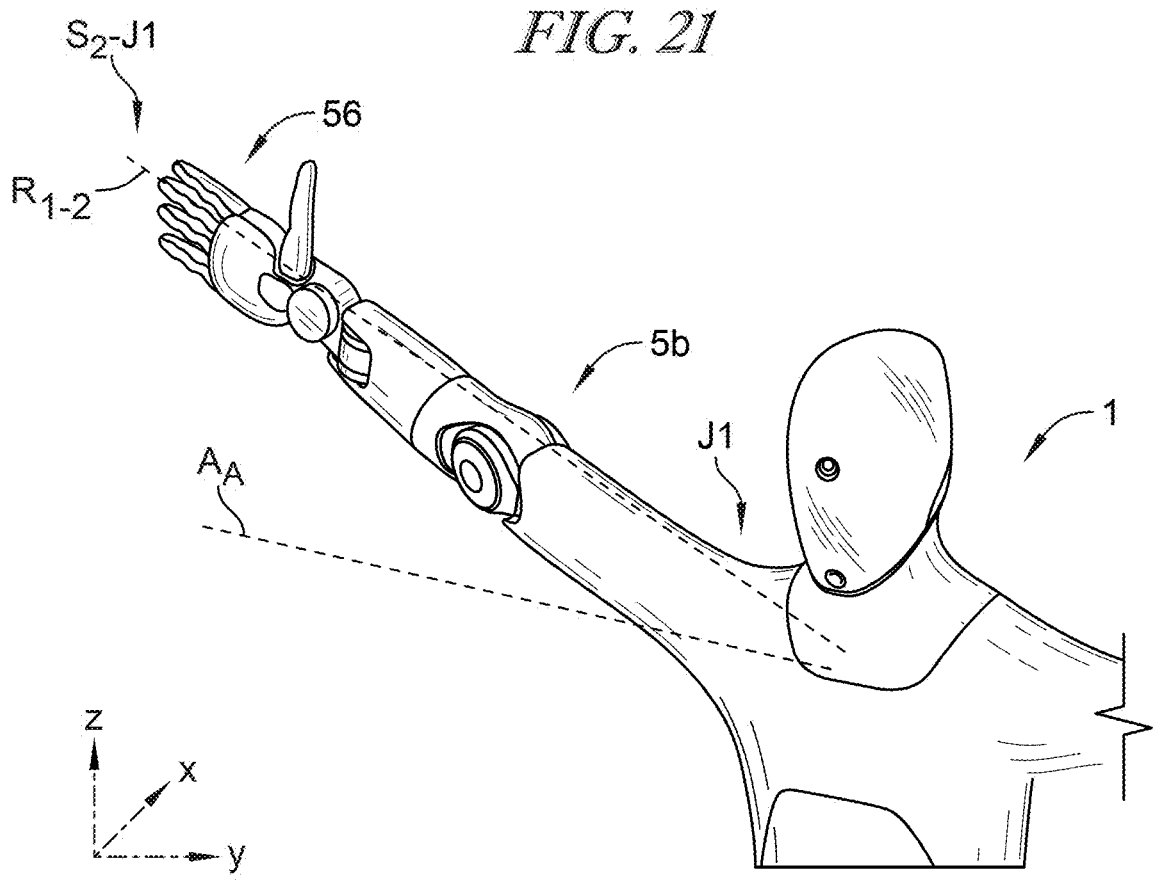
FIG. 22 is a perspective view of an upper portion of the robot of FIG. 9, showing a right arm extending from a portion of the torso, where the arm actuator (J1) is rotated to a second limit angle.

FIGS. 21-22 illustrate the range of motion of the arm actuator (J1) 190 for positioning the right arm assembly 5, where the other actuators (J2-J7) in the arm assembly 5 do not apply any torque. For example, the first limit state ($S_1$-J1) of the arm actuator (J1) 190 may be about −145 to about −216 degrees and the second limit state ($S_2$-J1) may be about 72 to about 107 degrees. As shown in at least FIG. 15, the axis $A_1$ of the arm actuator (J1) 190 is positioned at a rearward angle ($\alpha$) with respect to a coronal plane ($P_C$) or a parallel vertical plane (e.g., a vertical plane that includes the arm axis $A_A$). The angle $\alpha$ is neither orthogonal nor parallel to the other arm axes ($A_2$-$A_7$) and a is chosen from a range of between 1 and 45 degrees, with a preferred range between 10 and 20 degrees. By causing the arm actuator (J1) 190 to rotate to a first limit state ($S_1$-J1), the output of said actuator (J1) 190 rotates the right arm 5b counterclockwise with respect to the torso 16, causing the arm assembly 5b to rotate and be angled posteriorly. For example, as shown in FIG. 21, the right arm 5b is angled with respect to the coronal plane ($P_C$) when in the first limit state ($S_1$-J1), where the movement is also illustrated by the portion of the arm axis that extends from the arm actuator (J1) 190. By causing the arm actuator (J1) 190 to rotate in the opposite direction to a second limit state ($S_2$-J1), the output of said arm actuator (J1) 190 rotates the right arm 5b clockwise with respect to the torso 16, causing the arm assembly 5b to rotate and be angled upward. As shown in FIG. 22, when in the second limit state ($S_2$-J1), the right arm 5b is angled with respect to the transverse plane ($P_T$) and coronal plane ($P_C$).

Figures 23, 24:
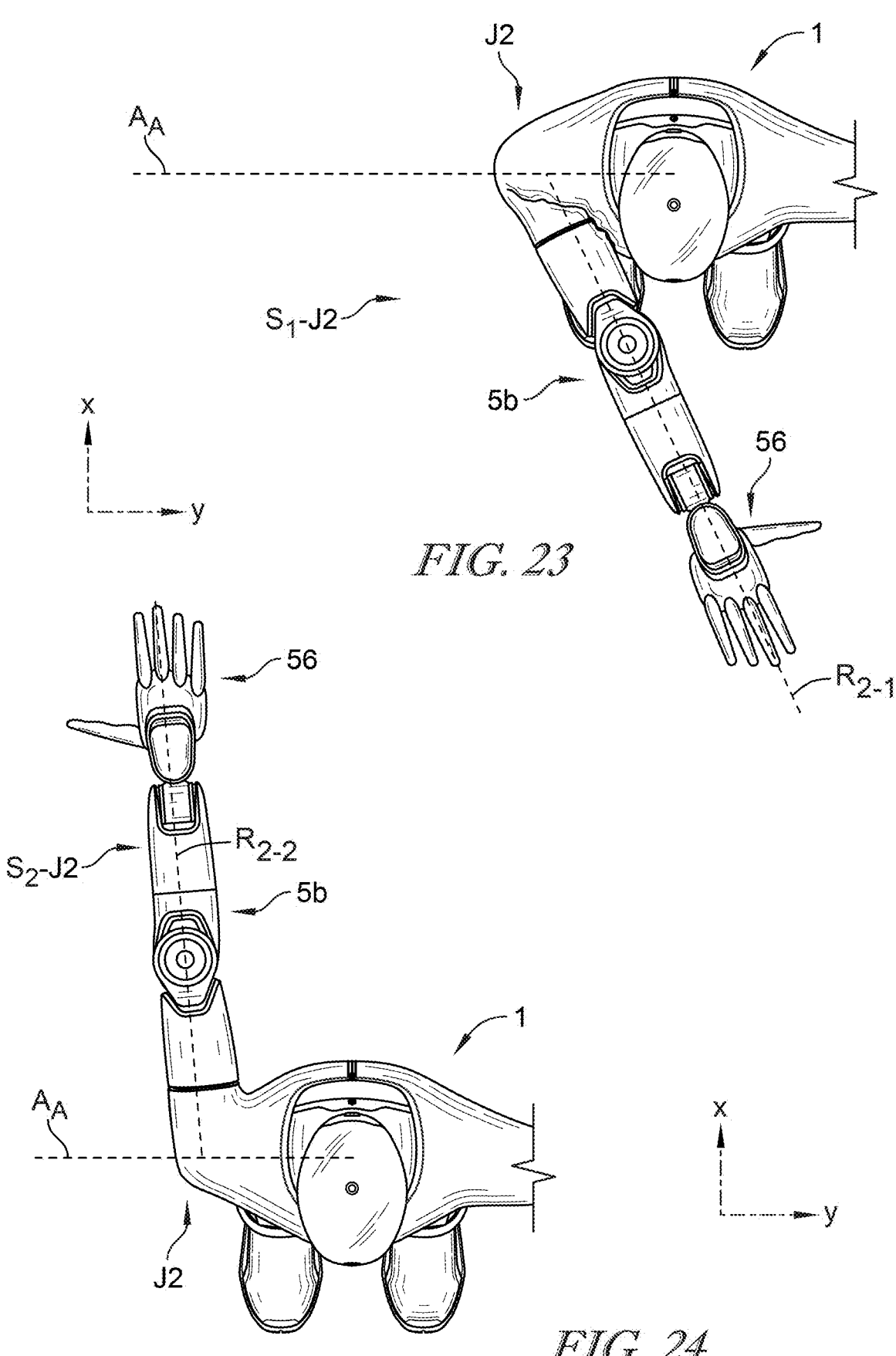
FIG. 23 is a top view of an upper portion of the robot of FIG. 9, showing a right arm extending from a portion of the torso, where the shoulder actuator (J2) is rotated to a first limit angle.
FIG. 24 is a top view of an upper portion of the robot of FIG. 9, showing a right arm extending from a portion of the torso, where the shoulder actuator (J2) is rotated to a second limit angle.

In FIGS. 23-24, the range of motion of the shoulder actuator (J2) 280 of the right arm 5b is illustrated, where the right arm actuator (J1) 190 remains in a neutral initial position and the other actuators (J3-J7) in the arm assembly 5b do not apply any torque. For example, the first limit state ($S_1$-J2) of the shoulder actuator (J2) 280 may be about −44 to about −66 degrees and the second limit state ($S_2$-J2) may be about 116 to about 175 degrees. In this example, the arm assembly 5b is initially in an extended arm position (as depicted in FIG. 9) and the shoulder actuator (J2) 280 is caused to rotate to a first limit state ($S_1$-J2). With this movement, the output of said shoulder actuator (J2) 280 rotates the right arm 5b clockwise with respect to the torso 16, causing the arm assembly 5b to rotate and be angled anteriorly and downward. As shown in FIG. 23, when in the first limit state ($S_1$-J2), the right arm 5b is rotated toward the sagittal plane ($P_S$) and angled with respect to the transverse plane ($P_T$) and coronal plane ($P_C$). By causing the shoulder actuator (J2) 280 to rotate in the opposite direction to a second limit state ($S_2$-J2), the output of said actuator (J2) 280 rotates the right arm 5b counterclockwise with respect to the torso 16, causing the arm assembly 5b to rotate and be angled upward. As shown in FIG. 24, when in the second limit state ($S_2$-J2), the right arm 5b is angled with respect to the transverse plane ($P_T$) and coronal plane ($P_C$).

The range of motion of the upper arm twist actuator (J3) 320 of the right arm 5b may include a first limit state ($S_1$-J3) of about −25 to about −36 degrees and the second limit state ($S_2$-J3) of about 124 to about 186 degrees. In this example, the initial position of the arm 5b is in the extended state as shown in FIG. 9. The upper arm twist actuator (J3) 320 is actuated to a first limit state ($S_1$-J3), where the other actuators (J1, J2, J4-J7) in the arm assembly 5b do not apply any torque. With this movement to the first limit state ($S_1$-J3), the upper arm twist actuator (J3) 320 rotates a portion of the right arm 5b, extending from the upper humerus 36, clockwise about the arm axis ($A_A$). The arm 5b remains in a modified extended position, with a portion of the arm from the lower humerus 36 to the hand 56 being reoriented, including the elbow actuator (J4) 374. When the upper arm twist actuator (J3) 320 is rotated to a second limit state ($S_2$-J3), the output of said upper arm twist actuator (J3) 320 rotates the portion of the right arm 5b counterclockwise about the arm axis ($A_A$), causing a portion of the arm from the lower humerus 36 to the hand 56 to be reoriented.

Figure 25:
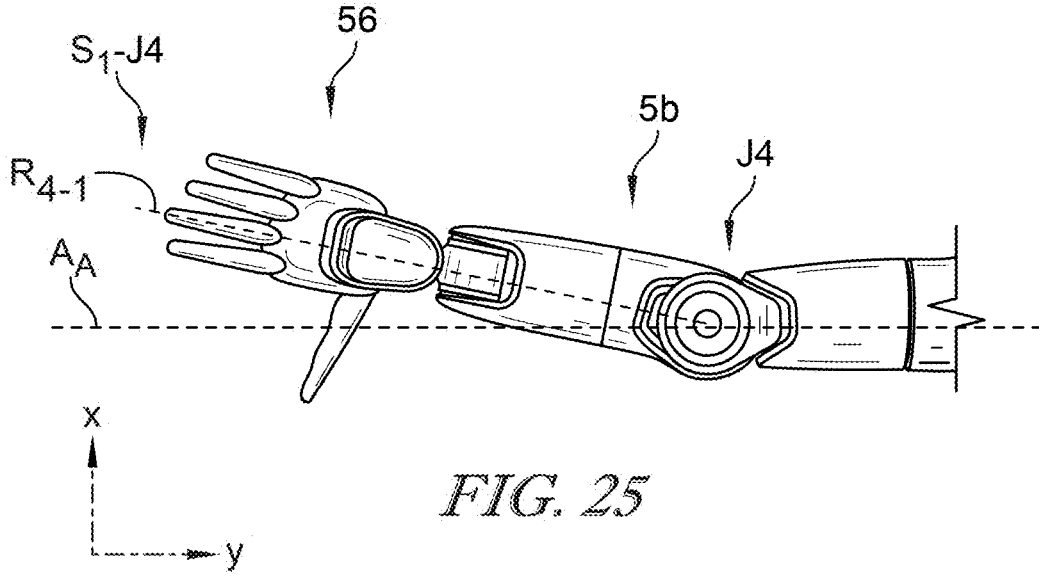
FIG. 25 is a top view of a portion of the right arm of the robot of FIG. 9, where the elbow actuator (J4) is rotated to a first limit angle.
Figure 26:
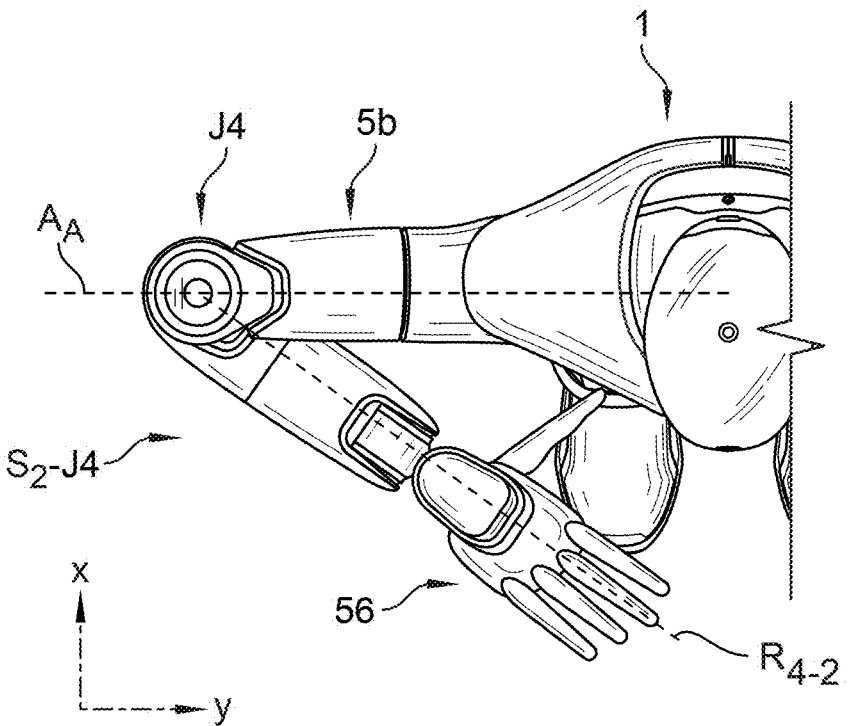
FIG. 26 is a top view of a portion of the robot of FIG. 9, showing a right arm extending from a portion of the torso, where the elbow actuator (J4) is rotated to a second limit angle.

In FIGS. 25-26, the range of motion of the elbow actuator (J4) 374 in the right arm 5b is illustrated, where the arm actuator (J1) 190, the shoulder actuator (J2) 280, and the upper arm twist actuator (J3) 320 remain in a neutral initial position and the other actuators (J5-J7) in the arm assembly 5b do not apply any torque. For example, the first limit state ($S_1$-J4) of the elbow actuator (J4) 374 may be about −8 to about −12 degrees and the second limit state ($S_2$-J4) may be about 116 to about 174 degrees. In this example, the arm assembly 5b is initially in an extended arm position (as depicted in FIG. 9), with the arm axis ($A_A$) substantially in a plane parallel to the transverse plane ($P_T$), and the elbow actuator (J4) 374 is rotated to a first limit state ($S_1$-J4). As shown in FIG. 25, by rotating to the first limit state ($S_1$-J4), the portion of the arm 5b below the elbow actuator (J4) 374 (i.e., upper forearm 40, lower forearm 46, wrist 50, hand 56) is moved rearward, remaining substantially in a plane parallel to the transverse plane ($P_T$). In FIG. 26, when the elbow actuator (J4) 374 is rotated to a second limit state ($S_2$-J4), the portion of the arm 5b below the elbow actuator (J4) 374 (i.e., upper forearm 40, lower forearm 46, wrist 50, hand 56) is moved forward towards the front of the torso 16, remaining substantially in a plane parallel to the transverse plane ($P_T$).

The range of motion of the lower arm twist actuator (J5) 468 of the right arm 5b may include a first limit state ($S_1$-J5) of −120 to about −181 degrees and the second limit state ($S_2$-J5) of about 120 to about 181 degrees. In this example, the initial position of the arm 5b is in the extended state as shown in FIG. 9. The lower arm twist actuator (J5) 468 is actuated, causing a portion of the arm to rotate clockwise about the arm axis ($A_A$) to a first limit state ($S_1$-J5), where the other actuators (J1-J4, J6, J7) in the arm assembly 5b do not apply any torque. With this movement, the lower arm twist actuator (J5) 468 rotates a portion of the right arm 5b. The arm 5b remains in an extended position, with the lower forearm 46, wrist 50, and hand 56 rotated. A portion of the right arm 5b is shown rotated counterclockwise about the arm axis ($A_A$) at the lower arm twist actuator (J5) 468 to the second limit state ($S_2$-J5).

Figure 27:
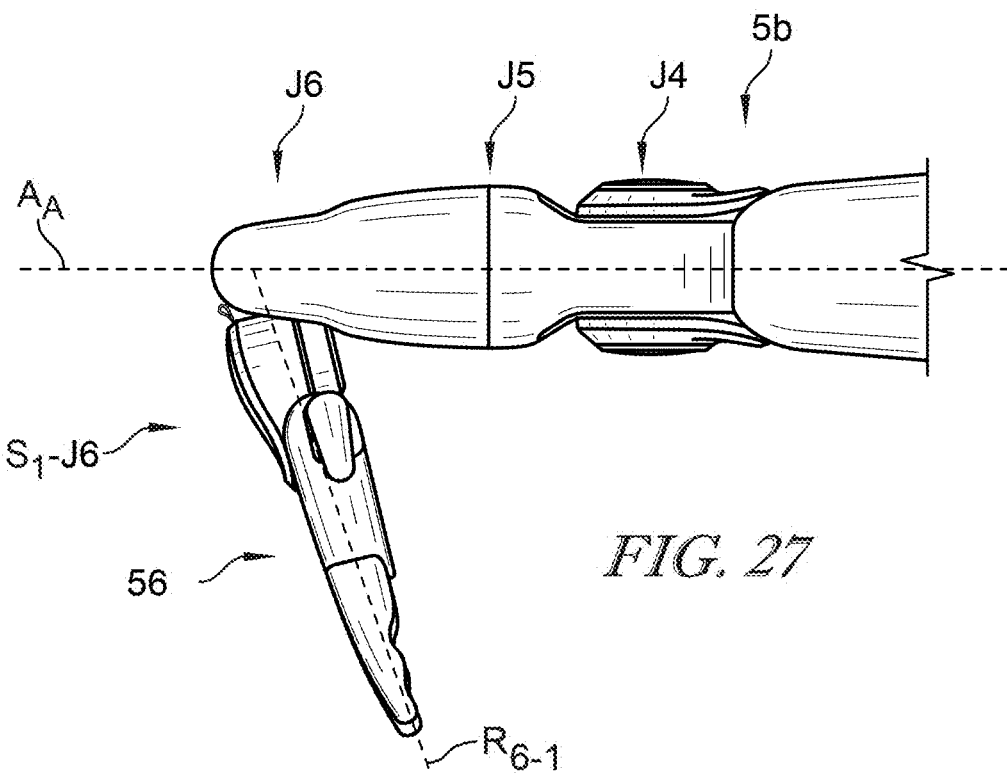
FIG. 27 is a front view of a portion of the right arm of the robot of FIG. 9, where the wrist flex actuator (J6) is rotated to a first limit angle.
Figure 28:
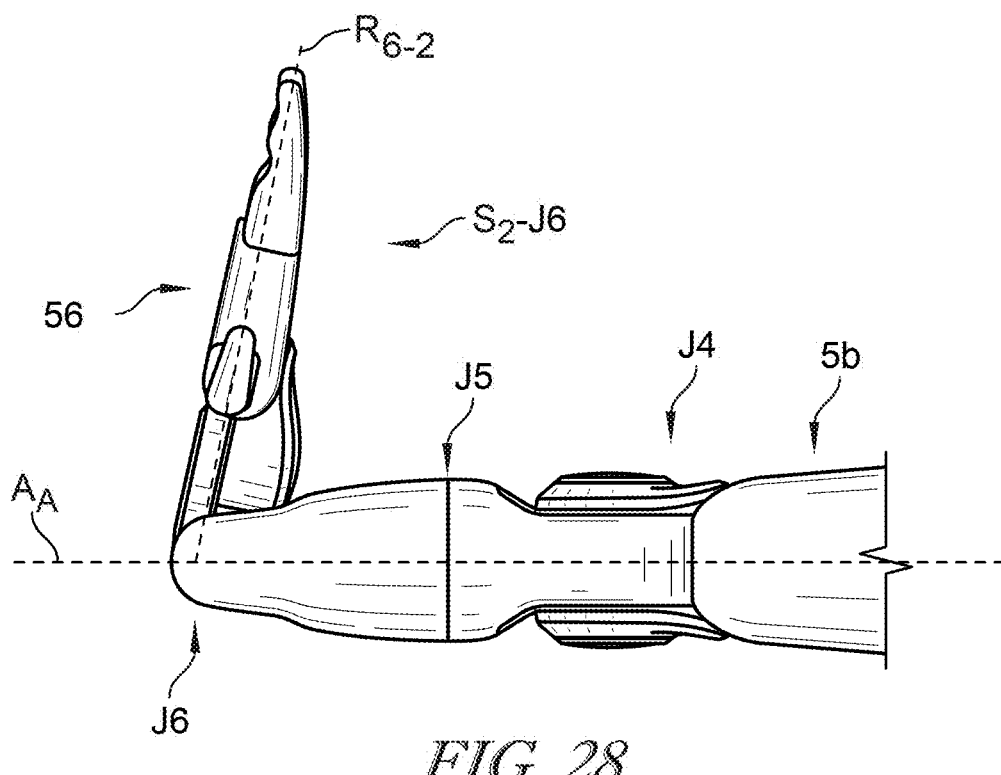
FIG. 28 is a front view of a portion of the right arm of the robot of FIG. 9, where the wrist flex actuator (J6) is rotated to a second limit angle.

In FIGS. 27-28, the range of motion of the wrist flex actuator (J6) 484 in the right arm 5b is illustrated, where the actuators (J1-J5) remain in the initial extended state and the wrist pivot actuator (J7) 520 does not apply any torque. For example, the first limit state ($S_1$-J6) of the wrist flex actuator (J6) 484 may be about −80 to about −120 degrees and the second limit state ($S_2$-J6) may be about 82 to about 123 degrees. In this example, the arm assembly 5b is initially in an extended arm position (as depicted in FIG. 9), with the arm axis ($A_A$) substantially in a plane parallel to the transverse plane ($P_T$). As shown in FIG. 27, when the wrist flex actuator (J6) 484 is rotated to the first limit state ($S_1$-J6), the hand 56 is angled downward with respect to the arm axis ($A_A$) and a plane parallel to the transverse plane ($P_T$). In FIG. 28, when the wrist flex actuator (J6) 484 is rotated to the second limit state ($S_2$-J6), the hand 56 is angled upward with respect to the arm axis ($A_A$) and a plane parallel to the transverse plane ($P_T$).

Figure 29:
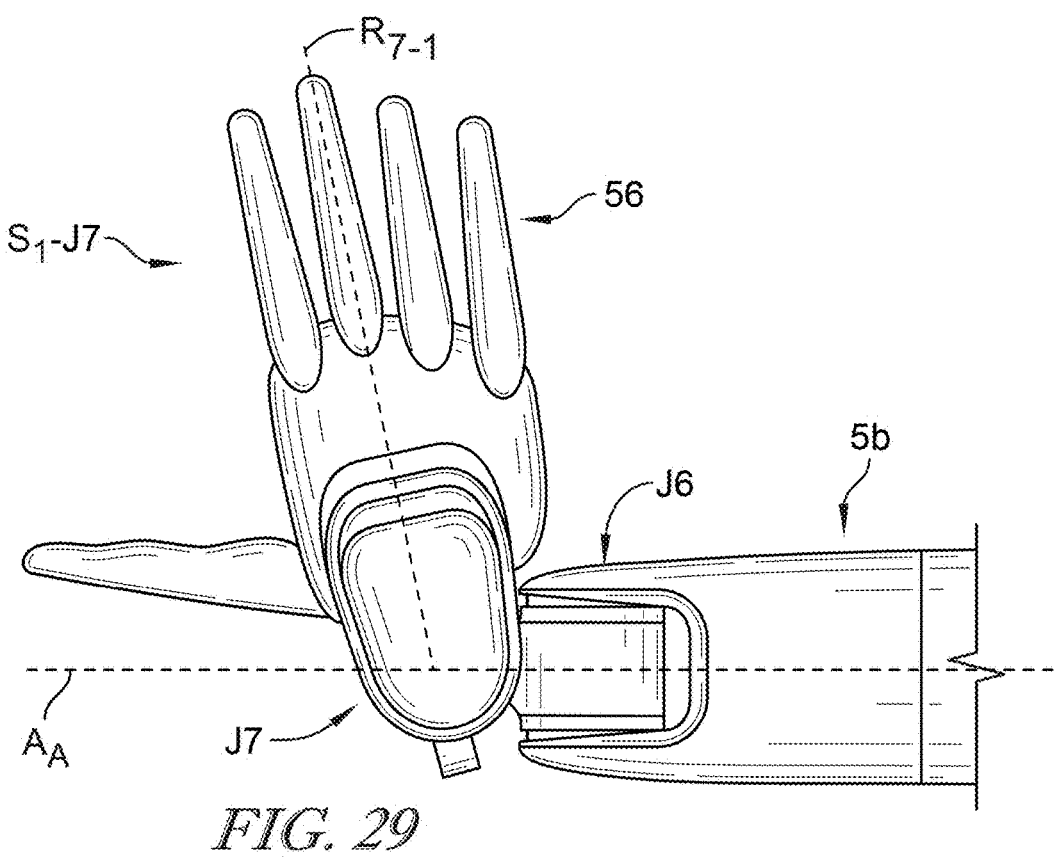
FIG. 29 is a front view of a portion of the right arm of the robot of FIG. 9, where the wrist pivot actuator (J7) is rotated to a first limit angle.
Figure 30:
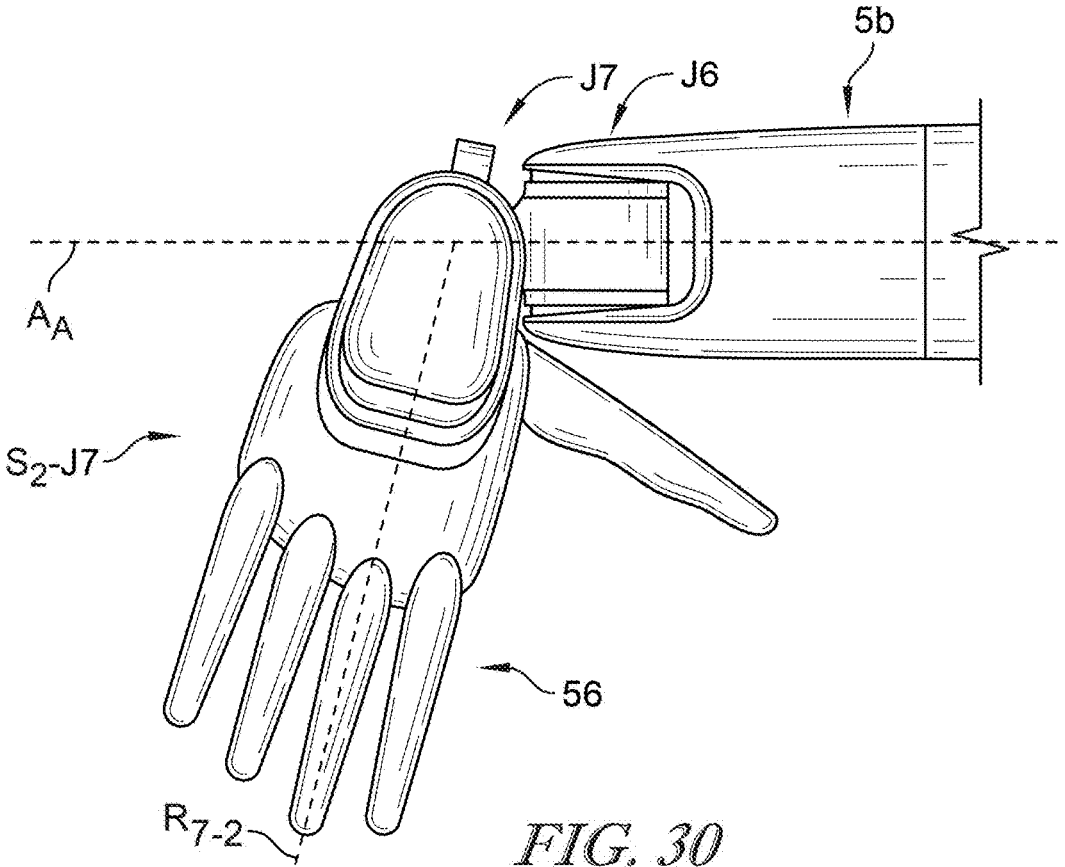
FIG. 30 is a front view of a portion of the right arm of the robot of FIG. 9, where the wrist pivot actuator (J7) is rotated to a second limit angle.

In FIGS. 29-30, the range of motion of the wrist pivot actuator (J7) 520 in the right arm 5b is illustrated, where the actuators (J1-J6) remain in the initial extended state. For example, the first limit state ($S_1$-J7) of the wrist pivot actuator (J7) 520 may be about −60 to about −90 degrees and the second limit state ($S_2$-J7) may be about 64 to about 96 degrees. In this example, the arm assembly 5b is initially in an extended arm position (as depicted in FIG. 9), with the arm axis ($A_A$) substantially in a plane parallel to the coronal plane ($P_C$). As shown in FIG. 29, when the wrist pivot actuator (J7) 520 is rotated to the first limit state ($S_1$-J7), the hand 56 pivots rearward with respect to the arm axis ($A_A$) and a plane parallel to the coronal plane ($P_C$). In FIG. 30, when the wrist pivot actuator (J7) 520 is rotated to the second limit state ($S_2$-J7), the hand 56 is angled forward with respect to the arm axis ($A_A$) and a plane parallel to the coronal plane ($P_C$).

Further, shown in FIG. 5, each hand 56 can have a plurality of rotational axes in each finger and thumb configured to grasp objects. Additional information about said hand 56 is disclosed within PCT/US25/10425, PCT/US25/11450, 19/000,626, 19/006,191, 63/614,499, 63/615,766, 63/617,762, 63/620,633, 63/561,315, 63/573,226, 63/701,625, 63/757,440, and 63/828,916, each of which is fully incorporated herein by reference. Further, an alternative version of a hand 56 that may be used instead of the depicted hand is disclosed within 63/680,381, Ser. Nos. 19/173,793, and 19/249,517, each of which is fully incorporated herein by reference.

b. Central Portion

As shown in FIG. 9, the left and right legs 6a, 6b extend from the pelvis 64 and are substantially symmetric about the sagittal plane ($P_S$). Generally, the torso twist actuator (J10) 620, torso lean actuator (J9) 680, and the hip flex actuators (J11) 720 are configured to adjust the position of the torso 16 and upper body relative to the legs 6. In each leg 6, the hip flex actuator (J11) 720, hip roll actuator (J12) 768, and leg twist actuator (J13) 782 are configured to adjust the position of the respective upper leg 6.1, where the knee actuator (J14) 820 is configured to move the lower leg 6.2 with respect to the upper leg 6.1. In the illustrative embodiment, the hip flex actuators (J11) 720 may work independently to lift an individual leg 6 or together for the robot 1 to squat, as shown in FIGS. 3A-3C, or bend forward, as shown in FIGS. 3D-3F.

Figure 8:
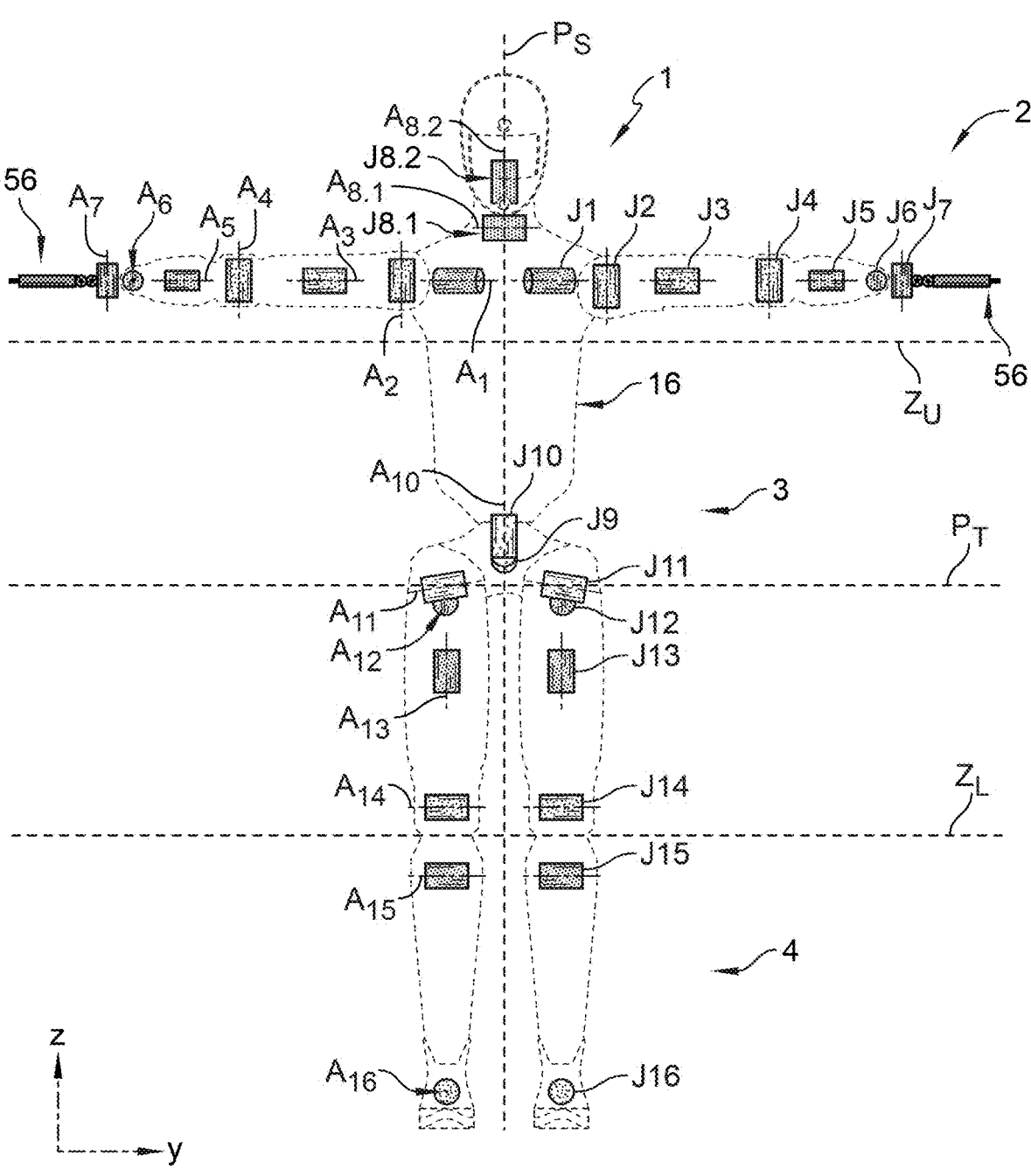
FIG. 8 is a front view of the robot of FIG. 4 showing the actuators contained therein.
Figure 10:
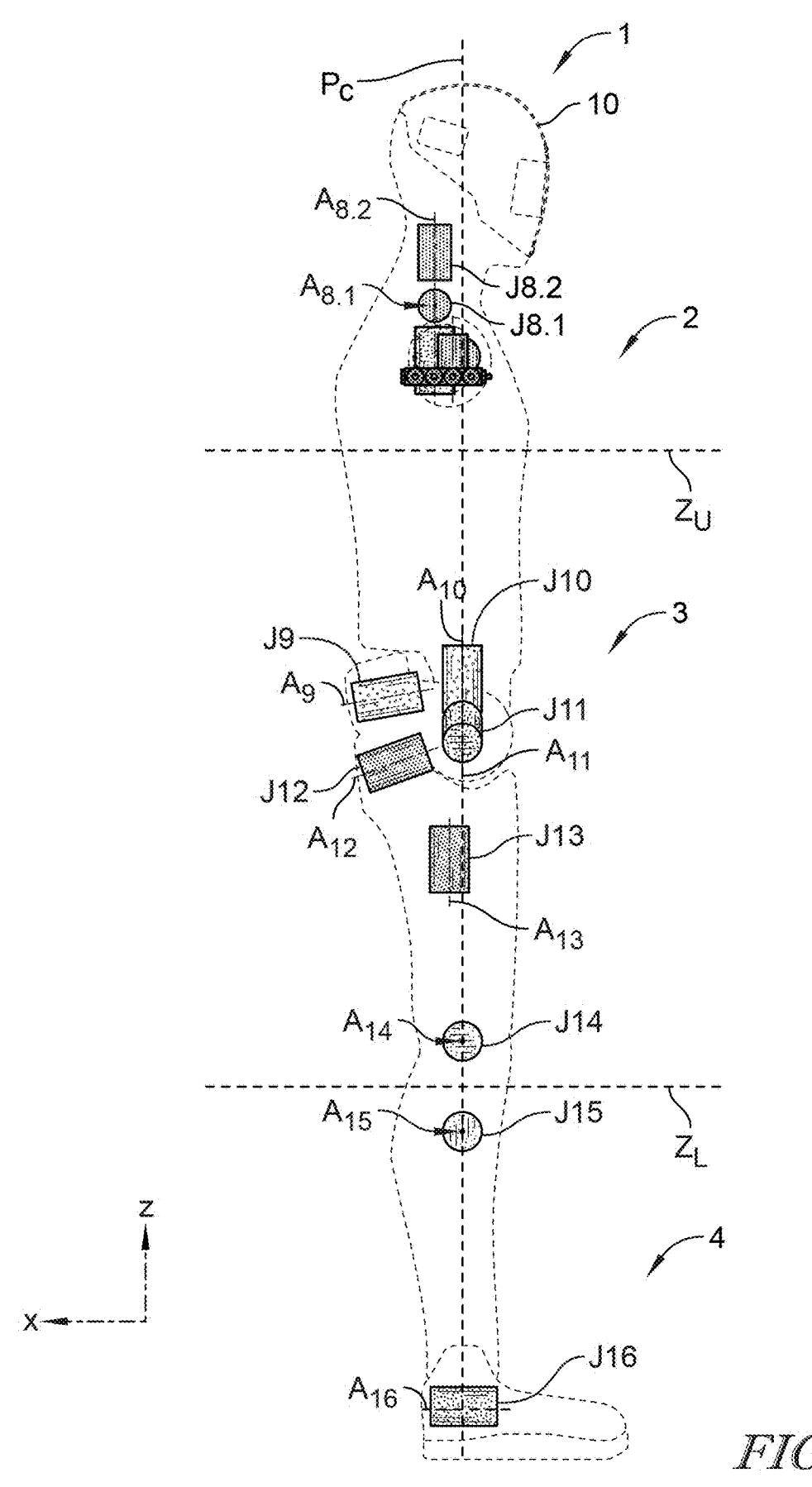
FIG. 10 is a right side view of the robot of FIG. 4 showing the actuators contained therein.
Figure 31:
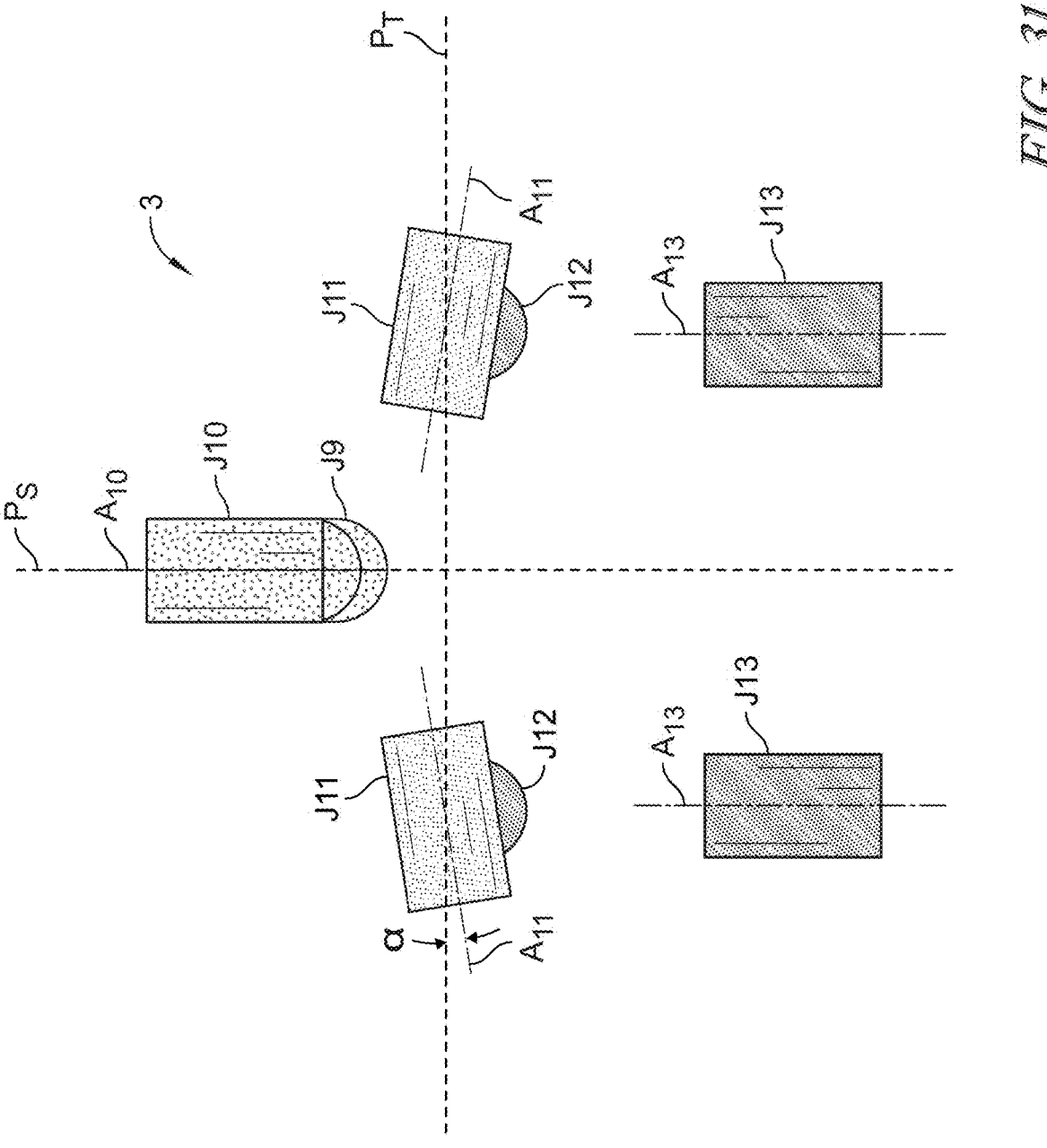
FIG. 31 is a front view of the central portion actuators (J9-J13) shown in FIG. 4.
Figure 32:
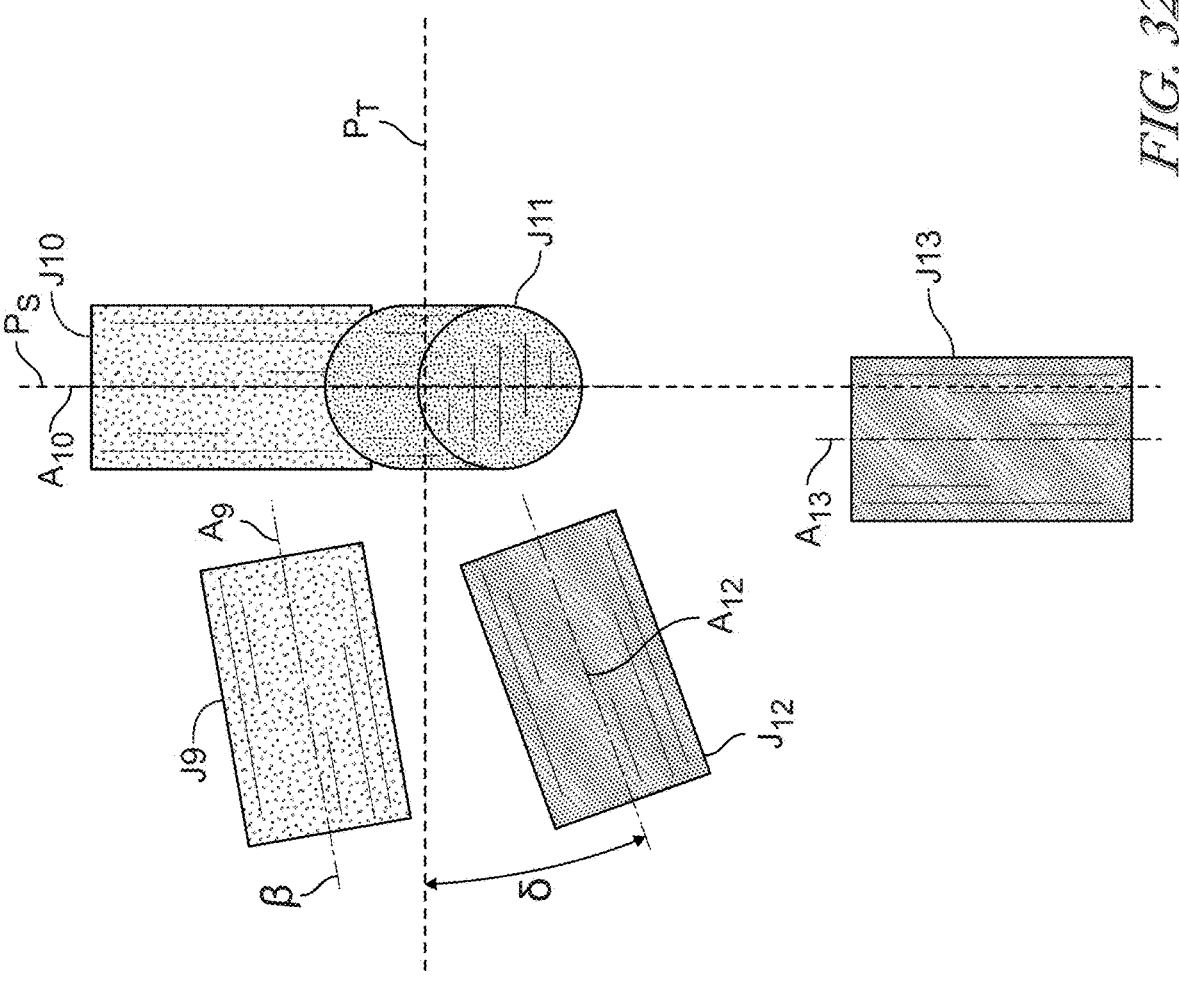
FIG. 32 is a right side view of the central portion actuators (J9-J13) shown in FIG. 4.

FIGS. 31-32 show the positional relationship of the actuators (J9-J13) in the central portion 3 of the robot 1, where the relative position of the knee actuator (J14) 820 is further shown in FIGS. 8 and 10. The torso twist axis $A_{10}$ of the torso twist actuator (J10) 620 is coplanar with the sagittal plane ($P_S$) and coronal plane ($P_C$) and orthogonal to the transverse plane ($P_T$). The torso lean axis $A_9$ is coplanar with the sagittal plane ($P_S$); however, the torso lean axis $A_9$ is angled downward forming an angle beta (β) with respect to the transverse plane ($P_T$). The hip flex actuator (J11) 720, the hip roll actuator (J12) 768, and the leg twist actuator (J13) 782 respectively provide the leg 6 with axes of rotation $A_{11}$, $A_{12}$, and $A_{13}$ for Y-axis (pitch), X-axis (roll), and Z-axis (yaw or twist) of the upper leg 6.1. The axis $A_{13}$ of the leg twist actuator (J13) 782 defines a reference leg axis AL when the robot 1 is in the neutral state or extended state. The leg twist actuators (J13) 782 provide yaw motion for the legs 6, including the foot 92, and are located below the hip flex actuator (J11) 720 and the hip roll actuator (J12) 768. The hip roll actuators (J12) 768 are located below the hip flex actuators (J11) 720 and provide roll motion for the legs 6. The hip flex actuators (J11) 720 provide pitch motion for the legs 6 and they are located above the hip roll actuators (J12) 768 and the leg twist actuators (J13) 782. Although the hip roll actuator (J12) 768 is identified as providing roll motion about the X-axis, it should be noted that the axis of rotation $A_{12}$ of the hip roll actuator (J12) 768 is not parallel to the X-axis or orthogonal to axes $A_{11}$ and $A_{13}$. In robot 1, the axis of rotation $A_{12}$ of the hip roll actuator (J12) 768 is angled with respect to the transverse plane ($P_T$) by an angle gamma (γ), as shown in FIG. 10.

The torso twist actuator (J10) 620 contained in the spine 60 and coupled to the pelvis 64 is configured to rotate or twist the torso 16 of the robot 1 relative to its feet 92. The torso lean actuator (J9) 680 contained in the pelvis 64 is configured to lean the torso 16 of the robot 1 left or right relative to its feet 92. the hip flex actuator (J11) 720 can move the leg 6 forward and backward relative to the robot's torso 16 and/or coronal plane ($P_C$), while the hip roll actuator (J12) 768 can move the leg 6 sideways to the left or right relative to the robot's torso 16 or in the coronal plane ($P_C$). Additionally, the torso twist actuator (J10) 620 can allow the torso 16 of the robot 1 to rotate or twist relative to its feet 92 and the leg twist actuator (J13) 782 can rotate the leg 6 relative to the robot's torso 16, while the knee actuator (J14) 820 can bend the knee or leg 6 of the robot 1.

In each leg 6, the hip flex actuator (J11) 720, hip pivot actuator (J12) 768, and leg twist actuator (J13) 782 are configured to adjust the position of the respective upper leg 6.1, where the knee actuator (J14) 820 is configured to move the lower leg 6.2 with respect to the upper leg 6.1. In robot 1, the left and right legs 6a, 6b are interchangeable, further reducing the number of unique parts. Further, having the hip flex actuator (J11) 720 in the pelvis 64 may be most used for the forward walking movements of the robot 1. On the other hand, the inertia of the pitch movements of the leg 6 can be increased because the mass of both the hip roll actuator (J12) 768 and the leg twist actuator (J13) 782 contributes to the moving mass when the robot 1 walks. Having the actuators (J11, J12, J13) positioned high up in the legs 6, however, can minimize the effects of the increased inertia for pitch movements of the legs 6 during walking and running.

Figures 33, 34:
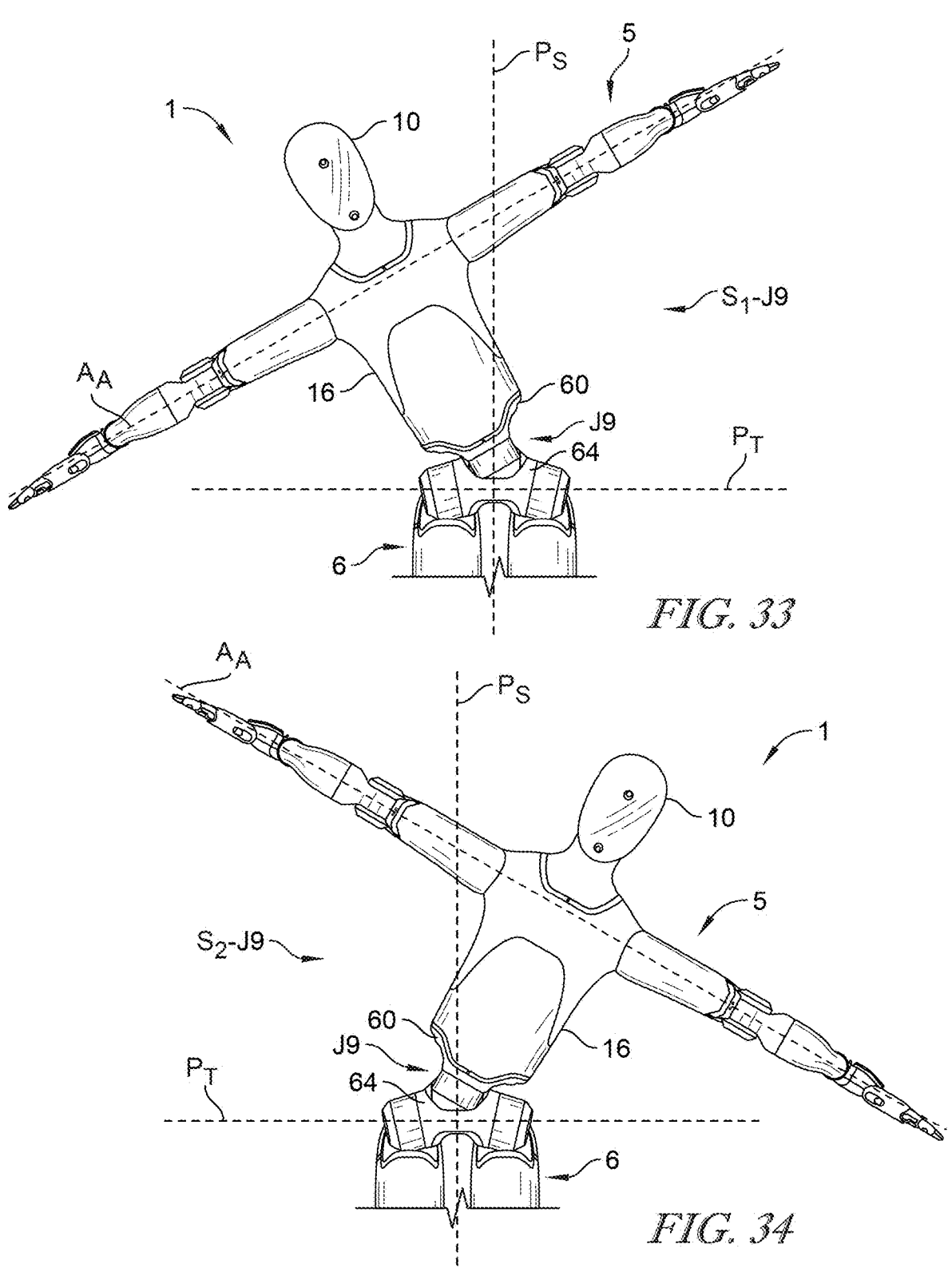
FIG. 33 is a front view of a portion of the robot of FIG. 9, showing an upper portion of the robot extending from the pelvis, where the torso lean actuator (J9) is rotated to a first limit angle.
FIG. 34 is a front view of a portion of the robot of FIG. 9, showing an upper portion of the robot extending from the pelvis, where the torso lean actuator (J9) is rotated to a second limit angle.

The robot 1 does not bend forward at its belly region. To provide similar forward motion, the robot 1 utilizes the hip flex actuators (J11) 720 of the legs 6. For example, as shown in FIGS. 3D-3F, the robot 1 can bend the torso 16 forward at the hip flex actuators (J11) 720 to reach downward. The use of the robot's legs 6 to perform this forward motion reduces the need for additional actuators (e.g., in some embodiments the two hip flex actuators (J11) 720 can do the work of four actuators in prior robots) and beneficially places the loads on the hip flex actuators (J11) 720 for lifting objects off the ground. Thus, the size/torque associated with the hip flex actuators (J11) 720 can be adjusted to account for this functional movement. While the robot 1 does not bend forward at its belly, it can bend sideways at its belly (as shown in FIGS. 33-34). This sideways bending is accomplished using the torso lean actuator (J9) 680. Also, because the forward bending of the robot is done using the legs and the hip flex actuators (J11) 720, the torso lean actuator (J9) 680 can be a smaller actuator having less torque than the hip flex actuators (J11) 720.

FIGS. 33-34 illustrate examples of the spine lateral flexion movement of the torso lean actuator (J9) 680. With an initial position in the extended state (FIG. 9), the robot 1 can lean to its sides at its belly region using the torso lean actuator (J9) 680. The range of motion of the torso lean actuator (J9) 680 can be between about 5 and about 50 degrees, preferably between about 15 and about 40 degrees, and most preferably between about 20 and about 40 degrees. For example, the first limit state ($S_1$-J9) of the torso lean actuator (J9) 680 may be about −24 to about −36 degrees and the second limit state ($S_2$-J9) may be about 24 to about 36 degrees. In FIG. 33, an example is illustrated where only the torso lean actuator (J9) 680 is actuated to a first limit state ($S_1$-J9), causing the torso 16 and upper portion 2 of the robot 1 to lean right. In this example, the torso 16 and upper portion 2 of the robot 1 are substantially aligned with the coronal plane in an initial position; however, the robot 1 may move slightly out of plane with this movement because of the angle beta (β) of the torso lean axis $A_9$. Similarly, FIG. 34 shows a mirrored position when the torso lean actuator (J9) 680 is actuated to a second limit state ($S_2$-J9), causing the torso 16 and upper portion 2 of the robot 1 to lean left.

Of course, the robot 1 can be capable of achieving any other degree of torso lean between these illustrated example positions.

The torso twist actuator (J10) 620 is configured for the robot 1 to be able to reach and grab objects that are positioned to its sides. Accordingly, said robot 1 can have a twisting range of motion associated with the torso twist actuator (J10) 620 that is more than about 45 degrees, preferably more than about 120 degrees, and most preferably more than about 170 degrees. In one embodiment, the torso twist actuator (J10) 620 can have a range of motion of about 180 degrees, i.e., about 90 degrees in either direction from the forward-facing, neutral position.

FIGS. 35-36 illustrate the range of motion of the hip flex actuator (J11) 720, where the other leg actuators (J12-J16) in the leg assembly 6 do not apply any torque. The hip flex actuator (J11) 720 can allow the robot 1 to move its leg 6: (i) backwards between about 5 degrees and about 55 degrees, preferably between about 25 and about 45 degrees, and most preferably between about 30 and about 40 degrees, and (ii) forward between about 25 and about 280 degrees, preferably between about 80 and about 190 degrees, and most preferably between about 145 and about 175 degrees. For example, the first limit state (S1-J11) may be about −182 to about −274 degrees and the second limit state ($S_2$-J11) may be about 26 to about 40 degrees. For reference, when the robot 1 is in the neutral position, a leg axis AL is collinear with axis $A_{13}$. In FIG. 35, an example is illustrated of the hip flex actuator (J11) 720 being actuated to a second limit state ($S_2$-J11), causing the leg 6b of the robot 1 to extend rearward to a maximum posterior retraction or flexion. In this example, a reference line $R_{11-1}$ indicates the displacement of the leg with respect to the coronal plane ($P_C$). Similarly, FIG. 36 illustrates the hip flex actuator (J11) 720 actuated to a first limit state ($S_1$-J11), rotating the leg 6b forward, where reference line $R_{11-2}$ indicates the displacement of the leg with respect to the coronal plane ($P_C$).

Figures 37, 38:
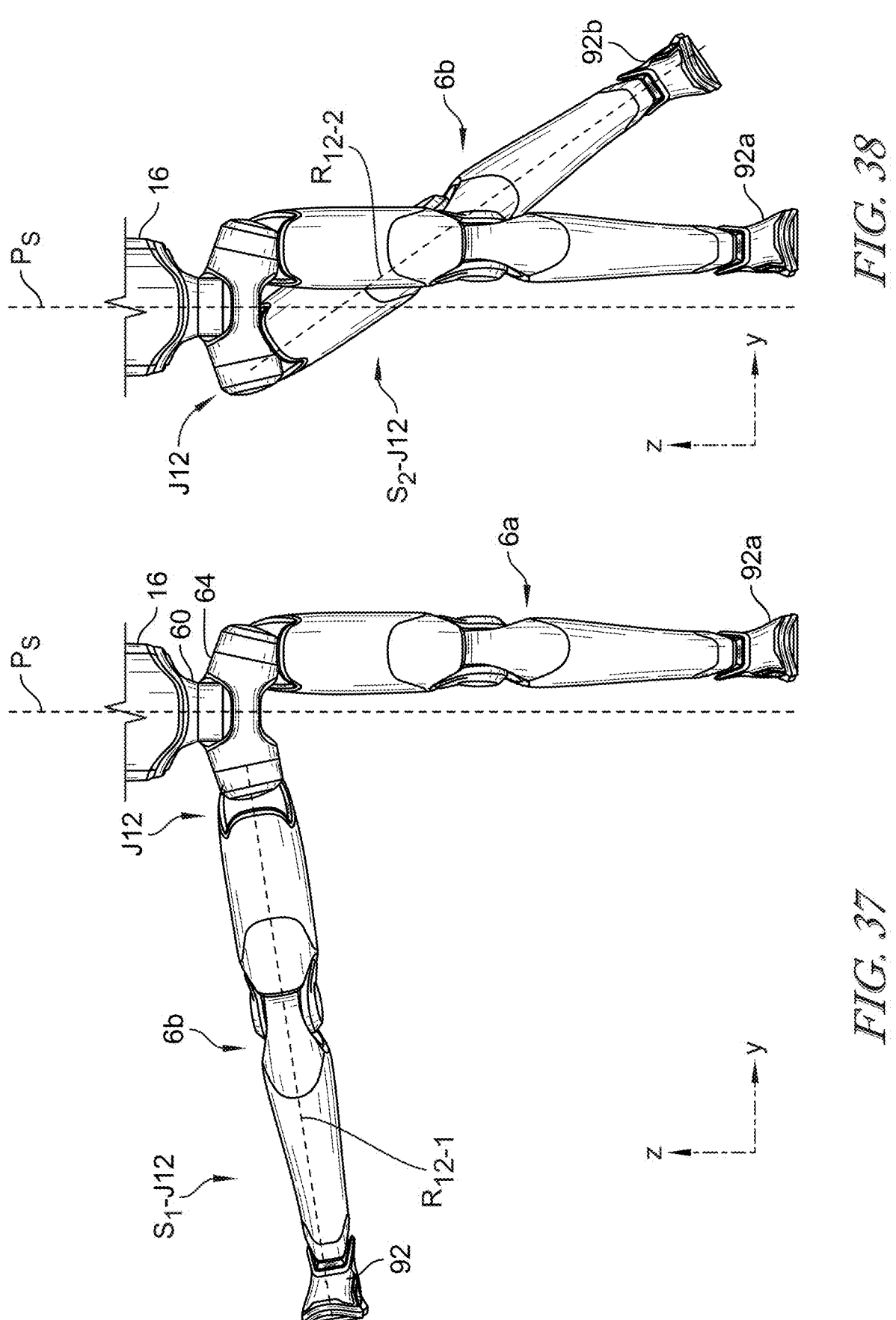
FIG. 37 is a front view of a central and lower portion of the robot of FIG. 9, where the hip roll actuator (J12) is rotated to a first limit angle.
FIG. 38 is a front view of a central and lower portion of the robot of FIG. 9, where the hip roll actuator (J12) is rotated to a second limit angle.

FIGS. 37-38 illustrate leg roll movement of the hip roll actuator (J12) 768, which controls movement of the respective leg 6 from side to side. In these examples, the hip flex actuator (J11) 720 remains in a neutral initial position, and the other leg actuators (J13-J16) in the leg assembly 6 do not apply any torque. For reference, the lateral movement of the leg is shown with reference axis $R_{12-1}$, which is illustrated with respect to a leg reference plane parallel to the sagittal plane ($P_S$) and includes the axis of rotation $A_{12}$ of the hip roll actuator (J12) 768 in the neutral position. For example, FIG. 37 shows a central and lower portion of the robot 1 in a position where its right leg 6b is rolled laterally outward to a first limit state ($S_1$-J12) of the hip roll actuator (J12) 768. The reference line $R_{12-1}$ is shown with respect to the sagittal plane ($P_S$), in a front view, for the maximum laterally outward position. In another example, FIG. 38 shows a central and lower portion of the robot 1 in a position where its right leg 6b is rolled medially to a second limit state ($S_2$-J12) of the hip roll actuator (J12) 768. The reference line $R_{12-2}$ is shown with respect to the sagittal plane ($P_S$), in a front view, when the leg is in the maximum medially inward roll.

The leg twist actuator (J13) 782 is positioned below the torso lean actuator (J9) 680, torso twist actuator (J10) 620, hip flex actuator (J11) 720, and hip roll actuator (J12) 768. The leg twist actuator (J13) 782 is designed to allow the robot 1 to turn in place and provides up to about 90 degrees of rotation in either direction from the neutral position. This range of movement can allow the robot 1 to turn in place, in particular, by turning one leg 6 about 90 degrees, stepping on it, turning the whole robot 1, and then twisting the other leg 6 about 90 degrees. This is beneficial because the robot 1 can turn 180 degrees (i.e., reverse direction) by only taking two steps and, in some situations, only a single step. Stated another way, said robot 1 can turn around and start walking in the other direction by taking only two (and sometimes one) steps. This represents a significant advantage over many prior designs that can require many steps to reverse direction.

The configuration of the leg 6 and its associated actuators (i.e., actuators J11, J12, and J13) also ensures that said leg 6 cannot be placed in a singularity (where two or more actuator axes of rotation are parallel with one another). This is because the hip roll actuator (J12) 768 cannot be rotated outward by 90 degrees, which would be an action to place the axis $A_{11}$ of the hip flex actuator (J11) 720 parallel with the axis $A_{13}$ of the leg twist actuator (J13) 782. Additionally, there is very little operational use for rotating or rolling the leg 6 laterally outward more than about 55 degrees from the sagittal plane ($P_S$). Thus, said configuration of the actuators provides the robot 1 with a significant range of motion without encountering a singularity. In other words, said singularity is positioned outside of the usable working range of the robot's legs 6.

Figure 43:
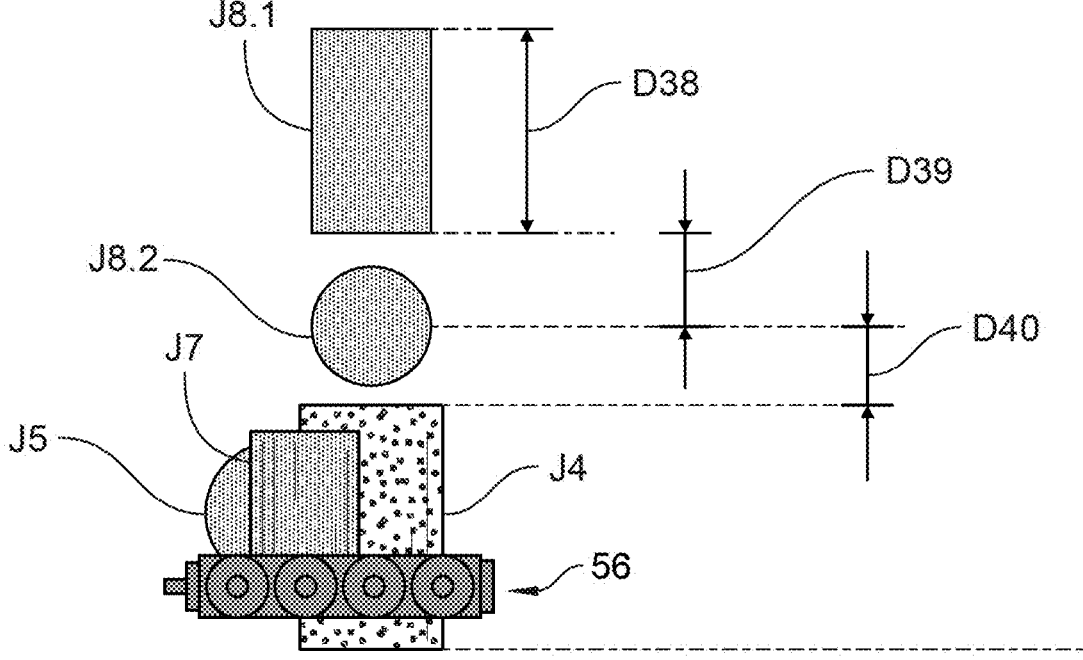
FIG. 43 is a left side view of the actuators contained in upper portion of the robot of FIG. 7, along with dimensions associated therewith.

In this application, the knee actuator (J14) 820 is described as part of the central portion 3 of the robot 1 for context. Referring to FIGS. 43-44, the range of motion of both the knee actuator (J14) 820 and foot flex actuator (J15) 860 are shown, with the first and second limit states of both actuators illustrated. For example, the first limit state ($S_1$-J14) of the knee actuator (J14) 820 may be about 0 degrees and the second limit state ($S_2$-J14) may be about 107 to about 161 degrees. As such, in this example, the first limit state ($S_1$-J14) of the knee actuator (J14) 820 is the same as the initial position (FIG. 9). In FIG. 44, even though the foot 92 is pitched forward, the knee actuator (J14) 820 is shown in the first limit state ($S_1$-J14). In FIG. 43, the knee actuator (J14) 820 is shown in the second limit state ($S_2$-J14), where the output of said knee actuator (J14) 820 rotates, causing a lower portion of the leg 6b, including the shin 84, talus 88, and foot 92, to lift from the support surface and move rearward with respect to the coronal plane ($P_C$).

c. Lower Portion

Figures 39, 40:
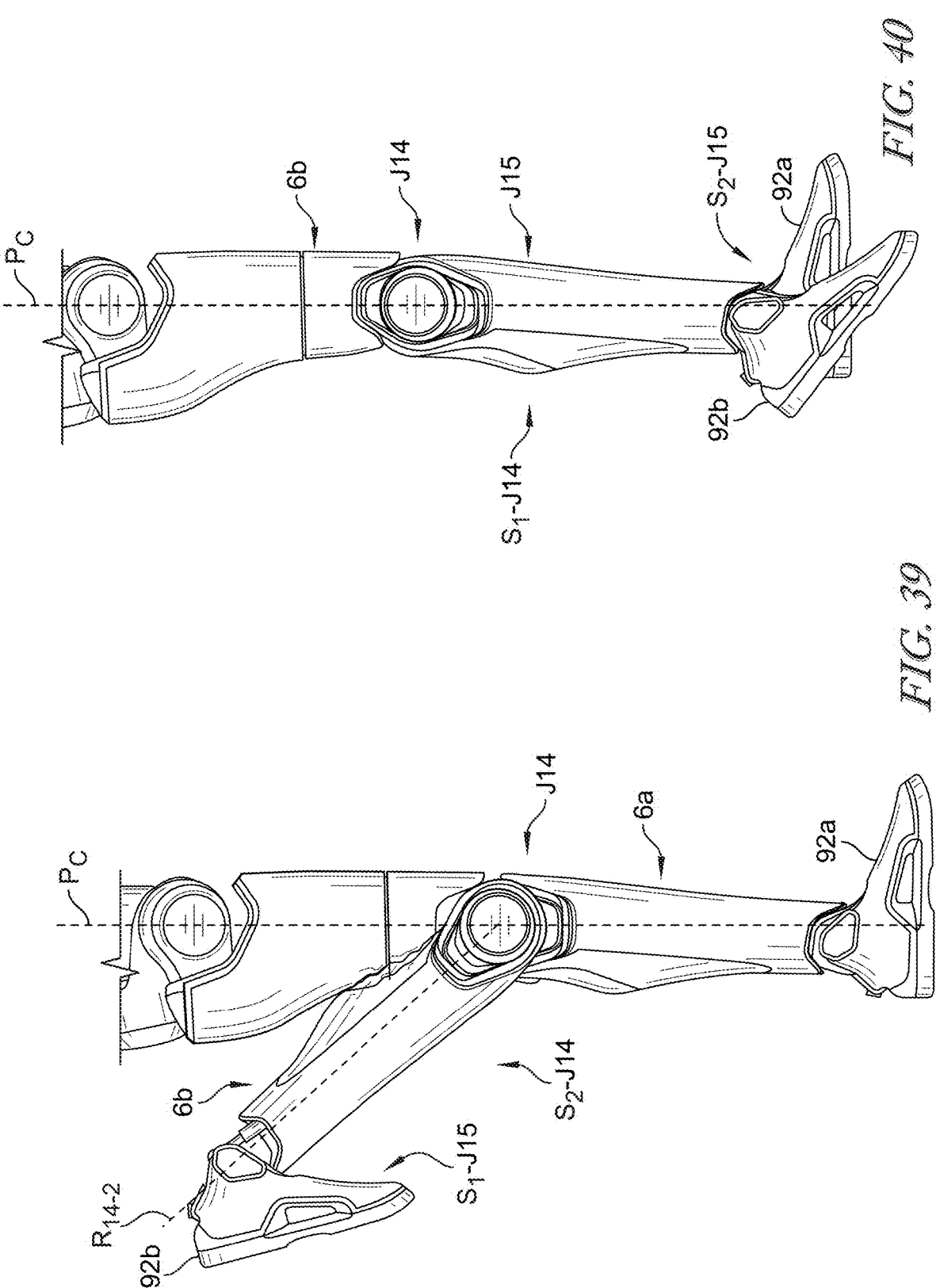
FIG. 39 is a right side view of central and lower portions of the robot of FIG. 9, where the knee actuator (J14) is rotated to a second limit angle and the foot flex actuator (J15) is rotated to a first limit angle.
FIG. 40 is a right side view of central and lower portions of the robot of FIG. 9, where the knee actuator (J14) is rotated to a first limit angle and the foot flex actuator (J15) is rotated to a second limit angle.
Figure 41:
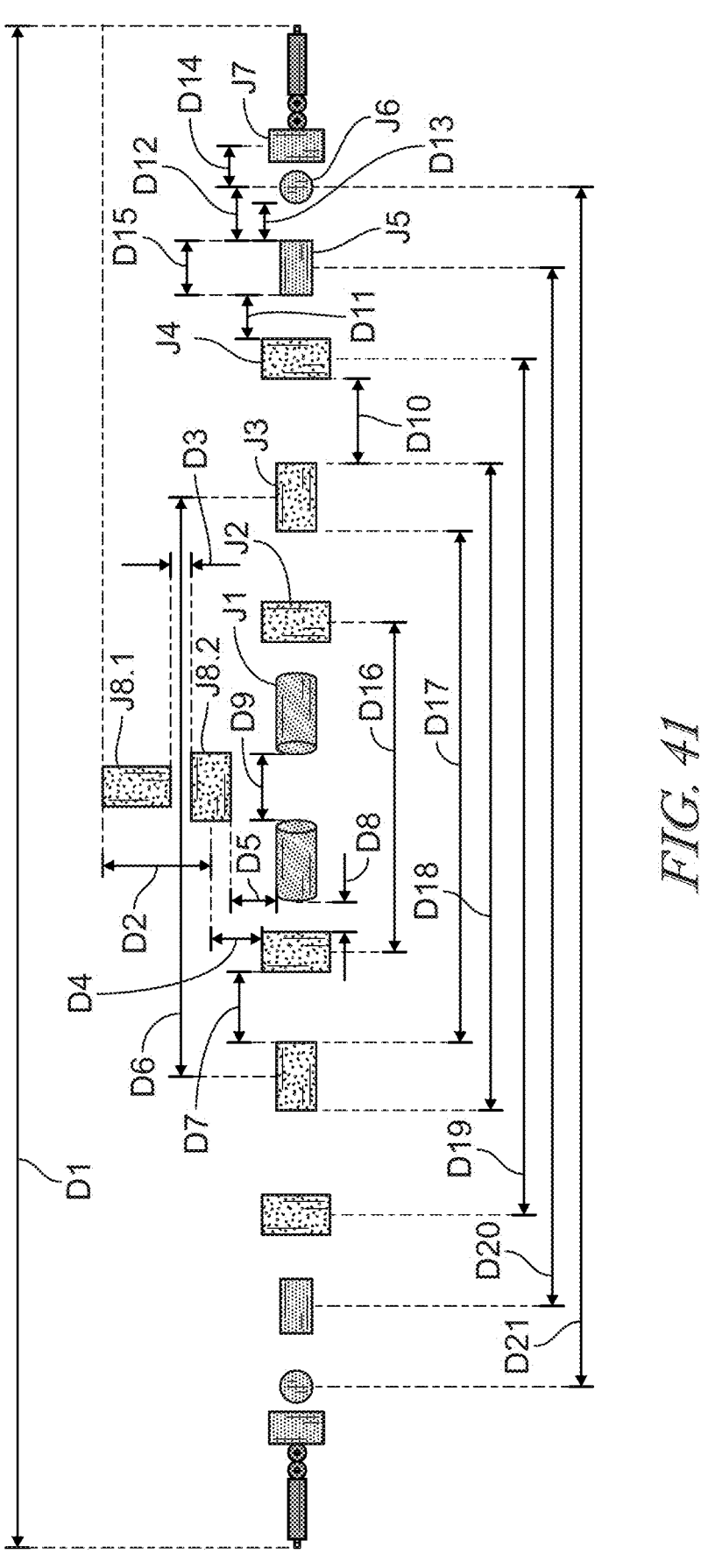
FIG. 41 is a front view of the actuators contained in the upper portion of the robot of FIG. 7, along with dimensions associated therewith.
Figure 42:
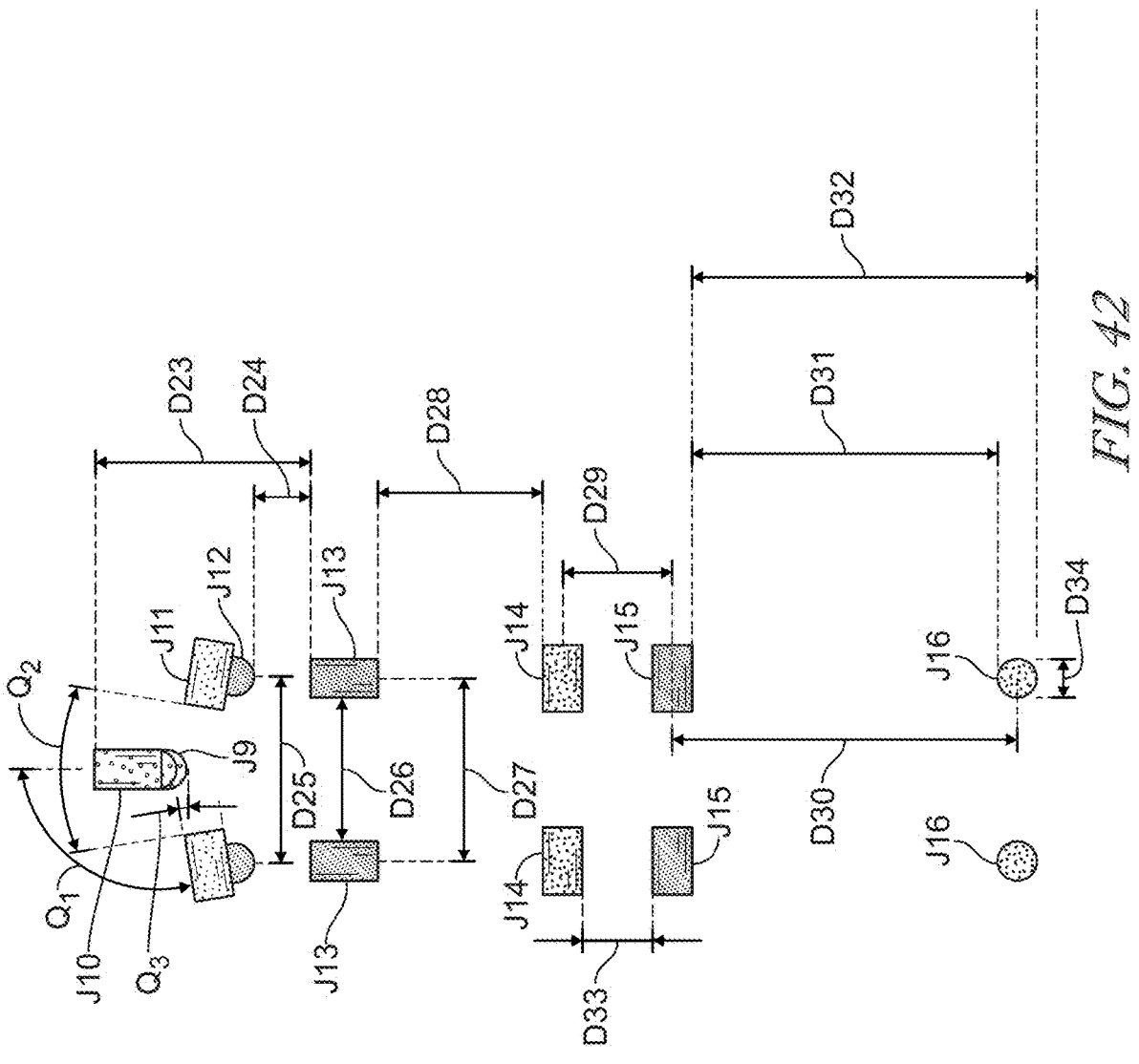
FIG. 42 is a front view of the actuators contained central and lower portions of the robot of FIG. 7, along with dimensions associated therewith.

Finally, a foot flex actuator (J15) 860 is housed in the shin 84 and includes a rotary actuator and linkage for pitch movement of the foot 92, and a foot roll actuator (J16) 900 is housed within the talus 88 to allow a rolling motion of the foot 92. As previously discussed, FIGS. 43-44 illustrate the range of motion of both the knee actuator (J14) 820 and foot flex actuator (J15) 860 of the right leg 6b, with the first and second limit states of both actuators illustrated. In this example, the first limit state ($S_1$-J15) of the foot flex actuator (J15) 860 may be about −48 to about −72 degrees and the second limit state ($S_2$-J15) may be about 32 to about 48 degrees. In FIG. 43, the right leg 6b is shown with the foot flex actuator (J15) 860 in a first limit state ($S_1$-J15), where the foot 92 is pitched up toward the shin 84. Although this is illustrated in a position that shows a compound motion (both actuators J14 and J15 used), the position of the lower surface of the sole of the foot 92 moves with respect to the leg axis AL regardless of the position of the upper leg 6.1 (e.g., hip 70, upper thigh 76, lower thigh 80). FIG. 40 shows a second limit state ($S_2$-J15), where the right foot 92 is angled downward with respect to the transverse plane ($P_T$).

F. Distances and Angles Measurements

As best shown in FIGS. 18-20 and 45A-48, the actuators contained in the robot 1 are spaced apart from one another and provide said robot 1 to have a humanoid configuration. While this configuration is not limiting, it can be generally seen that the disclosed robot 1 has the following features. For example, the arm span that extends from fingertip on a first hand to the opposed fingertip on the second hand is greater than the actuator height that extends from the bottom actuator J16 to the upper most actuator J8.2. The length of each arm, which extends between the outermost extents of the wrist actuators is less than 20% less than the length of each leg, which extends from the center point on the hip actuator J11 to the bottom of the ankle actuator J16. The center hip distance that extends from the center point on a hip actuator J11 to the center point on an opposed hip actuator J11 is 30% less than the distance between the center point on a shoulder actuator J2 to the center point on an opposed shoulder actuator J2. The torso has an uninterrupted height between the spine actuators and the arm actuators that is more than 250 mm and is preferably close to 300 mm. Other ratios, calculations, or information can be gathered from the figures in connection with the tables included herein.

TABLE 4

| Distance (mm) | Lower Bound | Upper Bound | Preferred Lower Bound | Preferred Upper Bound |
|---|---|---|---|---|
| D1 | 1434.4 | 2151.6 | 1613.7 | 1972.3 |
| D2 | 69.9 | 104.8 | 78.6 | 96.1 |
| D3 | 5.3 | 7.9 | 5.9 | 7.2 |
| D4 | 64.0 | 96.0 | 72.0 | 88.0 |
| D5 | 43.0 | 64.4 | 48.3 | 59.1 |
| D6 | 460.8 | 691.2 | 518.4 | 633.6 |
| D7 | 31.6 | 47.4 | 35.6 | 43.5 |
| D8 | 9.9 | 14.9 | 11.2 | 13.7 |
| D9 | 43.0 | 64.5 | 48.3 | 59.1 |
| D10 | 53.7 | 80.6 | 60.5 | 73.9 |
| D11 | 29.2 | 43.8 | 32.8 | 40.1 |
| D12 | 59.6 | 89.4 | 67.0 | 81.9 |
| D13 | 39.6 | 59.4 | 44.6 | 54.5 |
| D14 | 43.4 | 65.1 | 48.8 | 59.6 |
| D15 | 45.6 | 68.5 | 51.3 | 62.8 |
| D16 | 270.7 | 406.0 | 304.5 | 372.2 |
| D17 | 398.0 | 597.0 | 447.7 | 547.2 |
| D18 | 527.7 | 791.6 | 593.7 | 725.6 |
| D19 | 693.9 | 1040.8 | 780.6 | 954.1 |
| D20 | 864.0 | 1296.0 | 972.0 | 1188.0 |
| D21 | 1027.2 | 1540.8 | 1155.6 | 1412.4 |
| D22 | 253.9 | 380.8 | 285.6 | 349.1 |
| D23 | 178.6 | 267.9 | 200.9 | 245.5 |
| D24 | 25.6 | 38.5 | 28.8 | 35.3 |
| D25 | 150.1 | 225.2 | 168.9 | 206.4 |
| D26 | 87.7 | 131.5 | 98.6 | 120.6 |
| D27 | 150.4 | 225.6 | 169.2 | 206.8 |
| D28 | 111.3 | 166.9 | 125.2 | 153.0 |
| D29 | 90.4 | 135.6 | 101.7 | 124.3 |
| D30 | 280.8 | 421.2 | 315.9 | 386.1 |
| D31 | 224.5 | 336.8 | 252.6 | 308.7 |
| D32 | 297.0 | 445.6 | 334.2 | 408.4 |
| D33 | 24.8 | 37.3 | 27.9 | 34.2 |
| D34 | 72.0 | 108.0 | 81.0 | 99.0 |
| D35 | 1272.9 | 1909.3 | 1432.0 | 1750.2 |
| D36 | 1377.3 | 2065.9 | 1549.4 | 1893.8 |
| D37 | 104.4 | 156.6 | 117.5 | 143.6 |
| D38 | 45.6 | 68.5 | 51.3 | 62.8 |
| D39 | 25.3 | 37.9 | 28.4 | 34.7 |
| D40 | 58.4 | 87.6 | 65.7 | 80.3 |
| D41 | 253.7 | 380.5 | 285.4 | 348.8 |
| D42 | 153.3 | 229.9 | 172.4 | 210.7 |
| D43 | 144.0 | 216.0 | 162.0 | 198.0 |
| D44 | 244.6 | 367.0 | 275.2 | 336.4 |
| D45 | 25.6 | 38.5 | 28.8 | 35.3 |
| D46 | 4.0 | 6.0 | 4.5 | 5.5 |
| D47 | 14.8 | 22.2 | 16.7 | 20.4 |
| D48 | 9.6 | 14.4 | 10.8 | 13.2 |
| D49 | 149.3 | 223.9 | 167.9 | 205.2 |

TABLE 4-continued

| Distance (mm) | Lower Bound | Upper Bound | Preferred Lower Bound | Preferred Upper Bound |
|---|---|---|---|---|
| D50 | 90.4 | 135.6 | 101.7 | 124.3 |
| D51 | 20.8 | 31.2 | 23.4 | 28.6 |
| D52 | 244.7 | 367.0 | 275.3 | 336.4 |
| D53 | 11.2 | 16.8 | 12.6 | 15.4 |
| D54 | 72.4 | 108.6 | 81.5 | 99.6 |
| D55 | 38.4 | 57.6 | 43.2 | 52.8 |
| D56 | 40.0 | 60.0 | 45.0 | 55.0 |
| D57 | 53.5 | 80.2 | 60.2 | 73.5 |
| D59 | 10.8 | 16.2 | 12.1 | 14.8 |
| D60 | 16.6 | 24.9 | 18.7 | 22.9 |
| D61 | 135.0 | 202.5 | 151.9 | 185.6 |
| D62 | 77.0 | 115.5 | 86.6 | 105.9 |
| D63 | 60.0 | 90.0 | 67.5 | 82.5 |
| D64 | 150.4 | 225.6 | 169.2 | 206.8 |
| D65 | 0.1 | 0.2 | 0.1 | 0.1 |
| D66 | 194.0 | 291.0 | 218.2 | 266.7 |
| D67 | 206.3 | 309.4 | 232.1 | 283.6 |
| D68 | 90.4 | 135.6 | 101.7 | 124.3 |
| D69 | 42.4 | 63.6 | 47.7 | 58.3 |
| D70 | 15.9 | 23.9 | 17.9 | 21.9 |
| D71 | 7.1 | 10.7 | 8.0 | 9.8 |
| D72 | 17.7 | 26.6 | 19.9 | 24.3 |
| D73 | 48.9 | 73.3 | 55.0 | 67.2 |
| D74 | 24.2 | 36.3 | 27.2 | 33.3 |
| D75 | 133.6 | 200.4 | 150.3 | 183.7 |
| D76 | 9.6 | 14.4 | 10.8 | 13.2 |
| D77 | 168.2 | 252.2 | 189.2 | 231.2 |
| D78 | 90.4 | 135.6 | 101.7 | 124.3 |
| D79 | 280.8 | 421.2 | 315.9 | 386.1 |
| D80 | 520.3 | 780.4 | 585.3 | 715.4 |
| D81 | 20.4 | 30.6 | 23.0 | 28.1 |
| D82 | 42.4 | 63.6 | 47.7 | 58.3 |
| D83 | 1.7 | 2.6 | 1.9 | 2.3 |
| D84 | 90.4 | 135.6 | 101.7 | 124.3 |
| D85 | 63.6 | 95.4 | 71.6 | 87.5 |
| D86 | 76.1 | 114.1 | 85.6 | 104.6 |
| D87 | 42.5 | 63.8 | 47.8 | 58.5 |
| D88 | 130.1 | 195.1 | 146.3 | 178.8 |
| D89 | 97.3 | 146.0 | 109.5 | 133.8 |
| D90 | 81.4 | 122.1 | 91.6 | 111.9 |
| D91 | 46.4 | 69.6 | 52.2 | 63.8 |
| D92 | 64.6 | 96.9 | 72.6 | 88.8 |
| D93 | 19.5 | 29.2 | 21.9 | 26.8 |
| D94 | 206.2 | 309.3 | 232.0 | 283.6 |
| D95 | 19.1 | 28.6 | 21.5 | 26.3 |
| D96 | 212.0 | 318.0 | 238.5 | 291.5 |
| D97 | 208.8 | 313.2 | 234.9 | 287.1 |
| D98 | 6.9 | 10.3 | 7.8 | 9.5 |
| D99 | 8.0 | 12.0 | 9.0 | 11.0 |

TABLE 5

| Angle (Degrees) | Lower Bound | Upper Bound | Preferred Lower Bound | Preferred Upper Bound |
|---|---|---|---|---|
| Q1 | 80.8 | 121.2 | 90.9 | 111.1 |
| Q2 | 17.6 | 26.4 | 19.8 | 24.2 |
| Q3 | 8.8 | 13.2 | 9.9 | 12.1 |
| Q4 | 8.0 | 12.0 | 9.0 | 11.0 |
| Q5 | 7.5 | 11.2 | 8.4 | 10.3 |
| Q6 | 56.5 | 84.8 | 63.6 | 77.7 |
| Q7 | 82.4 | 123.6 | 92.7 | 113.3 |
| Q8 | 73.9 | 110.8 | 83.1 | 101.6 |
| Q9 | 17.6 | 26.4 | 19.8 | 24.2 |
| Q10 | 8.0 | 12.0 | 9.0 | 11.0 |
| Q11 | 7.5 | 11.2 | 8.4 | 10.3 |
| Q12 | 15.5 | 23.2 | 17.4 | 21.3 |
| Q13 | 10.4 | 15.6 | 11.7 | 14.3 |
| Q14 | 12.0 | 18.0 | 13.5 | 16.5 |

G. Alternative Embodiments

In another embodiment, the structural framework of the humanoid robot 1 may be comprised of a monocoque or unibody frame. In such a configuration, a single, integrated structural shell, rather than an assembly of separate housings, forms the primary load-bearing structure for portions of the robot, such as the torso 16 or limb segments. This monocoque frame may be fabricated from materials such as carbon-fiber-reinforced polymers or advanced metal alloys, and may be designed to house and protect internal components, including actuators 1.2.4 and the electronics assembly 1.2.6, within its hollow interior. This construction can offer a superior strength-to-weight ratio and increased torsional rigidity compared to a traditional exoskeleton with discrete housings, potentially improving the robot's dynamic performance and energy efficiency.

Alternatively, the thermal management system may be comprised of a liquid-cooled endoskeleton. In this embodiment, the primary structural endoskeleton of the robot 1 incorporates a network of internal micro-channels or conduits through which a dielectric coolant is circulated. A compact pumping system, housed within the torso 16, actively moves the fluid from heat-generating components, such as the high-torque actuators 1.2.4 or the compute 1000, to distributed radiator elements or heat exchangers. This system provides a more effective and uniform method for managing high thermal loads compared to the disclosed use of passive heat pipes and fans, thereby enabling sustained high-performance operation of the robot 1.

In a further embodiment, the humanoid robot 1 may be configured with a wheeled or hybrid locomotion base. While the primary embodiment is defined by bipedal locomotion, this alternative configuration integrates one or more retractable wheels within the foot 92 or ankle assembly of each leg assembly 6. These wheels may be deployed via a dedicated actuator for rapid and energy-efficient transit over smooth, planar surfaces. Upon encountering uneven terrain or stairs, the wheels may be retracted, allowing the robot 1 to revert to bipedal walking. This hybrid locomotion system combines the speed and efficiency of wheeled robots with the versatility and adaptability of a bipedal platform.

It is also contemplated that the actuation system may comprise a hydraulic or pneumatic-electric hybrid system. While the primary embodiment specifies the exclusive use of electric actuators, a hybrid system may be employed for specific joints requiring exceptionally high force or torque, such as the hip flex actuators (J11) 720 or knee actuators (J14) 820. In this configuration, one or more central electric motors drive a hydraulic or pneumatic pump, which in turn pressurizes fluid that is routed to compact hydraulic or pneumatic cylinders at the respective joints. This arrangement allows for the generation of forces exceeding those of similarly sized electric actuators, which is advantageous for tasks involving heavy lifting or high-impact locomotion, while still leveraging the control precision of an electric power source.

In another embodiment, the robot 1 may incorporate a Kinetic Energy Recovery System (KERS) to enhance power efficiency. This system may be comprised of a supercapacitor bank or a high-speed flywheel mechanically coupled to the drivetrain of high-load joints, such as those in the leg assemblies 6. During decelerative movements, such as braking or descending, the system captures and stores kinetic energy that would otherwise be dissipated as heat. This stored energy can then be rapidly discharged to supplement the main battery pack during high-power-demand actions, such as jumping, rapid acceleration, or lifting heavy objects, thereby extending operational runtime and reducing peak load on the primary power source.

For the actuation of distal joints, such as those within the hand 56 or wrist 50, an alternative embodiment may utilize cable-driven mechanisms. In this configuration, the actuators responsible for moving the distal joints are located more proximally, for instance, within the upper forearm 40 or lower forearm 46. A system of high-tensile strength cables or tendons runs from these actuators, through guided pathways within the limb structure, to the respective joints. By relocating the mass of the actuators away from the end-effector, this arrangement significantly reduces the weight and inertia of the arm's distal portion, enabling faster, more precise, and more energy-efficient manipulation tasks.

Alternatively, the actuators 1.2.4 may utilize magnetic gearboxes or may be configured as direct-drive motors. In place of the disclosed mechanical gear reduction systems, a magnetic gearbox may be used to achieve non-contact torque transmission through the interaction of permanent magnets, thereby eliminating mechanical backlash, reducing wear, and providing inherent overload protection. In a further alternative, one or more joints may be powered by high-torque, direct-drive motors that do not require any form of gear reduction. The elimination of a gearbox entirely reduces mechanical complexity, minimizes noise, and provides superior control fidelity and dynamic response for high-precision tasks.

In a further embodiment, the sensory system of the robot 1 may include a full-body tactile skin. Rather than relying on discrete touch sensors 1.2.8.10 at specific locations, this alternative embodiment covers a substantial portion of the robot's exterior covering assembly 1.2.16 with a flexible, comprehensive electronic skin, or "e-skin." This e-skin is comprised of a high-density matrix of tactile sensors, which may be capacitive, piezoresistive, or piezoelectric, capable of detecting not only contact but also pressure gradients, shear forces, and temperature. This provides the robot 1 with a much richer, full-body haptic perception, enhancing its ability to interact safely and delicately with its environment and with humans.

It is also contemplated that the robot 1 may be fitted with non-anthropomorphic, multi-function tool end-effectors in place of the disclosed hands 56. For specialized industrial applications, an end-effector may be designed to integrate multiple tools into a single, compact manipulator. For example, a "welding hand" embodiment could combine a material gripper, a welding torch, a wire feeder, and an inert gas nozzle into one unit. A "logistics hand" embodiment might integrate a barcode scanner, a retractable box cutter, and a label applicator. Such specialized end-effectors would optimize the robot 1 for specific workflows, reducing the need for tool changes and increasing task efficiency.

In another embodiment, the robot's end-effectors may be comprised of conformal grippers utilizing smart materials. Instead of a rigid, multi-fingered hand, the gripper could be fabricated from electroactive polymers or contain a magnetorheological fluid. When a voltage or magnetic field is applied, these materials can rapidly change their shape or stiffness. This allows the gripper to conform perfectly to the shape of a target object, providing a secure grasp on delicate or irregularly shaped items without requiring complex mechanical linkages or sophisticated control algorithms. The ability to dynamically alter the gripper's physical properties enables a more versatile and robust object-handling capability.

Alternatively, the computational architecture may be configured for decentralized "swarm" intelligence. In an environment with a plurality of humanoid robots 2700A-X, instead of each robot relying primarily on the remote AI system 2780, the fleet of robots could operate on a decentralized, peer-to-peer network. Using this architecture, the robots could directly share sensor data, learned behaviors, and computational loads with one another. This creates a collective or "swarm" intelligence that is more resilient to network disruptions and allows the robots to collaboratively learn and solve complex tasks in real-time without constant reliance on a central server.

For applications involving remote operation or teleoperation, the robot 1 may be configured to provide haptic feedback to a human operator. In this embodiment, force and torque data from sensors within the robot's actuators 1.2.4 and touch sensors 1.2.8.10 are transmitted back to a control interface used by the human operator. The interface, which may be a specialized glove or joystick, uses its own set of actuators to replicate the forces and textures being experienced by the robot's hands 56 and limbs. This allows the operator to "feel" what the robot is touching, significantly improving their ability to perform delicate or complex manipulation tasks remotely.

In a further embodiment, the robot 1 may be equipped with a tethered operation mode for stationary or long-duration tasks. A docking port may be integrated into the robot's structure, for example, at the base of the torso 16 or within the pelvis 64. When engaged with a corresponding docking station, this port provides a direct, continuous supply of power to the robot, bypassing the need to discharge the onboard battery pack. The connection may also provide a high-bandwidth, low-latency data link to the network 2999A-X. This mode is advantageous for tasks that require the robot to remain in one location for an extended period, such as on an assembly line, as it eliminates battery consumption as an operational constraint and allows the onboard battery to remain fully charged for subsequent mobile tasks.

H. Industrial Application

While the present disclosure shows several illustrative embodiments of a robot (in particular, a humanoid robot), it should be understood that these embodiments are designed to be examples of the principles of the disclosed assemblies, methods, and systems. They are not intended to limit the broad aspects of the disclosed concepts solely to the specific embodiments that have been illustrated. As will be realized by one skilled in the art, the disclosed robot, and its associated functionality and methods of operation, are capable of other and different configurations. Furthermore, several of its details are capable of being modified in various respects, all without departing from the fundamental scope of the disclosed methods and systems. For example, one or more of the disclosed embodiments, either in part or in whole, may be combined with another disclosed assembly, method, and system to create hybrid implementations. As such, one or more steps from the diagrams or components in the Figures may be selectively omitted or combined in a manner that is consistent with the principles of the disclosed assemblies, methods, and systems. Additionally, the order of one or more steps from the arrangement of components may be omitted or performed in a different order than what is explicitly described. Accordingly, the drawings, diagrams, and the detailed description provided herein are to be regarded as illustrative in nature, and not as restrictive or limiting, of the said humanoid robot. It should be understood that the use of the word "or" when separating element names in connection with a single reference number indicates that the same structure can have two or more different names. For example, the phrase "end effector or hand assembly 56" indicates that the structure that is referenced by the number 56 can be referred to or claimed as either an "end effector" or a "hand assembly."

While the above-described methods and systems are primarily designed for use with a general-purpose humanoid robot, it should be understood that the disclosed assemblies, components, learning capabilities, or kinematic capabilities may be adapted for use with other types of robots. Examples of other such robots include, but are not limited to: an articulated robot (e.g., an arm having two, six, or ten degrees of freedom, etc.), a cartesian robot (e.g., rectilinear or gantry robots, robots having three prismatic joints, etc.), a Selective Compliance Assembly Robot Arm (SCARA) robot (e.g., a robot with a donut-shaped work envelope, with two parallel joints that provide compliance in one selected plane, with rotary shafts positioned vertically, with an end effector attached to an arm, etc.), a delta robot (e.g., a parallel link robot with parallel joint linkages connected with a common base, having direct control of each joint over the end effector, which may be used for pick-and-place or product transfer applications, etc.), a polar robot (e.g., a robot with a twisting joint connecting the arm with the base and a combination of two rotary joints and one linear joint connecting the links, having a centrally pivoting shaft and an extendable rotating arm, a spherical robot, etc.), a cylindrical robot (e.g., a robot with at least one rotary joint at the base and at least one prismatic joint connecting the links, with a pivoting shaft and an extendable arm that moves vertically and by sliding, with a cylindrical configuration that offers vertical and horizontal linear movement along with rotary movement about the vertical axis, etc.), a self-driving car, a kitchen appliance, construction equipment, or a variety of other types of robot systems. The robot system may include one or more sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art and is used in connection with robot systems. Likewise, the robot system may omit one or more of the aforementioned sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art to be used in connection with robot systems. In other embodiments, other configurations or components may be utilized.

As is well known in the data processing and communications arts, a general-purpose computer typically comprises a central processor or other processing device, an internal communication bus, various types of memory or storage media (e.g., RAM, ROM, EEPROM, cache memory, disk drives, etc.) for code and data storage, and one or more network interface cards or ports for communication purposes. The software functionalities that are described herein involve programming, which includes executable code as well as associated stored data. This software code is executable by the general-purpose computer. In operation, the code is stored within the memory of the general-purpose computer platform. At other times, however, the software may be stored at other locations or transported for loading into the appropriate general-purpose computer system.

A server, for example, typically includes a data communication interface for engaging in packet data communication over a network. The server also includes a central processing unit (CPU), which may be in the form of one or more processors, for executing the program instructions. The server platform typically includes an internal communication bus, program storage, and data storage for the various data files that are to be processed or communicated by the server, although the server often receives its programming and data via network communications. The hardware elements, operating systems, and programming languages of such servers are conventional in nature, and it is presumed that those who are skilled in the art are adequately familiar therewith. The server functions may be implemented in a distributed fashion on a number of similar platforms to distribute the processing load.

Hence, aspects of the disclosed methods and systems that are outlined above may be embodied in the form of computer programming. Program aspects of the technology may be thought of as "products" or "articles of manufacture," which are typically in the form of executable code or associated data that is carried on or embodied in a type of machine-readable medium. "Storage" type media includes any or all of the tangible memory of the computers, processors, or the like, or any associated modules thereof. This may include various semiconductor memories, tape drives, disk drives, and the like, which may provide non-transitory storage at any time for the software programming. All or portions of the software may at times be communicated through the Internet or various other telecommunication networks. Thus, another type of media that may bear the software elements includes optical, electrical, and electromagnetic waves, such as those that are used across physical interfaces between local devices, through wired and optical landline networks, and over various air-links. The physical elements that carry such waves, such as wired or wireless links, optical links, or the like, also may be considered as media that bear the software. As used herein, unless specifically restricted to non-transitory, tangible "storage" media, terms such as computer or machine "readable medium" refer to any medium that participates in the process of providing instructions to a processor for execution.

A machine-readable medium may take many forms, including but not limited to, a tangible storage medium, a carrier wave medium, or a physical transmission medium. Non-volatile storage media include, for example, optical or magnetic disks, such as any of the storage devices in any computer or computers or the like, such as may be used to implement the disclosed methods and systems. Volatile storage media include dynamic memory, such as the main memory of such a computer platform. Tangible transmission media include components such as coaxial cables, copper wire, and fiber optics, including the wires that comprise a bus within a computer system. Carrier-wave transmission media can take the form of electric or electromagnetic signals, or acoustic or light waves, such as those that are generated during radio frequency (RF) and infrared (IR) data communications. Common forms of computer-readable media therefore include, for example: a floppy disk, a flexible disk, a hard disk, magnetic tape, any other magnetic medium, a CD-ROM, a DVD or DVD-ROM, any other optical medium, punch cards, paper tape, any other physical storage medium with patterns of holes, a RAM, a PROM and EPROM, a FLASH-EPROM, any other memory chip or cartridge, a carrier wave that is transporting data or instructions, cables or links that are transporting such a carrier wave, or any other medium from which a computer can read programming code or data. Many of these forms of computer-readable media may be involved in carrying one or more sequences of one or more instructions to a processor for execution.

It is to be understood that the invention is not limited to the exact details of construction, operation, exact materials, or specific embodiments shown and described herein, as obvious modifications and equivalents will be apparent to one who is skilled in the art. While the specific embodiments have been illustrated and described in detail, numerous modifications may come to mind without significantly departing from the spirit of the invention, and the scope of protection is only limited by the scope of the accompanying Claims. In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such a feature is required in all embodiments and, in some embodiments, may not be included or may be combined with other features.

It should also be understood that the term "substantially" as utilized herein means a deviation of less than 15% and preferably less than 5%. It should also be understood that the term "near" means within 10 cm, the term "proximate" means within 5 cm, and the term "adjacent" means within 1 cm. It should also be understood that other configurations or arrangements of the above-described components are contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

The following applications are hereby incorporated by reference for any purpose: (i) PCT Application Nos. PCT/US25/10425, PCT/US25/11450, PCT/US25/12544, PCT/US25/16930, PCT/US25/19793, PCT/US25/23064, PCT/US25/23325, PCT/US25/24817, and PCT/US25/25005; (ii) U.S. patent application Ser. Nos. 18/919,263, 18/919,274, 18/922,334, 19/000,626, 19/006,191, 19/033,973, 19/038, 657, 19/064,596, 19/066,122, 19/180,106, 19/223,945, 19/224,109, 19/224,252, 19/249,517, 19/252,392, 19/252, 708, 19/306,591, 19/319,712, 19/324,392, 19/325,486, 19/325,415, 19/324,342, 19/329,474, and 19/329,485; and (iii) U.S. Design patents application Ser. Nos. 29/889,764, 29/928,748, 29/935,680, 29/954,572, 29/967,462, 29/993, 115, and 29/998,761; (iv) U.S. Provisional Patent Application Nos. 63/556,102, 63/557,874, 63/558,373, 63/561,307, 63/561,311, 63/561,313, 63/561,315, 63/561,317, 63/561, 318, 63/564,741, 63/565,077, 63/573,226, 63/573,528, 63/573,543, 63/574,349, 63/614,499, 63/615,766, 63/617, 762, 63/620,633, 63/625,362, 63/625,370, 63/625,381, 63/625,384, 63/625,389, 63/625,405, 63/625,423, 63/625, 431, 63/626,028, 63/626,030, 63/626,034, 63/626,035, 63/626,037, 63/626,039, 63/626,040, 63/626,105, 63/632, 630, 63/632,683, 63/633,113, 63/633,405, 63/633,920, 63/633,931, 63/633,941, 63/634,042, 63/634,599, 63/634, 697, 63/635,152, 63/677,087, 63/685,856, 63/690,334, 63/692,747, 63/692,765, 63/694,253, 63/694,304, 63/696, 507, 63/696,533, 63/697,793, 63/697,816, 63/700,749, 63/702,185, 63/705,715, 63/706,768, 63/707,547, 63/707, 897, 63/707,949, 63/708,003, 63/715,117, 63/715,270, 63/720,222, 63/722,057, 63/753,670, 63/757,440, 63/759, 665, 63/760,617, 63/763,209, 63/766,911, 63/770,620, 63/770,654, 63/772,440, 63/773,078, 63/776,429, 63/792, 520, 63/819,533, 63/837,511, 63/837,536, 63/839,386, 63/839,517, 63/839,612, 63/839,880, 63/839,918, and 63/841,314, each of which is expressly incorporated by reference herein in its entirety.

In this application, to the extent any U.S. patents, U.S. patent applications, or other materials (e.g., articles) have been incorporated by reference, the text of such materials is only incorporated by reference to the extent that it does not conflict with the materials, statements, and drawings set forth herein. In the event of such a conflict, the text of the present document controls, and terms in this document should not be given a narrower reading in virtue of the way in which those terms are used in other materials incorporated by reference. It should also be understood that structures or features not directly associated with a robot cannot be adopted or implemented into the disclosed humanoid robot without careful analysis and verification of the complex realities of designing, testing, manufacturing, and certifying a robot for the completion of usable work nearby or around humans. Theoretical designs that attempt to implement such modifications from non-robotic structures or features are insufficient, and in some instances, woefully insufficient, because they amount to mere design exercises that are not tethered to the complex realities of successfully designing, manufacturing, and testing a robot.

The invention claimed is:

1. A humanoid robot positioned in an extended state and comprising:
an upper portion comprising a torso, a head, a left arm assembly, and a right arm assembly;
a lower portion comprising a left lower leg assembly and a right lower leg assembly;
a central portion coupled to the upper portion and the lower portion, and wherein said central portion includes:
(i) a spine with a torso twist actuator with a momentary peak torque,
(ii) a pelvis,
(iii) a hip flex actuator directly coupled to the pelvis and having a hip flex axis, and wherein said hip flex axis:
(a) is positioned at a non-zero downward angle relative to a transverse plane of the humanoid robot, and (b) intersects with said transverse plane, and
(iv) an electric knee actuator having a knee axis that is co-planar with the hip flex axis, and has a momentary peak torque greater than the momentary peak torque of the torso twist actuator; and
wherein the humanoid robot lacks a distinct torso pitch actuator.

2. The humanoid robot of claim 1, wherein the downward angle is between 8 and 16 degrees.

3. The humanoid robot of claim 1, wherein the hip flex actuator is directly coupled to the pelvis.

4. The humanoid robot of claim 3, further comprising a torso lean actuator in the pelvis, and wherein the hip flex actuators is positioned adjacent to the torso twist actuator.

5. The humanoid robot of claim 1, further comprising a torso lean actuator having a torso lean axis and coupled to the pelvis, wherein the hip flex axis is offset below the torso lean axis along a Z-axis of the humanoid robot.

6. The humanoid robot of claim 1, wherein the torso twist actuator includes a torso twist axis that lies in a sagittal plane of the humanoid robot, wherein the hip flex axis intersects the sagittal plane of the humanoid robot at a point below the torso twist actuator.

7. The humanoid robot of claim 1, further comprising:

a hip roll actuator directly coupled to the hip flex actuator and not directly coupled to the pelvis, and wherein said hip roll actuator includes an actuator bearing and a hip roll axis positioned at a downward angle relative to the transverse plane;

a torso lean actuator in the pelvis and having an associated actuator bearing; and wherein the hip flex actuator further has an actuator bearing, and the torso twist actuator has an actuator bearing, and wherein a center of the associated actuator bearing of the hip roll actuator is positioned below a respective center of the associated actuator bearing of each of the torso lean actuator, the torso twist actuator, and each hip flex actuator.

8. The humanoid robot of claim 1, further comprising a hip roll actuator directly coupled to the hip flex actuator and not directly coupled to the pelvis, and wherein the hip roll actuator includes a hip roll axis positioned above a leg twist actuator.

9. The humanoid robot of claim 8, wherein the hip roll axis is positioned at a downward angle relative to the transverse plane, and wherein said angle is between 10 and 20 degrees.

10. The humanoid robot of claim 1, further comprising a hip roll actuator coupled between a pelvis housing of the pelvis and the hip flex actuator.

11. The humanoid robot of claim 1, wherein the central portion further comprises (i) a leg twist actuator having a leg twist axis, and (ii) a plane defined by the knee axis and the hip flex axis, and wherein the leg twist axis is rearwardly offset from the respective plane.

12. The humanoid robot of claim 1, wherein further comprises a leg twist actuator that is not directly coupled to a pelvis housing of the pelvis and is positioned below all other actuators that perform torso lean, torso twist, hip flex, and hip roll movements of the humanoid robot.

13. The humanoid robot of claim 1, further comprising a torso lean actuator: (i) positioned in the pelvis, and (ii) having a torso lean axis positioned at a downward angle between 1 and 30 degrees relative to the transverse plane of the humanoid robot.

14. The humanoid robot of claim 1, wherein the torso includes an arm actuator with an arm actuator axis, and wherein said arm actuator axis is positioned at a non-zero rearward angle relative to a coronal plane of the humanoid robot.

15. The humanoid robot of claim 1, further comprising a torso lean actuator and a torso twist actuator, and wherein an extent of the torso twist actuator is positioned above the torso lean actuator.

16. A humanoid robot positioned in an extended state and comprising:

an upper portion comprising a torso, a head, a left arm assembly, and a right arm assembly;

a lower portion comprising a left lower leg assembly and a right lower leg assembly; and a central portion coupled to the upper portion and the lower portion, and wherein said central portion includes:

a spine, a pelvis, a hip flex actuator directly coupled to the pelvis and having a hip flex axis, a hip roll actuator directly coupled to the hip flex actuator and having a hip roll axis, and wherein the hip roll axis is positioned at a non-zero downward angle relative to a reference plane that intersects with the hip roll axis and is parallel with the transverse plane of the humanoid robot, and a leg twist actuator coupled to the hip roll actuator, each leg twist actuator having a leg twist axis parallel to a sagittal plane of the humanoid robot, wherein the humanoid robot lacks a dedicated torso pitch actuator configured to provide pitch movements of the torso.

17. The humanoid robot of claim 16, wherein the hip flex axis intersects with the transverse plane and is positioned at a non-zero downward angle relative to the transverse plane of the humanoid robot.

18. The humanoid robot of claim 16, further comprising a torso lean actuator in the pelvis, wherein the hip flex axis of the hip flex actuator is offset below a torso lean axis of the torso lean actuator along a Z-axis of the humanoid robot.

19. The humanoid robot of claim 16, further comprising a knee actuator having a knee axis, wherein the hip roll axis is neither parallel nor orthogonal to the knee axis.

20. The humanoid robot of claim 16, further comprising a knee actuator having a knee axis, wherein: (i) a plane is defined by the knee axis and the hip flex axis, and (ii) the leg twist axis of the leg twist actuator is rearwardly offset from the plane.

21. The humanoid robot of claim 16, further comprising a torso lean actuator coupled to the pelvis and having a torso lean axis positioned at a downward angle between 1 and 30 degrees relative to the transverse plane of the humanoid robot.

22. A robot positioned in an extended state and comprising:

an upper portion comprising a torso, a head, a left arm assembly, and a right arm assembly;

a central portion coupled to the upper portion, and wherein said central portion includes:

(i) a hip flex actuator directly coupled to a pelvis and having a hip flex axis, and wherein said hip flex axis: (a) is positioned at a non-zero downward angle relative to a transverse plane of the humanoid robot, and (b) intersects with said transverse plane;

(ii) a hip roll actuator coupled to the hip flex actuator;

(iii) a leg twist actuator coupled to the hip roll actuator and including a leg twist axis, and wherein said leg twist axis is positioned below both the hip flex actuator and the hip roll actuator.

23. The robot of claim 22, wherein the hip roll actuator has an output that is positioned proximate to a rear extent of the humanoid robot.

24. The robot of claim 22, further comprising a torso lean actuator in the pelvis, wherein the hip flex actuator is positioned adjacent to a torso twist actuator.

25. The robot of claim 22, wherein the torso includes an arm actuator with an arm actuator axis, and wherein said arm actuator axis is positioned at a non-zero rearward angle relative to a coronal plane of the humanoid robot.

26. The robot of claim 22, further comprising a torso lean actuator and a torso twist actuator, and wherein an extent of the torso twist actuator is positioned above the torso lean actuator.

27. The robot of claim 22, wherein the leg twist axis is positioned rearward of a coronal plane of the humanoid robot, and wherein the hip flex axis is positioned in said coronal plane.

28. The robot of claim 22, wherein the humanoid robot lacks a distinct torso pitch actuator.

* * * * *